US006176429B1

United States Patent
Reddersen et al.

(10) Patent No.: US 6,176,429 B1
(45) Date of Patent: Jan. 23, 2001

(54) OPTICAL READER WITH SELECTABLE PROCESSING CHARACTERISTICS FOR READING DATA IN MULTIPLE FORMATS

(75) Inventors: Brad R. Reddersen, Eugene, OR (US); Edward C. Bremer, Rochester, NY (US); Chay K. La, Rochester, NY (US); Stephen P. Deloge, Rochester, NY (US); Raymond J. Boyd, Bloomfield, NY (US); Shane P. Cooper, Walworth, NY (US); Ilya Zaverukha, Penfield, NY (US)

(73) Assignee: PSC Scanning, Inc., Eugene, OR (US)

( * ) Notice: Under 35 U.S.C. 154(b), the term of this patent shall be extended for 0 days.

(21) Appl. No.: 09/118,228

(22) Filed: Jul. 17, 1998

(51) Int. Cl.[7] .............................. G06K 7/10; G06K 9/22; G06K 19/02; G02B 26/10
(52) U.S. Cl. ............................... 235/462.25; 235/462.28
(58) Field of Search .......................... 235/462.3, 462.31, 235/462.32, 462.33, 462.36, 462.25, 462.28; 359/202

(56) References Cited

U.S. PATENT DOCUMENTS

| | | | |
|---|---|---|---|
| Re. 35,117 | * | 12/1995 | Rando et al. . |
| 4,402,088 | * | 8/1983 | McWaters et al. ................ 382/68 |
| 4,542,528 | * | 9/1985 | Sanner et al. ..................... 382/62 |
| 4,825,291 | * | 4/1989 | Mimura et al. ............... 358/213.19 |
| 4,877,948 | * | 10/1989 | Krueger .......................... 235/449 |
| 5,138,140 | * | 8/1992 | Siemiatkowski et al. . |
| 5,235,172 | * | 8/1993 | Oehlmann . |
| 5,239,165 | * | 8/1993 | Novak . |
| 5,262,871 | * | 11/1993 | Wilder et al. ................. 358/213.11 |
| 5,319,182 | * | 6/1994 | Havens et al. ................... 235/462 |
| 5,345,266 | * | 9/1994 | Denyer ........................... 348/300 |
| 5,452,379 | * | 9/1995 | Poor ............................... 382/317 |
| 5,691,834 | * | 11/1997 | Plesko ............................ 359/202 |
| 5,760,382 | * | 6/1998 | Li et al. .......................... 235/436 |
| 5,770,847 | * | 6/1998 | Olmstead ........................ 235/462 |
| 5,773,806 | * | 6/1998 | Longacre, Jr. .................. 235/462 |
| 5,818,026 | * | 10/1998 | Melling et al. . |
| 5,837,987 | * | 11/1998 | Koenck et al. ................. 235/462 |

FOREIGN PATENT DOCUMENTS

| | | | |
|---|---|---|---|
| 0 163 547 A2 | * | 12/1985 | (EP) . |
| 0 185 450 A2 | * | 6/1986 | (EP) . |
| 2 186 149A | * | 8/1987 | (GB) . |
| 2 255 465A | * | 11/1992 | (GB) . |
| 2 262 678A | * | 6/1993 | (GB) . |
| 2 269 505A | * | 2/1994 | (GB) . |

* cited by examiner

Primary Examiner—Karl D. Frech
(74) Attorney, Agent, or Firm—Lyon & Lyon LLP

(57) ABSTRACT

A multi-function optical reader comprises an photosensor, such as a charge-device (CCD), and signal conditioning and processing circuitry including separate channels for handling data in different formats. A bar code processing channel digitizes the scan signal according to light and dark features using a first-derivative technique, and an OMR processing channel uses an adaptive threshold to adapt to different light conditions and provide a boundary line for digitizing light and dark features of the target scan line. A feature measurement circuit measures the widths of the light and dark regions as derived by the separate processing channels, and provides the feature measurements to a decoding system or host terminal processor. The scan rate of the optical reader can be adjusted according to the data format to be read or the level of ambient light, to avoid saturation. The optical reader can provide multiple depth-of-field zones, both internal and external to an optical reader housing. The optical reader may provide for image capture and optical character recognition.

32 Claims, 38 Drawing Sheets

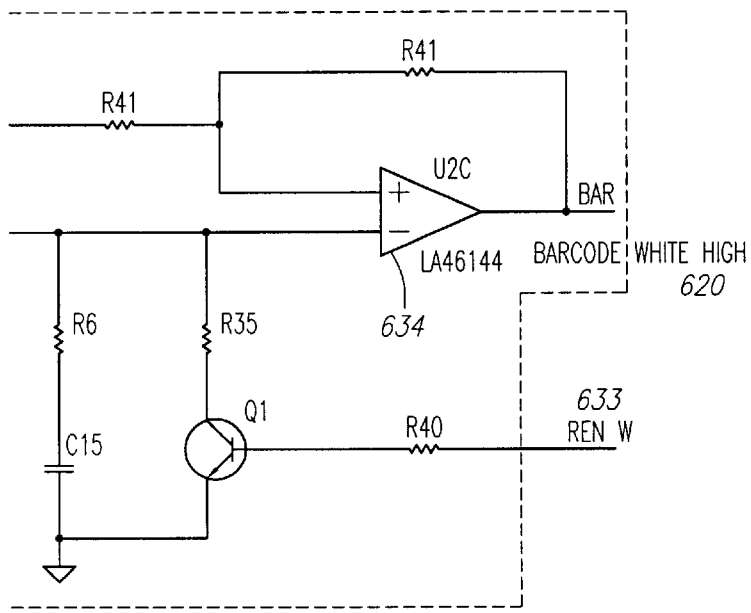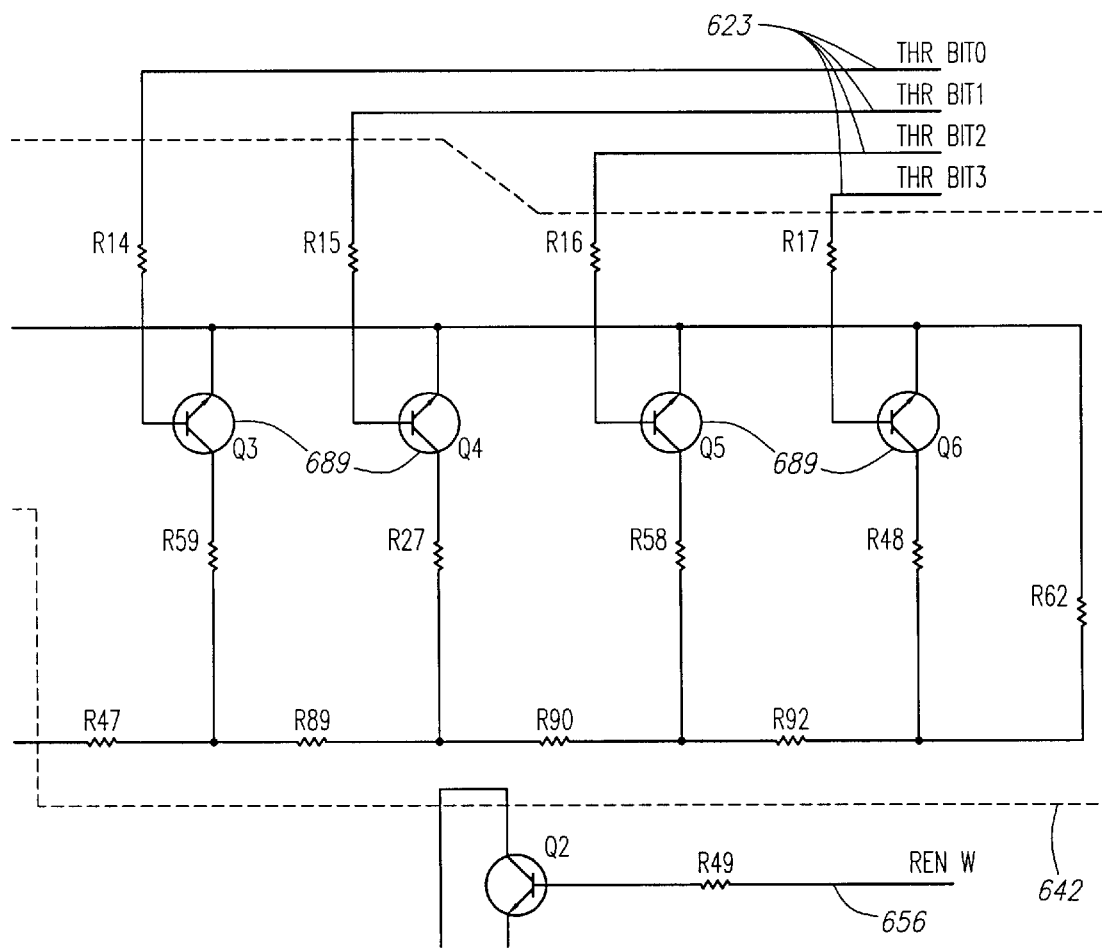
FIG. 20C

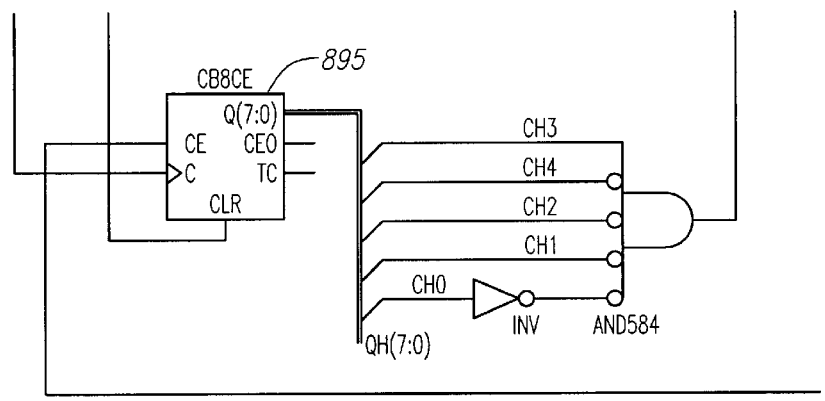
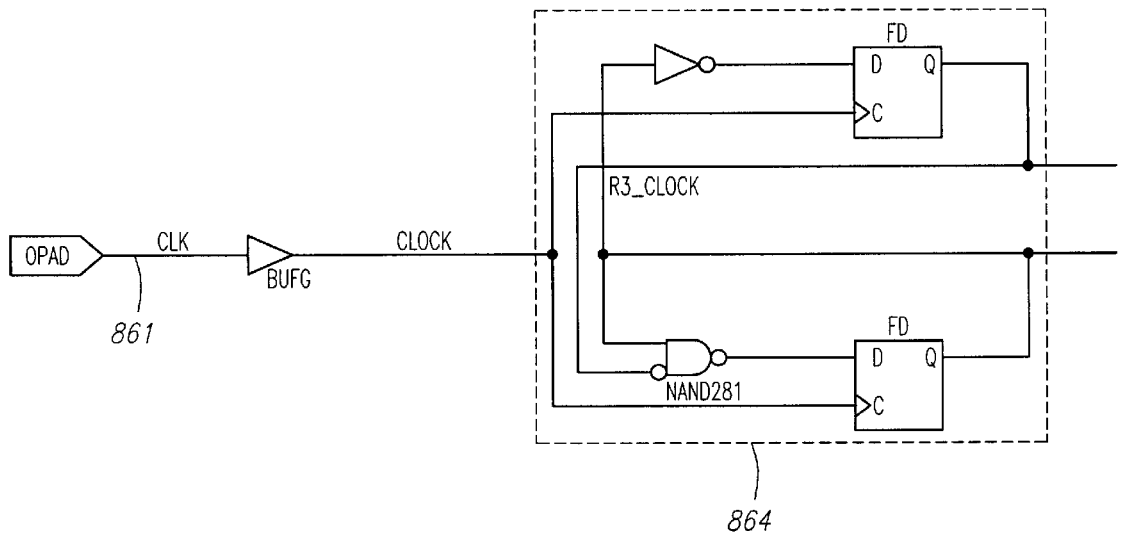
FIG. 22C

| FIG. 22F | FIG. 22G |
| --- | --- |
| FIG. 22H | FIG. 22I |
| FIG. 22J | FIG. 22K |

FIG. 22E

OPTICAL READER WITH SELECTABLE PROCESSING CHARACTERISTICS FOR READING DATA IN MULTIPLE FORMATS

BACKGROUND OF THE INVENTION

1) Field of the Invention

The field of the present invention relates to method and apparatus for optically reading information in multiple formats, and more particularly to a multi-function optical reader for reading bar codes, optical marks and other data in various formats.

2) Background

A variety of devices and techniques for optically reading marks, characters, symbols or other information are currently known. Most such optical reading devices generally have an optical interface for receiving information and a processor for conditioning, processing and/or interpreting the received information, according to the particular type of data (i.e., mark, character, symbol, etc.) to be detected.

Optical mark readers are devices which are used for reading graphical marks on paper or other documents. Typically with optical mark readers, the relative locations of the marks or punchouts on a page indicate data, such as letters, digits, codes, or other such information. The marks may be made automatically by machine (e.g., a printer operating under computer control), or manually using a writing implement. Often the marks are made on a printed "form" document which has predefined boxes or other physical areas having a specific meaning attached to them. Examples of such printed form documents include standard form test sheets, voting ballots, and lottery tickets.

An optical mark reader detects the marks on a paper by measuring the amount of light reflected and/or refracted by the paper at specific locations. A white paper background reflects more light than a darker mark or void; thus an optical mark reader can detect a mark when the amount of light reflected and/or refracted from the paper is sufficiently low, and otherwise detects the absence of a mark.

As an example, in the gaming industry optical mark readers are known in which employ a card reader having an array of light-emitting diode (LED) emitter-detector pairs. A card (e.g., a lottery ticket) is manually inserted into a slot of the card reader, which then uses a mechanized operation to pull the card through at high speed. The LED pairs are located at discrete positions in an array spanning the width of the card. As the card is pulled through, the LED pairs are used to read it line by line. Where a sufficiently low level of light is observed by the detector of an LED emitter-detector pair, a mark is assumed to be present. The card reader stores the data or information signified by the mark for subsequent processing. After the card is pulled through, the mark information on it will be entirely read. This reading process for a single card can take approximately one-half of a second.

Another type of optical reading is performed by bar code scanners and similar imaging devices. Flying spot laser scanners have been used to illuminate a target and detect the reflected and/or refracted light on a photodetector. A relatively large amplitude of the photodetector signal indicates a high level of reflected and/or refracted light and, therefore, white spaces of the bar code, while a relatively small amplitude of the photodetector signal indicates a low level of reflected and/or refracted light and, therefore, dark bars of the bar code. The widths of the bars and spaces are measured by signal processing circuitry, and a decoder then determines whether the measured data indicates the presence of a valid bar code based on, for example, the number of bars and spaces, their relative widths and a parity check. Alternatively, a CCD imager can be used in place of a flying spot scanner, and such a CCD imager can be a single line CCD array or else a two-dimensional CCD array. Various techniques for reading and processing bar code and other types of signals are described in, for example, U.S. Pat. Nos. 4,000,397, 5,463,211 and 5,446,271, each of which is assigned to the assignee of the present invention, and each of which is hereby incorporated by reference as if set forth fully herein.

Another type of optical reading is performed by optical character recognition (OCR) systems. In these systems, an optical detector captures a single line of data, isolates characters based upon relative contrast (i.e., low reflectance levels), and matches templates of alphanumeric characters to each isolated character in the line of data. An OCR system may repeat this process for each line of data read, and can thereby read and interpret the text on an entire document.

In some applications, it may be desired to have the ability to read data in different formats using the same device and/or machinery. Data may be presented in different formats on the same page or, if an object, on the same surface. For example, a single sheet of paper may contain both characters and bar codes that contain information needing to be read. Various types of "hybrid" readers have been proposed to read data in different formats without using separate devices or machinery. Examples of these are illustrated by U.S. Pat. Nos. 4,402,088, 4,877,948, and 5,452,379, each of which is hereby incorporated by reference as if set forth fully herein.

One difficulty with attempting to integrate capabilities of reading multiple data formats in a single device is that each format has its own peculiar requirements for initial optical input and signal conditioning, as well as detection algorithms. As a consequence, circuitry used for one type of data detection would not likely be suitable for detecting data in a different format. In addition, the speed at which the data input occurs is dependent upon the data format. For example, bar code data is generally more concentrated than optical mark data, and needs to be read at a slower rate. However, if a device is constructed such that all data is read at the slowest rate necessary, than overall performance would suffer.

As an additional obstacle, a device for reading multiple data formats would generally need to recognize all possible formats simultaneously, absent some means for assisting with the data recognition process.

The present inventors have therefore determined that it would be advantageous to provide a multiple-function optical reader capable of reading data in a variety of different formats. It would further be advantageous to provide an integrated device capable of reading both bar code or other symbol information and optical marks. It would further be advantageous to provide such a device with additional data reading capability, including the ability to optically read characters or other information. It would further be advantageous to provide any of the above devices having signal conditioning circuitry capable of properly conditioning the variety of possible expected data input formats, and which is compact, relatively easy to integrate, yet not prohibitively expensive to manufacture.

SUMMARY OF THE INVENTION

The present invention provides in one aspect an optical reader capable of reading information in multiple formats, such as a bar code format and an OMR (Optical Mark Recognition) format.

In a preferred embodiment of the invention, an optical reader comprises a photosensitive sensor (such as a CCD linear sensor) having an output signal that is processed by multiple signal processing channels, such as a bar code channel and an OMR channel. Outputs from the multiple signal processing channels are provided to a feature measuring circuit, which identifies the relative locations of features of the target to be read, such as widths of light and dark bar code elements or OMR features. The feature measurement data may be transferred to a decoder or other processor for decoding and processing. The decoder may either reside in the same general physical location as the other optical reader circuitry, or may be located external to the optical reader.

In a preferred embodiment of the invention, a FIFO buffer is provided to facilitate transfer of feature measurement data from the feature measurement circuit to the decoder and/or processor. The feature measurement circuit may write to the FIFO buffer simultaneously with the decoder reading out from the FIFO buffer.

In another embodiment of the invention, the exposure time of the photosensitive sensor is controlled dynamically to provide a rapid scanning rate while preventing saturation of the sensor. In an exemplary embodiment employing this technique, a CCD linear sensor is utilized, and its scanning rate is varied from a relatively lower scanning rate (e.g., 250 scans/second) when in a bar code scanning mode to a relatively higher scanning rate (e.g., 1000 scans/second) when in an OMR scanning mode. Additionally, the CCD video output signal may be monitored and, when it is of an amplitude indicating possible saturation, the scanning rate may be increased or else may be rotated among different rates. Preferably, the read-out rate from the CCD linear sensor is maintained constant even when the scanning rate is increased, so as to maintain the CCD video output signal within the optimal range of the signal processing circuitry.

In another embodiment of the invention, reading may be accomplished by an optical reader in multiple depth of field zones. In a particular embodiment in accordance with this aspect of the invention, an optical reader is capable of reading the front and back of a document (e.g., lottery ticket) inserted into the apparatus, with the front view and the back view of the document providing two different depth of field zones. A third depth of field zone is provided by allowing the optical reader to image targets along the optical scan path but external to the housing of the apparatus.

In another embodiment of the invention, the scanning mode of the optical reader is selected by a special code (e.g., a specialized bar code or symbol, referred to as a "control symbol" or sometimes as a "job control bar code") affixed to the target to be read. The optical reader first looks for the special code and, when detected, configures itself in the proper mode (i.e., bar code scanning mode or OMR scanning mode) for the anticipated data from the target. The special code or control symbol can also be used to identify the data format used in specific regions of the target, so that the optical reader can dynamically change modes during reading of a single target based upon the information from the special code or control symbol.

In yet another embodiment of the invention, an optical reader provides image capture in addition to one or more of the above-described features. When in an image capture mode, the sensitivity of the signal processing circuitry is preferably increased, and the feature measurements can be stored in a volatile memory for read-out at a later time. Alternatively, the photosensitive sensor output signal can be digitized and directly routed to a volatile memory which stores the gray-scale image until it is read out at a later time. In either of these alternative embodiments, the image capture memory can be located in the same general physical location as the other optical reader circuitry, or else can be located external to the optical reader.

Further variations and modifications to the above are also described herein.

DETAILED DESCRIPTION OF THE PREFERRED EMBODIMENTS

Figure 1:
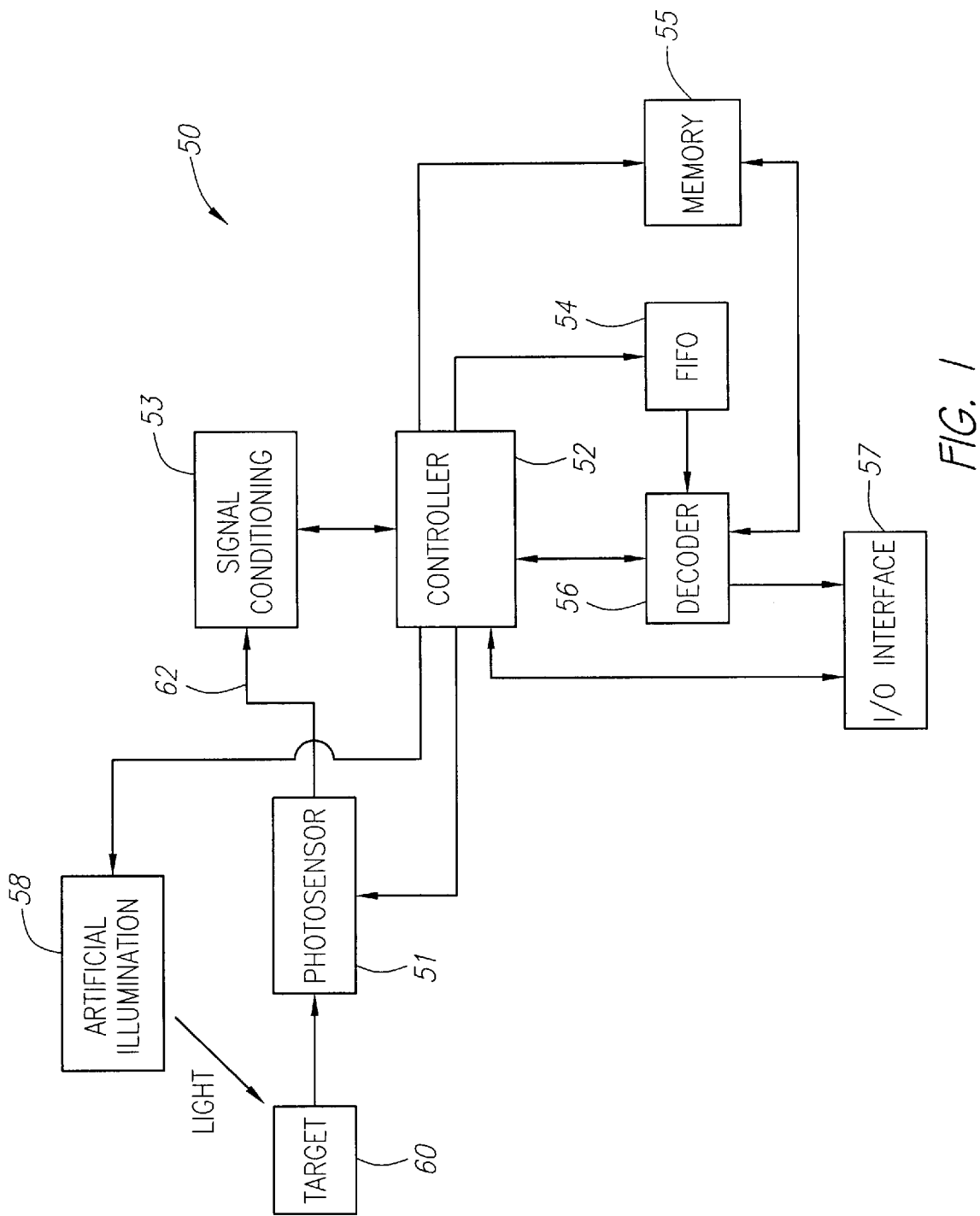
FIG. 1 is a block diagram of an optical reader in accordance with one embodiment of the present invention.

FIG. 1 is a block diagram of an optical reader 50 in accordance with certain aspects of a preferred embodiment of the present invention. The optical reader 50 includes an artificial illumination source 58, a photosensor 51, a controller 52, a signal conditioning and processing block 53, a memory buffer 54 (e.g., a first-in first-out (FIFO) memory), a memory 55, a decoder 56 and an input/output (I/O) interface 57. The optical reader 50 is preferably configured so as to read and recognize information in more than one data format, according to techniques described further herein.

In operation, the artificial illumination source 58 is activated so as to illuminate a target 60 to be read. The artificial illumination source 58 may comprise, for example, an array of light-emitting diodes (LEDs), an incandescent light or any other suitable light source. Light reflected from the target 60 is detected by the photosensor 51, which outputs a signal 62 indicative of lighter and darker portions of the target. In a preferred embodiment, the photosensor 51 comprises, for example, a CCD linear sensor, but it may also be embodied as a two-dimensional CCD array, or a linear or multi-dimensional CMOS array (such as described in copending U.S. patent application Ser. No. 08/697,408 filed Aug. 23, 1996, hereby incorporated by reference as if set forth fully herein). The photosensor output signal 62 is fed to the signal conditioning and processing block 53, which conditions it and identifies the portions of the signal corresponding to the relatively lighter and darker portions of the target. The signal conditioning and processing block 53 can have operating parameters which are dynamically selected by the controller 52. The signal conditioning and processing block 53 outputs data indicative of the relative light and dark portions of the target, and this data is stored by the controller 52 in the FIFO 54 for further processing.

The decoder 57 reads data from the FIFO 54 and processes the data to determine whether the data can be recognized. The decoder 57 may operate according to a program stored in the memory 55. The memory 55 may comprise, for example, a flash programmable read-only memory (PROM), and may also comprise a static random-access memory (RAM) which can be used as a scratchpad area. The decoder 56 outputs data across the I/O interface 57 to a host computer or some other target which utilizes the decoded information. The decoder 56 need not be resident in the same device as the other components shown in FIG. 1, but may alternatively be located with the host system.

Figure 2:
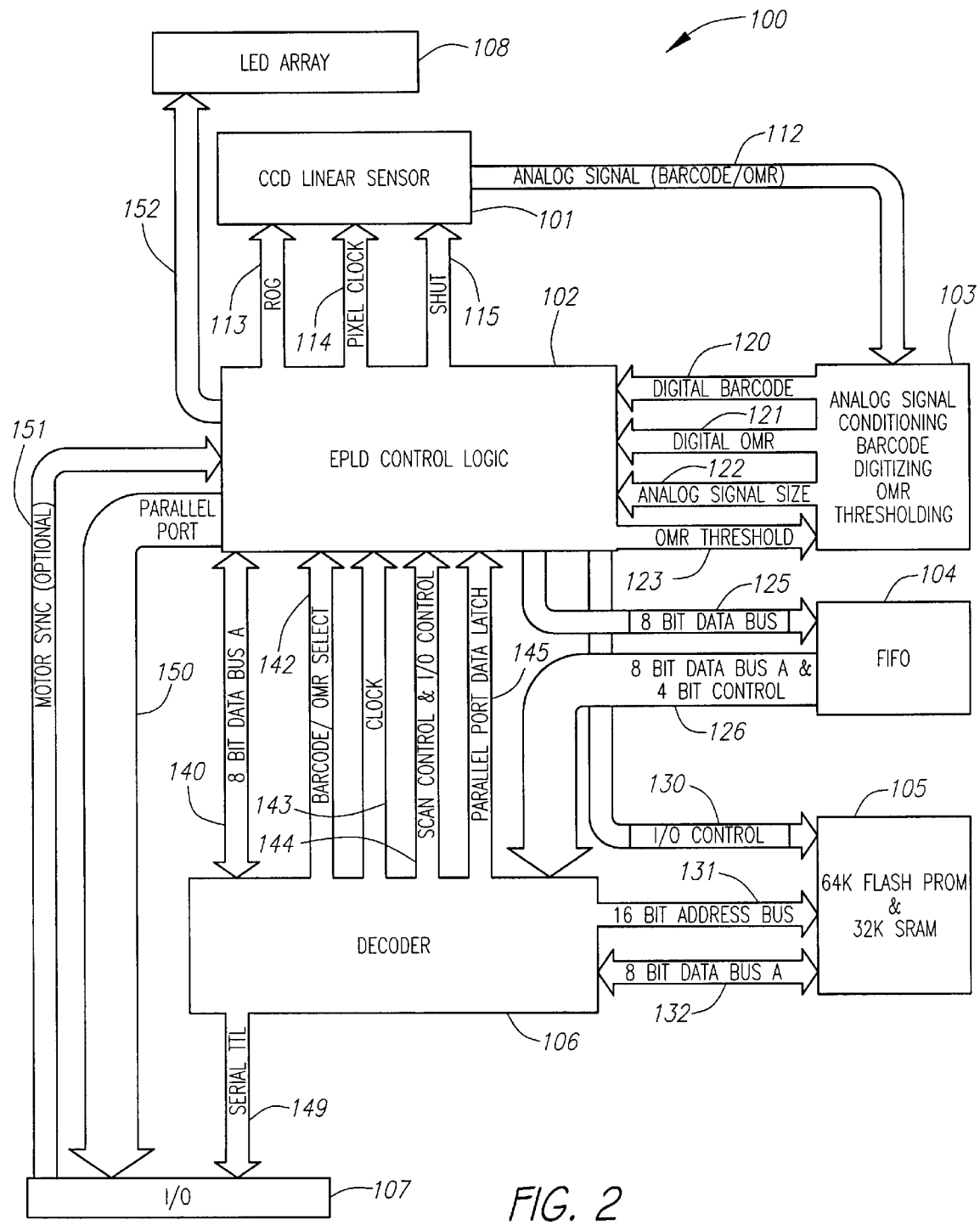
FIG. 2 is a more detailed block diagram of a preferred optical reader in general accordance with the concepts illustrated in FIG. 1.

FIG. 2 is a more detailed block diagram of an optical reader 100 based on the principles of the optical reader 50 of FIG. 1 and particularly suited for reading both bar code and OMR data. The optical reader 100 includes an LED array 108 (or other suitable artificial illumination source), a photosensor embodied as a CCD linear sensor 101, a controller 102, a signal conditioning and processing block 103, a FIFO memory buffer 104, a memory 105, a decoder 106 and an I/O interface 107. The optical reader 100 is preferably configured so as to read and recognize information in more than one data format, including at least bar codes and OMR data, according to techniques described further herein.

In operation, the LED array 108 is activated so as to illuminate a target (not shown) to be read. Light reflected from the target is detected by the CCD linear sensor 101, which outputs an analog CCD output signal 112 having a population of relatively high amplitude peaks corresponding to lower light intensity levels (i.e., darker portions of the target) and relatively low amplitude peaks corresponding to higher light intensity levels (i.e., lighter portions of the target). The CCD linear sensor 101 comprises an array of photosensitive elements (or pixels) which simultaneously detect the light incident at each of their respective locations. Light detection is accomplished in a series of repeating scan frames. During a particular scan frame, data from the array of photosensitive elements is read out serially at the output of the CCD linear sensor 101, while at the same time the photosensitive elements of the COD linear sensor 101 are enabled to collect light for the present scan frame. The scan rate dictates the exposure time of the CCD linear sensor 101, and is preferably controlled by the controller 102. The selection of a scan rate may be accomplished selectively (depending upon, for example, the mode of operation or type of data format being read) or dynamically, depending, for example, on whether or not the operation of the device is in, or is expected to be in, a condition of saturation. After the exposure time has elapsed, the serial data from the array of photosensitive elements is read out as a CCD output signal 112, which is then fed to the signal conditioning and processing block 103.

The controller 102 controls the operation of the CCD linear sensor 101 by use of at least two signals, which are shown in FIG. 2 as a read-out-gate (ROG) signal 113 and a pixel clock signal 114. The ROG signal 113 controls how often data is read out of the CCD linear sensor 101, while the pixel clock signal 114 controls the rate at which the data is serially clocked out of the CCD linear sensor 101. The higher the frequency of the ROG signal 113, the shorter the exposure time of the CCD linear sensor 101.

Alternatively, a shutter (SHUT) signal 115 may be used to actuate an electronic shutter (not shown) that controls the exposure of the CCD linear sensor 101. In such a case, an exposure period may be commenced at the start of a pulse of the shutter signal 115, and terminated by a pulse of the ROG signal 113, which causes a serial transfer of charge along the array of CCD pixels and over CCD output signal 112 at a rate controlled by the pixel clock signal 114.

The controller 102 and/or CCD linear sensor 101 may, if desired, employ adaptive exposure control in order to adjust the period of light collection based upon the amount of detected light. When there is more light, the exposure period can be made smaller, and when there is less light the exposure period can be made longer. Adaptive exposure control circuits for use with CCD sensors are described in, for example, copending U.S. patent application Ser. No. 08/697,408 filed Aug. 23, 1996, and Ser. No. 08/576,203 filed Dec. 20, 1995, each of which is assigned to the assignee of the present invention, and each of which is hereby incorporated by reference as if set forth fully herein. The amount of exposure may also be controlled by the controller 102 by adjusting the intensity of the LED array 108 and/or the length of time which the array is activated so as to provide illumination of the target.

In a preferred embodiment, described in detail later herein, the exposure period is controlled by altering the scanning rate, while the read-out rate is maintained constant. In such an embodiment, the scanning rate may be switched between a relatively higher scan rate (e.g., 1000 scans/second) when in an OMR scanning mode, and a relatively lower scan rate (e.g., 250 scans/second) when in a bar code scanning mode. However, when the optical reader is in the bar code scanning mode and a saturation or potential saturation condition is present, the scanning rate is preferably increased to, e.g., 1000 scans/second, or else rotated between two or more different scan rates in order to provide a range of exposure times. Preferably, the read-out rate from the CCD linear sensor 101 is maintained constant even when the exposure time is varied, and this constant read-out rate may be accomplished by alternating between exposure scan frames at a high scan rate and read-out scan frames at the desired (slower) scan rate.

After the target is imaged by the CCD linear sensor 101, the image is clocked out of the CCD pixels over CCD output signal 112 and then processed by the signal conditioning and processing block 103. In a preferred embodiment, the signal conditioning and processing block 103 comprises two processing channels, a bar code processing channel and an OMR processing channel, as more fully explained later herein with respect to the preferred circuit diagrams of FIGS. 19 and 20. In general, the signal conditioning and processing block 103 comprises suitable gain and filtering based upon the expected content (e.g., amplitude, frequency and characteristics) of the CCD output signal 112. The signal conditioning and processing block 103 also comprises circuitry or other means for digitizing the bar code or OMR signal information. In a preferred embodiment, the signal conditioning and processing block 103 outputs a digital bar code signal 120 which transitions between high and low output states each time a transition is detected between a relatively dark region and a relatively light region of the target (as indicated by transitions between positive peaks and negative peaks in the conditioned CCD output signal 112), and also outputs a digital OMR signal 121 which also transitions between high and low output states each time a transition is detected between a relatively light region and a relatively dark region of the target. The use of two processing channels, one of which outputs the digital bar code signal 120 and the other of which outputs the digital OMR signal 121, is advantageous because of the different characteristics of the bar code and OMR data expected to be received by the CCD linear sensor 101. However, it is possible that at least some portion, or possibly all, of the circuitry of the two processing channels may be shared, and a single output developed, if the dynamic range of the circuitry is sufficient.

The signal conditioning and processing block 103 also preferably outputs a signal-size signal 122 which provides a discrete indication of the size of the CCD output signal 112 being received by the signal conditioning and processing block 103. The signal-size signal 122 is used by the controller 102 in selected the scan rate and the pixel clocking rate for the CCD linear sensor 101, as discussed hereafter with respect to the preferred circuit embodiments shown in FIGS. 19, 20, 21 and 22A through M.

The controller 102 preferably comprises digital and/or logic components suitable for performing the various operations described in conjunction with the optical reader of FIG. 2. In a preferred embodiment, the controller 102 comprises an electrically programmable logic device (EPLD) having circuitry in a configuration, for example, as shown in the preferred controller circuit diagrams of FIGS. 21 and 22-A through M. In general, the controller 102 preferably comprises CCD control circuitry for controlling the timing and output of the CCD linear sensor 101, and at least one timer or counter for measuring the length of time between transitions in the digital bar code signal 120 or the digital OMR signal 121, depending on the operating mode of the device (i.e., which type of information is being read). The feature measurement operation of the controller 102 essentially generates a run-length encoding of feature widths, by outputting feature width data in a "compressed data" format.

The controller 102 also preferably comprises circuitry for formatting the bar code width or OMR data, and for transferring such data (as run-length encoded (RLE) words) to the FIFO memory buffer 104, using a data bus 125 (e.g., an 8-bit data bus).

In a preferred embodiment, the controller 102 performs feature edge timing and loads words of a predefined length (e.g., 16 bits) into the FIFO memory buffer 104, such words providing information regarding feature edge timing to the decoder 106 for later processing. In one embodiment, the words are divided into fields such that 15 bits are used for feature edge timing data and the most significant bit is used as the video state indicator (0 for black, and 1 for white).

In an alternative embodiment, specific words are used to indicate the video state (i.e., black or white) at each start-of-scan (SOS) transition, and the state of each consecutive element is determined by alternating the states between black and white. For example, a first word (e.g., 0x8000) may be used to indicate a start-of-scan transition on a white state, while a second word (e.g., 0xFFFF) may be used to indicate a start-of-scan transition on a black state. Since the SOS word defines the first state (black or white) for the scan, the state of each of the following elements is determined by alternating between black and white from the initial state.

The decoder 106, which may comprise a microprocessor and supporting circuitry, reads the encoded feature measurement information from the FIFO memory buffer 104, and attempts to decode or otherwise interpret this information. The decoder 106 may either be pre-set in advance to look specifically for bar code data or OMR data, or else may be provided with intelligence to distinguish between bar code data and OMR data dynamically based upon the different characteristics of the two types of data.

In one embodiment, when first activated the decoder 106 is pre-configured or pre-programmed to look for bar code data having a specific format. An initial bar code, which may be referred to as a "job control" bar code, may be printed on items to be read. The job control bar code indicates which type of data appears on the item to be read. For example, in one embodiment which relates to lottery gaming tickets, a gaming ticket is imprinted with a control symbol (e.g., a job control bar code) in a predefined location on the ticket, preferably the part of the back (or front) of the ticket that will initially be read by the optical reader. In this embodiment, the optical reader 100 first looks for a job control bar code, and therefore starts off in a bar code scanning mode. Upon the optical reader 100 reading and decoding the job control bar code 100, the decoder 106 chooses between a bar code scanning mode and an OMR scanning mode by appropriately setting of a barcode/OMR selection signal 142. The barcode/OMR selection signal 142 is connected to the controller 102, which responds to the barcode/OMR selection signal 142 by choosing between the output of the digital bar code signal 120 and the digital OMR signal 121, and measuring the signal features on the appropriate input signal line. The controller 102 may also, via one or more control signals, effectively shut down the portion or processing channel of the signal conditioning and processing block 103 not being needed in conjunction with the current detection state.

The decoder 106 is connected to the memory 105, which preferably comprises a non-volatile portion (such as a 64 kilobyte flash programmable read-only memory (PROM)) for storing programming instructions for the decoder 106. The memory 105 may also comprise a static RAM portion (such as a 32 kilobyte static RAM), which may be used to store feature measurement data transferred from the FIFO memory buffer 104 and also may be used as a scratchpad area, or for storing working variables. The decoder 106 may access the memory 105 using an address bus 131 (e.g., a 16-bit address bus), and may receive data from the memory 105 over a data bus 132 (e.g., an 8-bit data bus).

In addition to the barcode/OMR select signal 142, the decoder 106 also interfaces with the controller 102 using several other signals, including a clock signal 143, a scan control and I/O control signal set 144, and a parallel port data latch signal 145. The scan control and I/O control signal set 144 may, for example, control the source and destination of information being transferred to or from the controller 102 or the components (such as the FIFO memory buffer 104) controlled in part by the controller 102. The FIFO memory buffer 104 is preferably dual-access, so that the controller 102 can write to the FIFO memory buffer 104 at the same time as the decoder 106 reads out information from it.

The controller 102 also shares a bidirectional data bus 140 with the decoder 106. The controller 102 may send data or status information directly to the decoder 106 over data bus 140, although it is preferred that the decoder 106 receive data relating to the bar code and OMR features directly from the FIFO memory buffer 104.

In one embodiment, the FIFO memory buffer 104 generates an interrupt to a microprocessor in the decoder 106 when the FIFO memory buffer 104 is half full. In a variation of this embodiment, the decoder 106 does not attempt to access the FIFO memory buffer 104 until it sees the interrupt, at which point it responds to the interrupt by taking data out of the FIFO memory buffer 104. Alternatively, one or more status lines can be used to inform the decoder 106 as to the current amount of data stored in the FIFO memory buffer 104. For example, a 2-bit status word can be employed to indicate when IS the FIFO memory buffer 104 is ¼-filled, ½-filled, ¾-filled, or totally filled. The decoder 106 can use the status information to determine how to best regulate the decoding process.

The optical reader 100 may interface to a host computer (not shown) or other external device by way of an I/O interface 107. For the preferred optical reader 100 shown in FIG. 2, the decoder 106 communicates with external devices by way of a serial data channel 149. The controller 102 may also communicate with an external device using a parallel data channel 150. The controller 102 may receive an external motor synchronization ("sync") signal 151 to synchronize the imaging of the target with the movement caused by an external motor which moves the object or document being read.

The decoder 106 or host processor may be programmed with algorithms for decoding bar codes of any type, optical characters, and symbols as conventionally known in the art.

In addition, when in an OMR scanning mode, the decoder 106 or host processor may be programmed to interpret the RLE words and reconstruct or otherwise determine the positions of the optical markings from which the input data was derived. Such an operation is straightforward once the RLE words have been obtained. For example, a cumulative total of feature widths, based on the stored RLE words, can be maintained by the decoder 106 or host processor for each scanned line as the line is decoded. As an illustration of one possible technique, when the feature measurement data indicates a dark feature, the boundaries of the feature can be converted or translated to physical coordinates on the document or item scanned (e.g., by converting the cumulative total of feature widths for the scanned line to inches or other physical units to obtain a horizontal position coordinate, and by converting the cumulative line number total to inches or other physical units to obtain a vertical position coordinate). The coordinates of the optical mark can be translated or interpreted, by the host processor or otherwise, to recover the encoded information according to the particular application in which the optical reader is being used.

Figure 3:
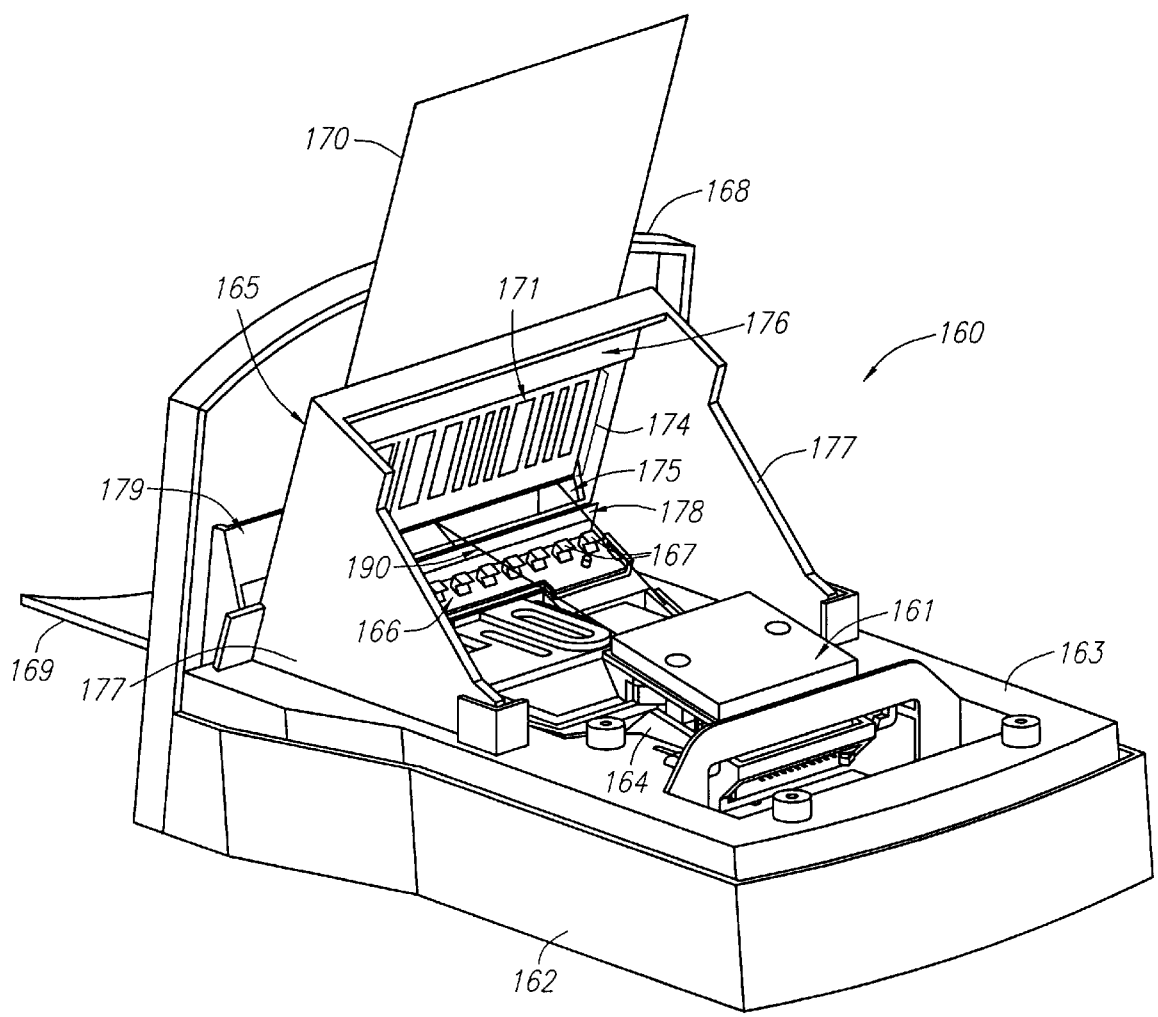
FIG. 3 is a structural diagram of an optical reader, shown without an outer housing.
Figure 4A:
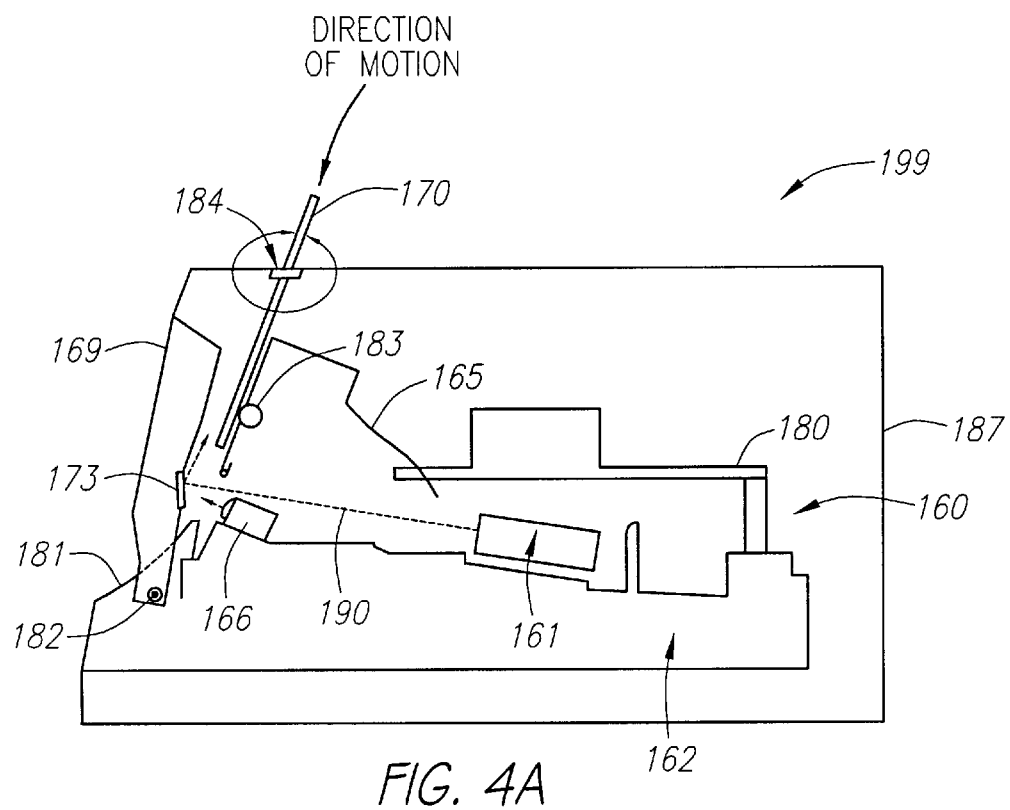
FIGS. 4-A, 4-B and 4-C are diagrams illustrating different focal zones for the optical reader of FIG. 3, and FIG. 4-D is a detail of FIGS. 4-A and 4-B.
Figure 4B:
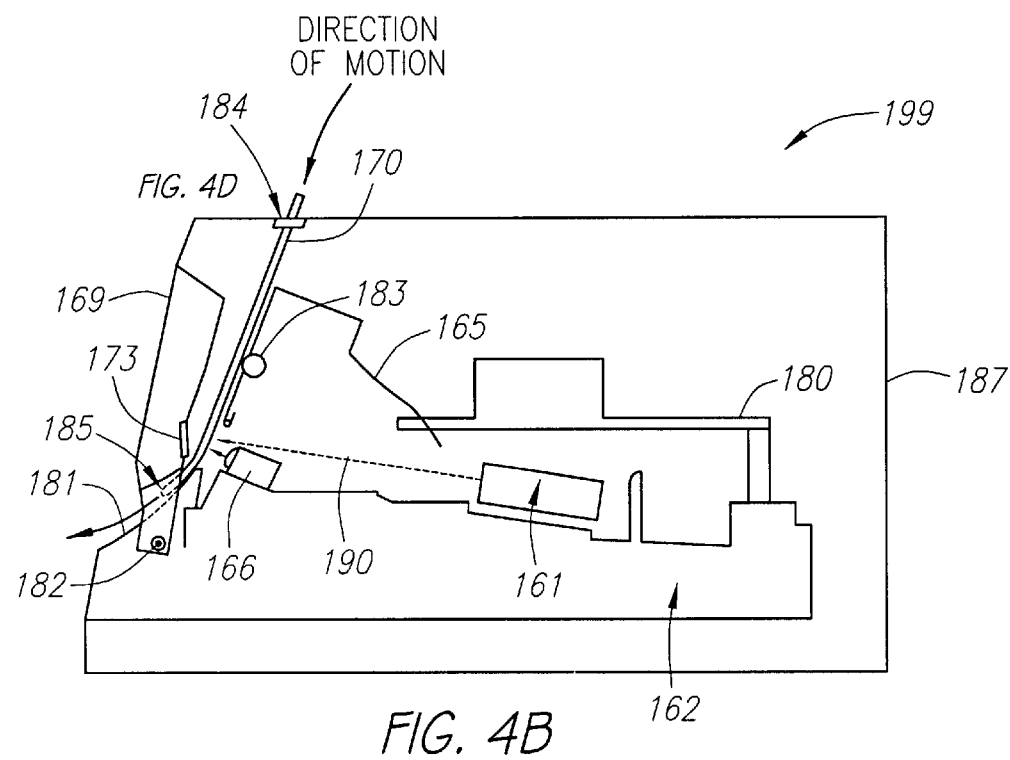
Figure 4C:
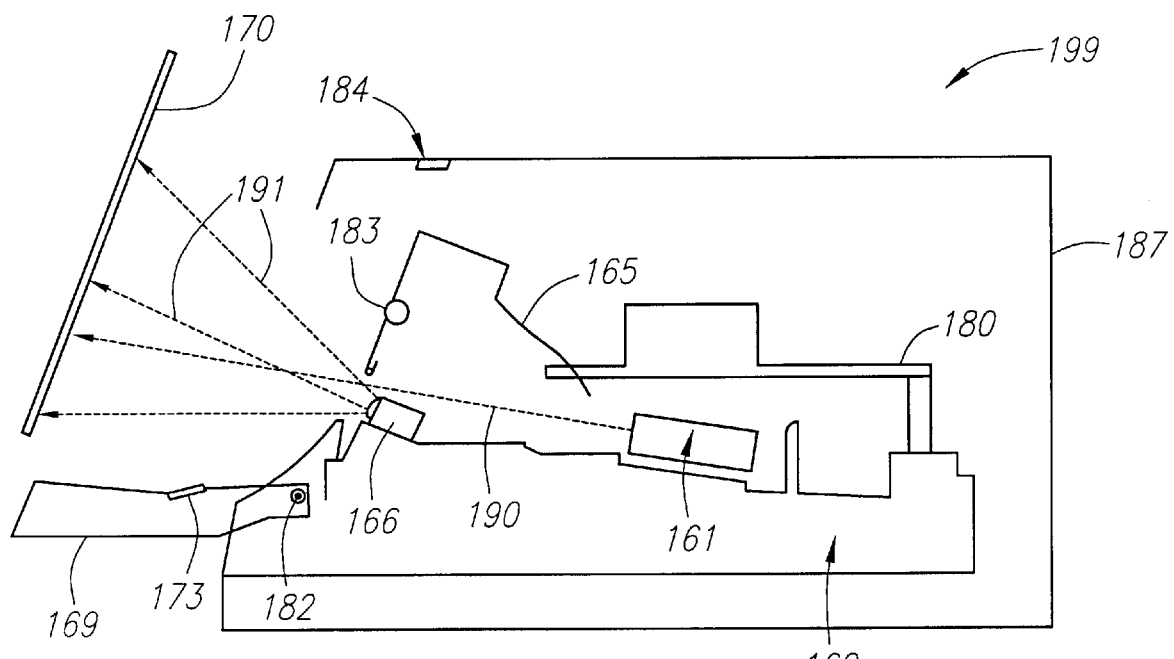
Figure 4D:
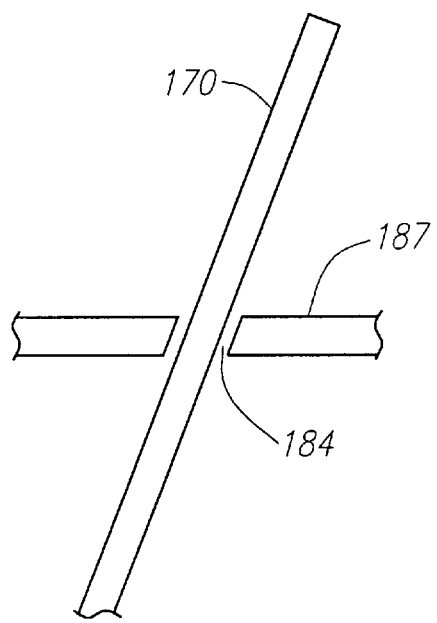

FIG. 3 is a diagram illustrating a preferred embodiment adapted for specific use in an application for reading gaming or lottery tickets which have bar code and/or OMR data appearing on them. In this particular application, the optical reader 100 is mounted inside a special host terminal, allowing the optical reader 100 to read in three distinct imaging zones having different depths of field. FIGS. 4-A, 4-B and 4-C, as described later herein, are side-view diagrams of the apparatus of FIG. 3 placed within a housing, illustrating the different fields of view of the optical reader, and FIGS. 5 through 18 depict various structural and mechanical details of the optical reader assembly shown in FIG. 3. As explained in more detail hereafter, the configuration of the host terminal allows the optical reader 100 to read information from both sides of a ticket at relatively close depths of field, and also allows the optical reader 100 to read information from a ticket manually held or swept in front of the host terminal at a farther depth of field.

In a preferred embodiment, the optical reader assembly 160 comprises a model SciScan 1000, 2000 or 3000 apparatus as manufactured by Scientific Games of Alfaratta, Georgia. However, the optical reader assembly 160 is modified by the use of an optical reader scan head 161 as preferably constructed in accordance with the description herein (see, e.g., FIGS. 5 through 12, and accompanying description), as well as an illumination source (e.g., an LED array) as also described in a preferred form elsewhere herein (see, e.g., FIGS. 13 through 16, and accompanying description).

As shown in FIG. 3, an optical reader assembly 160 comprises a base 162 atop of which is positioned a mounting surface 163. An optical reader scan head 161 is placed within an adjustable cradle 164 located atop the mounting surface 163, as shown in FIG. 3, such that an optical path 190 is created with multiple depth-of-field zones, as further described below with respect to FIGS. 4-A, 4-B and 4-C. A motor mounting frame 165 is attached to the mounting surface 163. The motor mounting frame 165 has an upper window beam 176 spanning between two outer motor mounting frame walls 177 of the motor mounting frame 165. The upper window beam 176 and outer motor mounting frame walls 177 define a rectangular motor drive window 174. A motor assembly (not shown in FIG. 3) is placed within the motor mounting frame 165, such that a drive roller (also not shown) comes in contact with a ticket 170 through the motor drive window 174 so as to pull the ticket 170 into position to be read by the optical reader scan head 161.

Below the motor drive window 174 is an optical window 175 of relatively narrow width and rectangular shape, which is defined by the two outer motor mounting frame walls 177 and a lower window beam 178. The upper boundary of the optical window 175 may generally be defined by the motor assembly (not shown) which is placed within the motor mounting frame 165. The optical window 175 is located in such a way as to allow the optical path 190 of the optical reader scan head 161 to pass through it. The optical window 175 may be covered by plastic, glass or similar transparent material, or else may be left open.

The optical reader assembly 160 further comprises a front cover 168, which forms a front wall of an outer housing when the optical reader assembly 160 is placed within such a housing. Attached to the front of the optical reader assembly 160 is a swinging door 169, the purpose of which is to provide a tertiary depth-of-field zone for objects or items manually held or swept in front of the device. Atop the mounting surface 163 and within the interior of the motor mounting frame 165 is positioned an LED array 166 comprised of a plurality of individual light-emitting diodes (LEDs) 167, which collectively act as an illumination source. The LEDs 167 are focused by way of a cylindrical Lens 431 (see, e.g., FIG. 15), and when activated provide illumination through the optical window 178, allowing reading to be carried out by the optical reader scan head 161.

Turning now to FIGS. 4-A, 4-B and 4-C, in each of these figures is shown the optical reader assembly 160 positioned within a housing 187 of an optical reader unit 199. Although a greater amount of specific structural detail for the optical reader assembly 160 is shown in FIG. 3, operation of the optical reader unit 199 is more easily explained in relation to FIGS. 4-A, 4-B and 4-C. As shown in each of FIGS. 4-A, 4-B and 4-C, the door 169 of optical reader unit 199 is connected to the housing 187 by a hinge 182, which allows the door 169 to be manually swung open and shut. The front cover 168 of the optical reader assembly 160 (see FIG. 3) may be considered to comprise part of the housing 187, so the door 169 as it appears in FIGS. 4-A, 4-B and 4-C is manually accessible when attached directly to the front cover 168. A folding mirror 173 is attached to the inner surface of the door 169, and serves a purpose of creating a secondary depth-of-field zone as described in more detail below.

The door 169 is shown in its shut position in FIGS. 4-A and 4-B, while it is shown in its open position in FIG. 4-C. When the door 169 is shut, a ticket 170 may be inserted into a slot 184 located in the top of the housing 187 (see also FIG. 4-D). The ticket 170 may be inserted in the slot 184 manually by a trained operator at a point-of-sale, or else may be inserted by a patron or customer who has purchased the ticket 170. The ticket 170 is pulled through the slot 184 (at a rate of, e.g., 5" per second) by a drive roller 183, which is powered by a motor (not shown). The drive roller 183 pulls the ticket 170 through the region between the motor frame assembly 165 and the door 169, such that the ticket eventually passes over the optical window 175. After the front edge of the ticket 170 passes over the optical window 175, the ticket 170 is guided by a parabolically shaped ticket guide 181 through a slot 185 at the bottom of the door 169 (see FIG. 4-B). After the ticket 170 slides through the slot 185 and down the ticket guide 181, it may be manually retrieved from the optical reader unit 199.

The drive roller 183 and associated motor may be of any type or construction as conventionally known for automatically reading lottery style or other similar gaming tickets, and the details of such are considered well within the purview of those skilled in the art and unnecessary of further elaboration here. However, any other suitable means for moving or transporting tickets, documents or other items may also be employed in conjunction with the inventive concepts and features disclosed herein. The optical reader unit 199 may be provided with a ticket sensor which activates the motor, and hence the drive roller 183, only when a ticket is inserted, or else the drive roller 183 may be continuously active.

As the ticket 170 is inserted, it is automatically pulled by the drive roller 183 down through the slot 184 and across the optical window 175. As the ticket 170 first approaches the optical window 175, illumination from the LED array 166 reflects off the mirror 173 on the inner surface of the door 169 and illuminates the back of the ticket 170. At the same time, the optical reader scan head 161 is activated (if not already active), and commences reading along the optical path 190, which is, like the illumination from the LED array 166, bent by the folding mirror 173. The optical reader scan head 161 is thereby able to read information appearing on the back of the ticket 170.

In a preferred embodiment, the back of the ticket 170 is printed with a control symbol (e.g., a job control bar code) which, when decoded, instructs the optical reader scan head 161 as to how to (1) read, (2) decode, (3) move, or (4) otherwise handle/process the ticket 170. For example, the encoded instructions in the control symbol may instruct the optical reader about the format of the information on the front of the ticket 170. The optical reader scan head 161 may then configure itself, or employ a designated portion of its circuitry, to look specifically for the type of information and/or location which is expected to be read on the front of the ticket 170 when the front of the ticket 170 becomes visible along the optical path 190.

As the ticket 170 is pulled farther through the slot 184, it will eventually block out the view of the mirror 173 along the optical path 190 and prevent further reading of the back of the ticket 170. Thus, the optical reader scan head 161 preferably operates rapidly enough to read and decode the job control bar code or other information on the back of the ticket 170 before it becomes obscured. As the ticket 170 continues in its downward motion until it covers the optical window 175, illumination from the LED array 166 is reflected from the front of the ticket 170, and the light reflected thereby is received by the optical reader scan head 161 along the optical path 190. The optical reader scan head 161 reads the information on the front of the ticket 170 and decodes or interprets it according to the instructions specified by the job control bar code or symbol read from the back of the ticket 170.

Up to this point in the reading process, two distinct depth-of-field zones have been utilized by the optical reader unit 199. First, as the back of the ticket 170 is being read, the optical reader scan head 161 operates in an imaging zone generally having a mid-range depth of field, defined by the length of the optical path 190 from the optical reader scan head 161 to the mirror 173 and from the mirror 173 to the back of the ticket 170. Second, as the front of the ticket is being read, the optical reader scan head 161 operates in a different imaging zone having a closer depth of field (i.e., the primary depth-of-field zone), defined by the length of the optical path 190 from the optical reader scan head 161 to the front of the ticket 170 just beyond the optical window 175. At least two distinct depth-of-field zones, or imaging zones, are thus provided, and both of these imaging zones are internal to the optical reader unit 199.

In addition to the two above-described internal imaging zones, a third imaging zone, external to the optical reader unit 199, is also provided. The third imaging zone has a farther depth of field than the other first and second imaging zones, and may be described with respect to FIG. 4-C. FIG. 4-C is similar to FIGS. 4-A and 4-B, but shows the situation where the door 169 of the optical reader unit 199 is in an open position. When the door 169 of the optical reader unit 199 is open, the ticket 170 is not inserted into the slot 184 on the top of the optical reader unit 199, but instead may be manually held, swept or presented in front of the optical reader unit 199 such that the ticket 170 falls in the optical path 190 of the optical reader scan head 161. Light 191 from the LED array 166 is projected onto the ticket 170 as it is being manually held or swept in front of the optical reader unit 199, allowing the optical reader scan head 161 to view the optical markings, symbols or other characters on the ticket 170.

Details of the manner of reading the ticket are described later herein, with reference to the specific circuitry for scanning, processing and measuring optical features of the ticket or other item being scanned.

In one possible embodiment, a job control bar code (or other control symbol or similar information) is printed on the front of the ticket 170, instead of or in addition to a control symbol or the like appearing on the back of the ticket, and after being decoded controls the subsequent decoding and/or interpretation of later information read in a manner similar to described above. In another possible embodiment, the optical reader unit 199 is operated without use of a control symbol, job control bar code or similar information. In such an embodiment, the optical reader unit 199 does not first look for a job control bar code on the ticket. Not having advance knowledge of what information will next appear on the ticket 170, the optical reader unit 199 tests for several different types of data formats simultaneously, or in a prescribed sequence.

It will be appreciated that the optical reader unit 199 depicted in FIGS. 3, 4-A, 4-B and 4-C preferably provides multiple imaging zones which enable the apparatus to read tickets presented to the reading optics at different distances, thereby allowing both automated ticket reading and manual ticket reading. The optical reader unit 199 is also advantageously constructed so as to enable automatic reading of both the front and back of tickets inserted into the apparatus, preferably using the same reading mechanism for both sides. A further explanation of some of the features of a preferred optical reader unit 199 are described in more detail immediately below.

Figure 5:
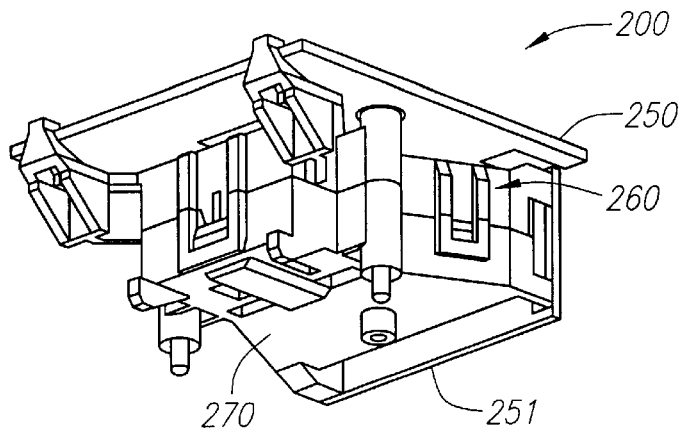
FIG. 5 is a diagram of a preferred scan head used in the optical reader of FIG. 3.
Figure 6:
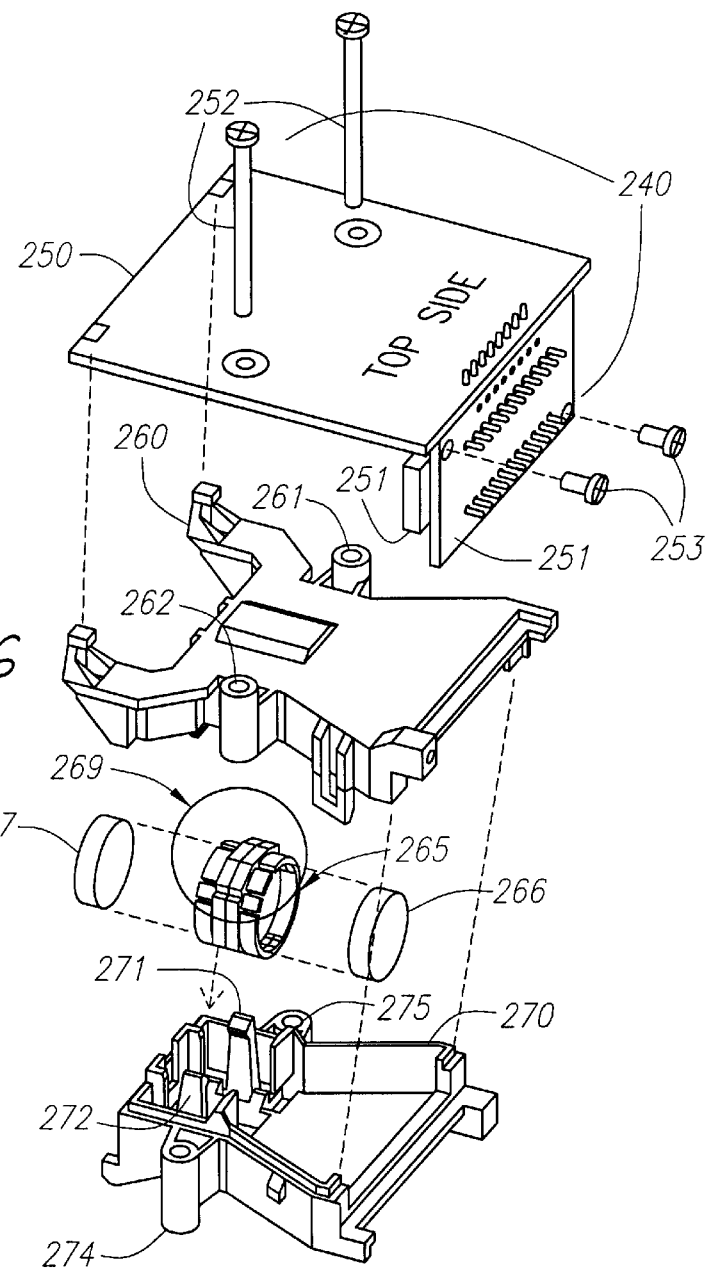
FIG. 6 is a diagram showing individual components of the scan head of FIG. 5.
Figure 7:
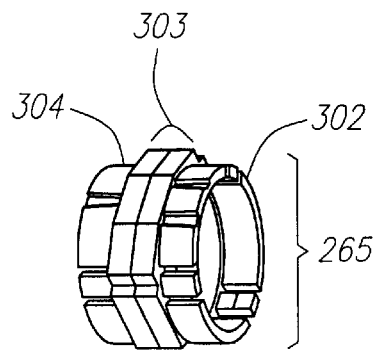
FIGS. 7 through 10 are diagrams showing details of the scan barrel of the scan head shown in FIG. 5.
Figure 8:
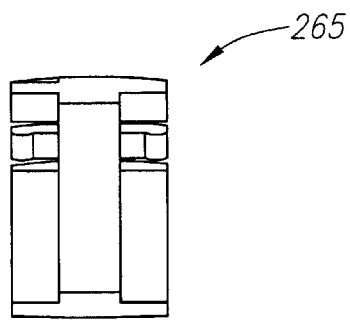
Figure 9:
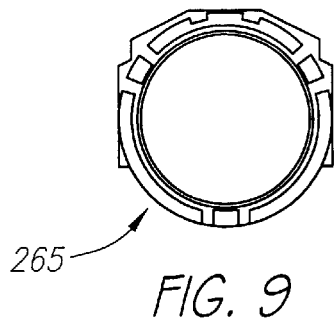
Figure 10:
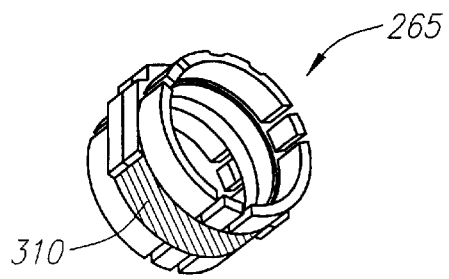
Figure 11:
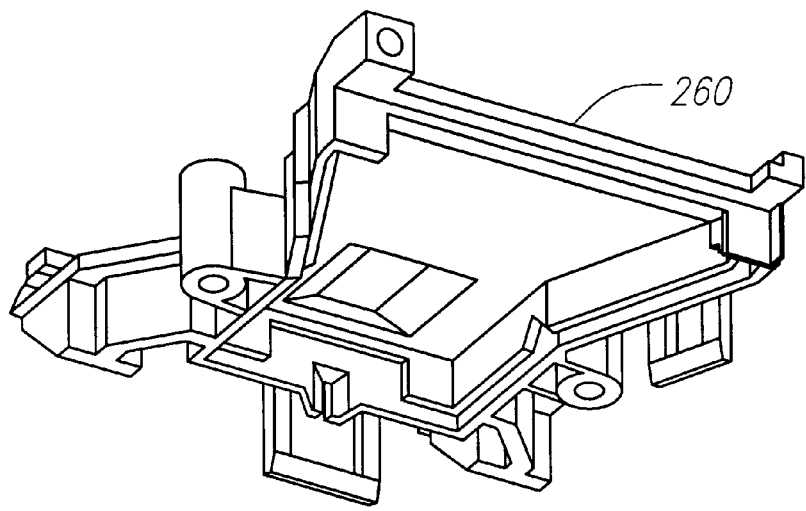
FIG. 11 is a diagram showing further details of the top portion of the scan head of FIG. 5.
Figure 12:
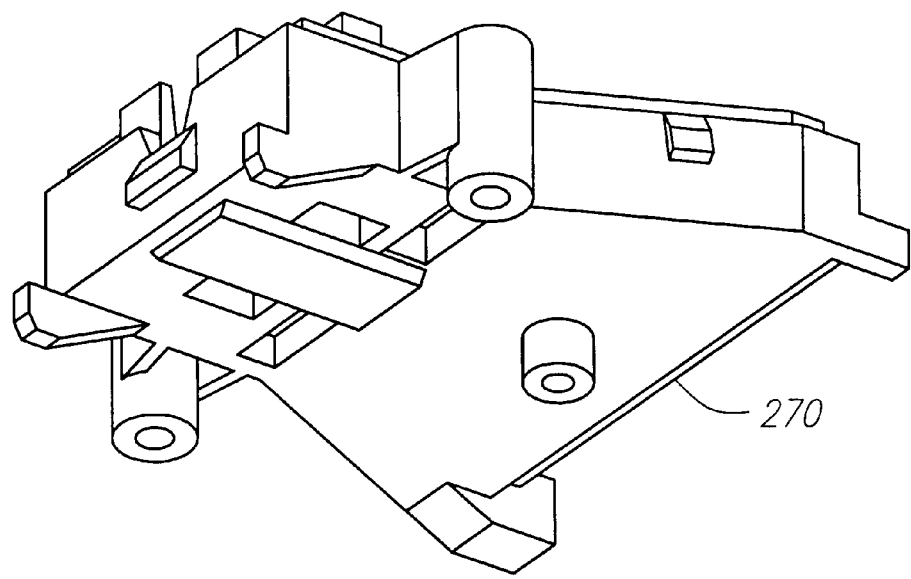
FIG. 12 is a diagram showing further details of the bottom portion of the scan head of FIG. 5.

FIGS. 5 and 6 are diagrams of a preferred optical reader scan head 200 (shown in block form in FIG. 3 as optical reader scan head 161) used in the optical reader unit 199, with FIG. 6 showing details of preferred individual components used in the optical reader scan head 200. FIGS. 11 and 12 also depict the scan head upper frame 260 and scan head lower frame 270, but from different views than those provided in FIGS. 5 and 6.

As shown in FIGS. 5 and 6, the optical reader scan head 200 comprises a scan head upper frame 260 connected to a scan head lower frame 270 so as to form an enclosed hollow in which a scan barrel 265 is positioned. The scan barrel 265 is inserted into a cradle comprised of two pliable members 271, 272. Inserted at the ends of the scan barrel 265 are focusing lenses 266 and 267, which focus light along the optical path 190 as illustrated in FIG. 3. Further details of the scan head upper frame 260 and scan head lower frame 270 are depicted in FIGS. 11 and 12.

In the preferred embodiment shown in FIGS. 5 and 6, a controller circuit board 250 is mounted atop the scan head upper frame 260. A CCD circuit board 251 is positioned perpendicularly with respect to the controller circuit board 250. A CCD chip 255 is mounted on the CCD circuit board 251, such that when the optical reader scan head 200 is assembled, light collected through the scan barrel 265 is focused by lenses 266 and 267 onto the photosensitive portions of the CCD chip 255. The light collected by the CCD chip 255 is converted into an electrical signal and processed as described further herein. The scan head upper frame 260 and scan head lower frame 270 snap together, and a pair of screws 253 fasten the circuit board assembly (i.e., controller circuit board 250 and CCD circuit board 251). Flathead screws 252 or other suitable means, through molded sleeves 261, 262 in the scan head upper frame 260 and molded sleeves 274, 275 in the scan head lower frame 270, fasten the optical reader scan head 200 to the mounting surface 163 of the optical reader assembly 160 (see FIG. 3).

Figure 13:
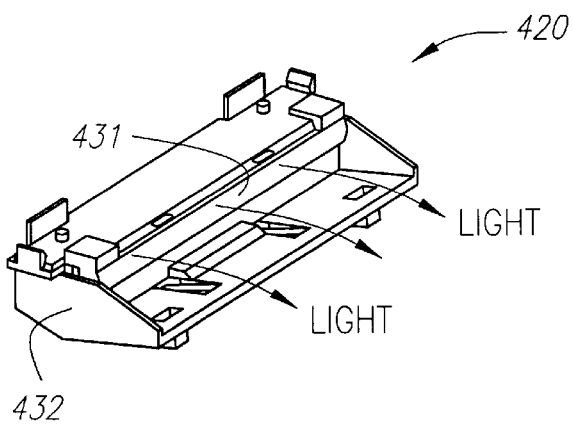
FIGS. 13 through 16 are diagrams of an LED array that can be used with the scan head of FIG. 5.
Figure 14:
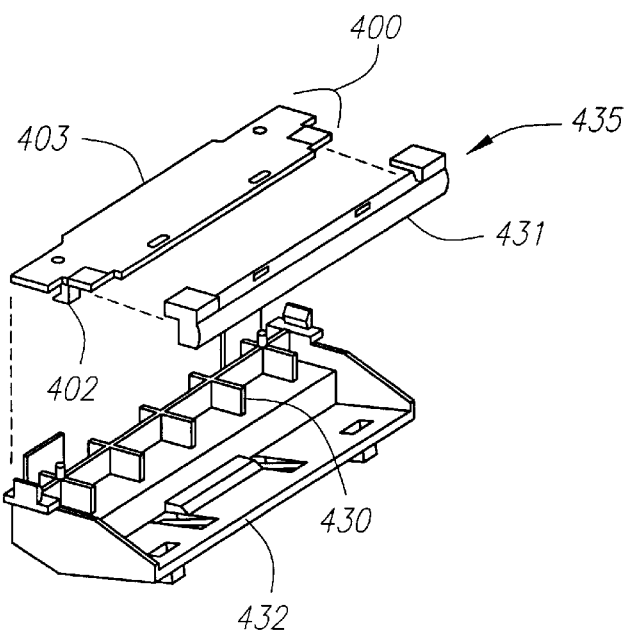
Figure 15:
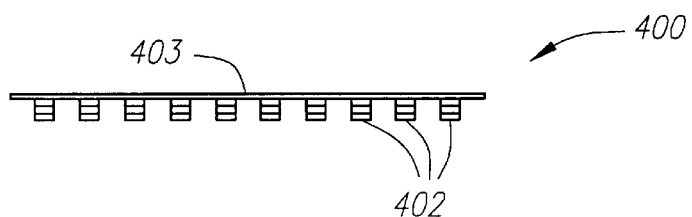
Figure 16:
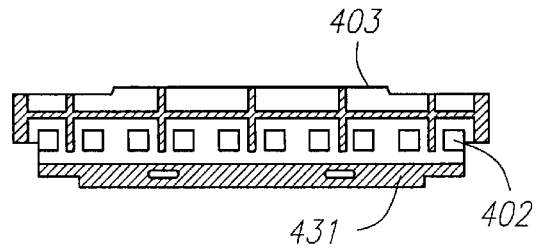

FIGS. 7 through 10 are diagrams showing details and preferred dimensions of the scan barrel of the optical reader scan head 200 shown in FIGS. 5 and 6. The scan barrel 265 comprises a two outer annular rings 302, 304 surrounding a central hollow polygon member 303. The size and shape of the scan barrel 265, in the embodiment shown, is particularly suited to be used in the SciScan lottery ticket reader models mentioned earlier herein. The scan barrel 265 includes 5 notches or slots 312, 313 for holding the lenses 266, 267 (see FIG. 6) in place. Lenses 266, 267 preferably provide a focal length of approximately 24.0 millimeters, and a total depth of field spanning from about six to eleven inches from the face of the photosensor. 10 FIGS. 13 through 16 are diagrams of a preferred LED array assembly 420, and its constituent components, that can be used to provide illumination for the optical reader unit 199 of FIG. 3. The LED array assembly 420 is depicted as LED array 166 in FIG. 3. In FIG. 15 is shown an LED circuit board assembly 400 comprising an LED circuit board 403 to which is connected an array of evenly spaced LEDs 402. The LED circuit board assembly 400 is mounted atop an LED circuit board mounting frame 432, as depicted in FIG. 14, for example. The light from the LEDs 402 may be focused using a suitable lens or set of lens elements, such as cylinder lens 431 connected to the LED circuit board assembly 400. FIG. 16 shows a bottom view of the LED circuit board 403, illustrating the relative location of the LEDs 402 and the cylinder lens 431 in a preferred embodiment. The cylinder lens 431 is preferably fabricated (e.g., with the proper shape and/or polarity) so as to obtain the desired range and perfusion of illumination.

For example, the cylinder lens 431 may be fabricated so as to provide wide angle illumination (approximately 1200 or so) along an appropriate illumination path such that a ticket or other indicia-bearing objects/documents are adequately illuminated in any of the three depth-of-field zones described in connection with FIGS. 4-A, 4-B and 4-C, without having to move or adjust the LED array assembly 420. The amount of divergence (i.e., width of the illumination beam output by the array of LEDs 402) may affect, among other things, the length and width of the third (farthest) depth-of-field zone--in other words, the operative depth-of-field zone when the door 169 of the optical reader unit 199 is in an open position. Generally, the wider the divergence of Light from the LEDs 402, the shorter the third depth-of-field zone will be.

Those skilled in the art will understand that many alternative configurations for the LED array 166 used in optical reader unit 199 are possible and will be suitable for use in conjunction with the invention and embodiments described herein.

Figure 17:
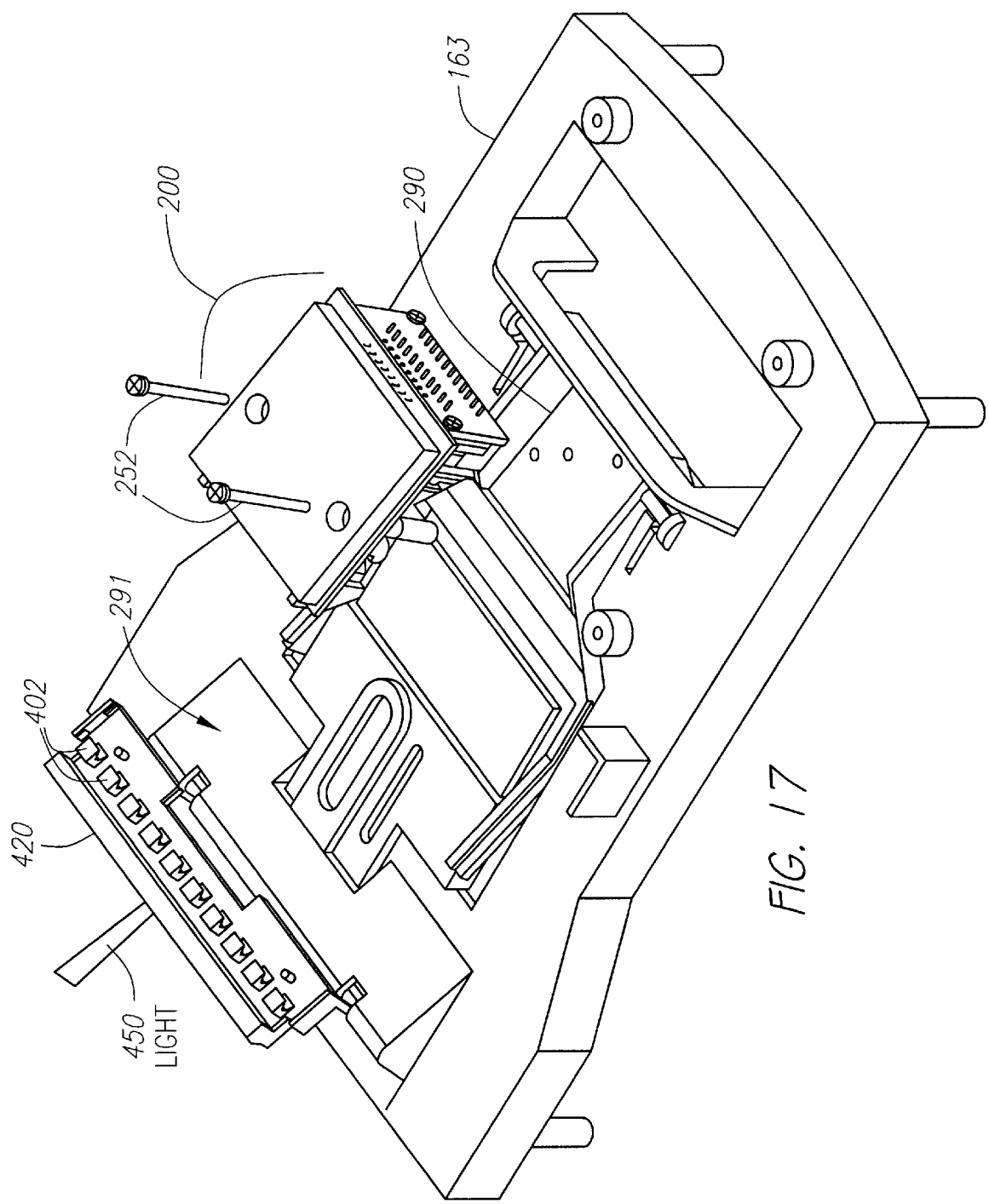
FIGS. 17 and 18 are structural diagrams illustrating the placement of the scan head of FIG. 5 with respect to a mounting surface.
Figure 18:
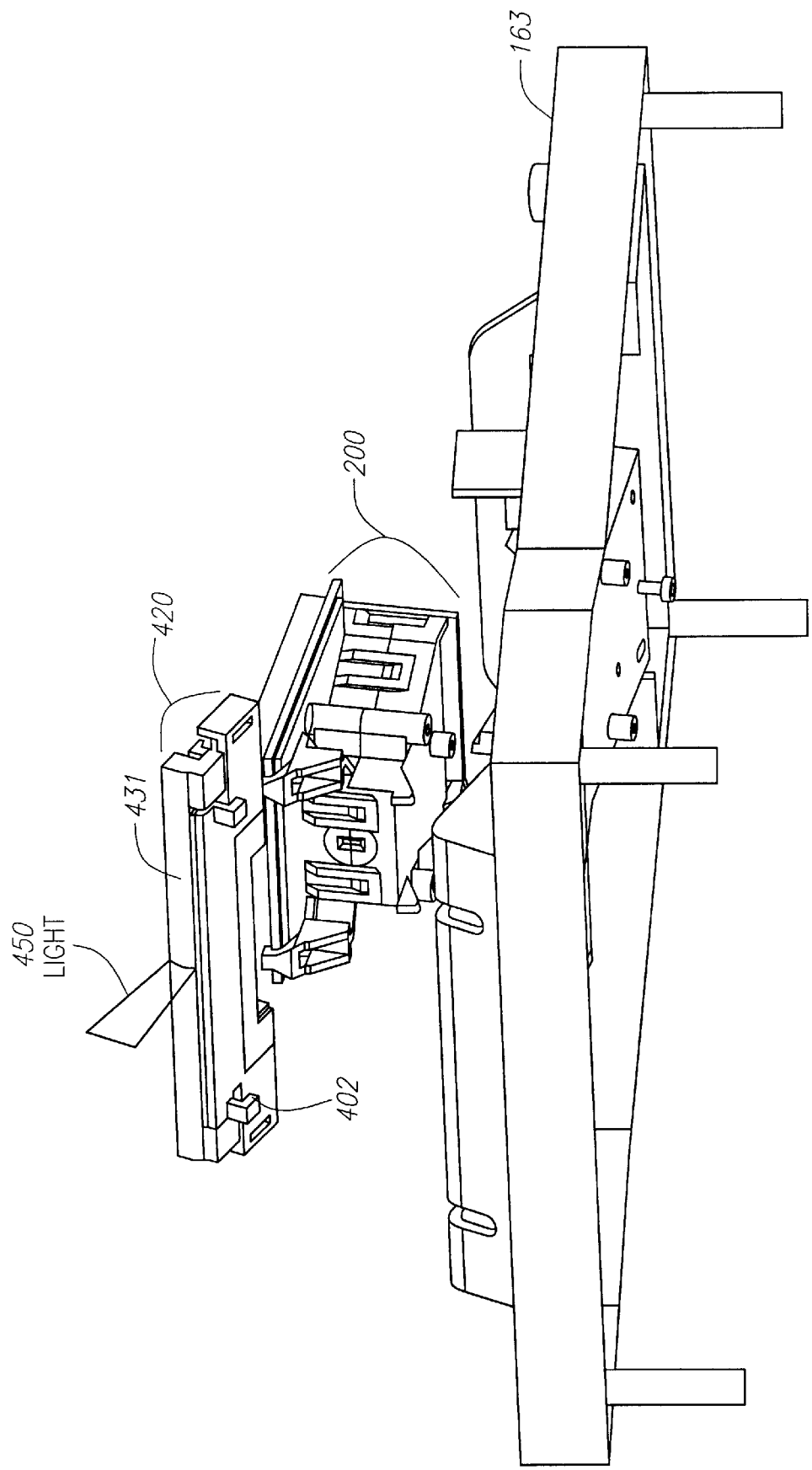

Further structural and mounting details of the optical reader unit 199 are depicted in FIGS. 17 and 18. In FIG. 17 is shown the optical reader scan head 200 of FIG. 5 above a scan head molded surface pad 290 on which it is to be mounted, atop the mounting surface 163. Likewise, the LED array assembly 420 of FIG. 13 is depicted above an LED array molded surface pad 291 on which it is to be mounted, atop the mounting surface 163. FIG. 17 also illustrates the general direction of light 450 which emanates from the LEDs 402 of the LED array assembly 420. FIG. 18 similarly illustrates, from a different angle, the placement of the optical reader scan head 200 and LED array assembly 420 on the mounting surface 163 of the optical reader unit 199.

Figure 19:
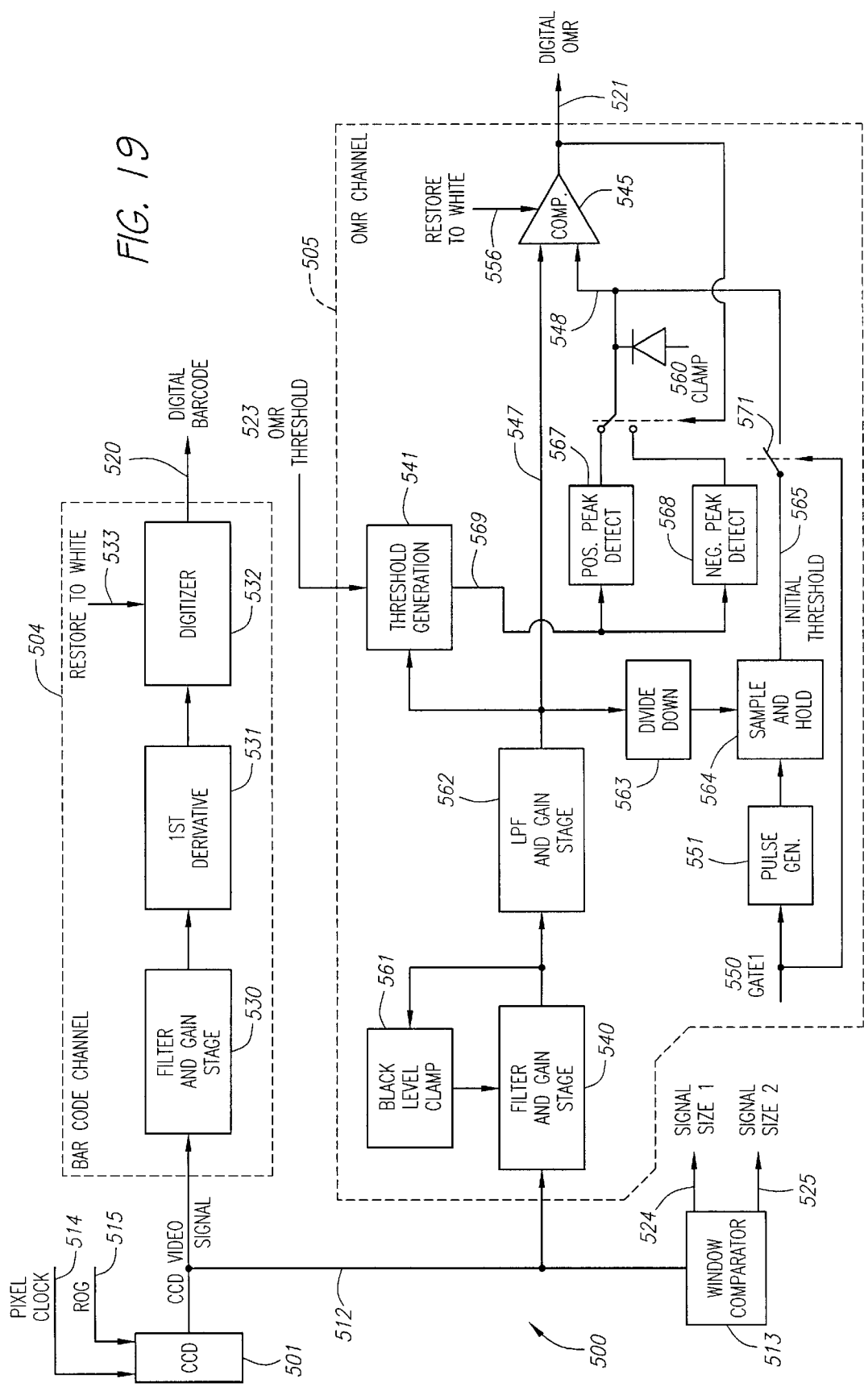
FIG. 19 is a block diagram of a preferred embodiment of the conditioning and processing circuitry for reading both bar code and optical mark information as may be used in the optical reader of FIG. 2.
Figure 20:
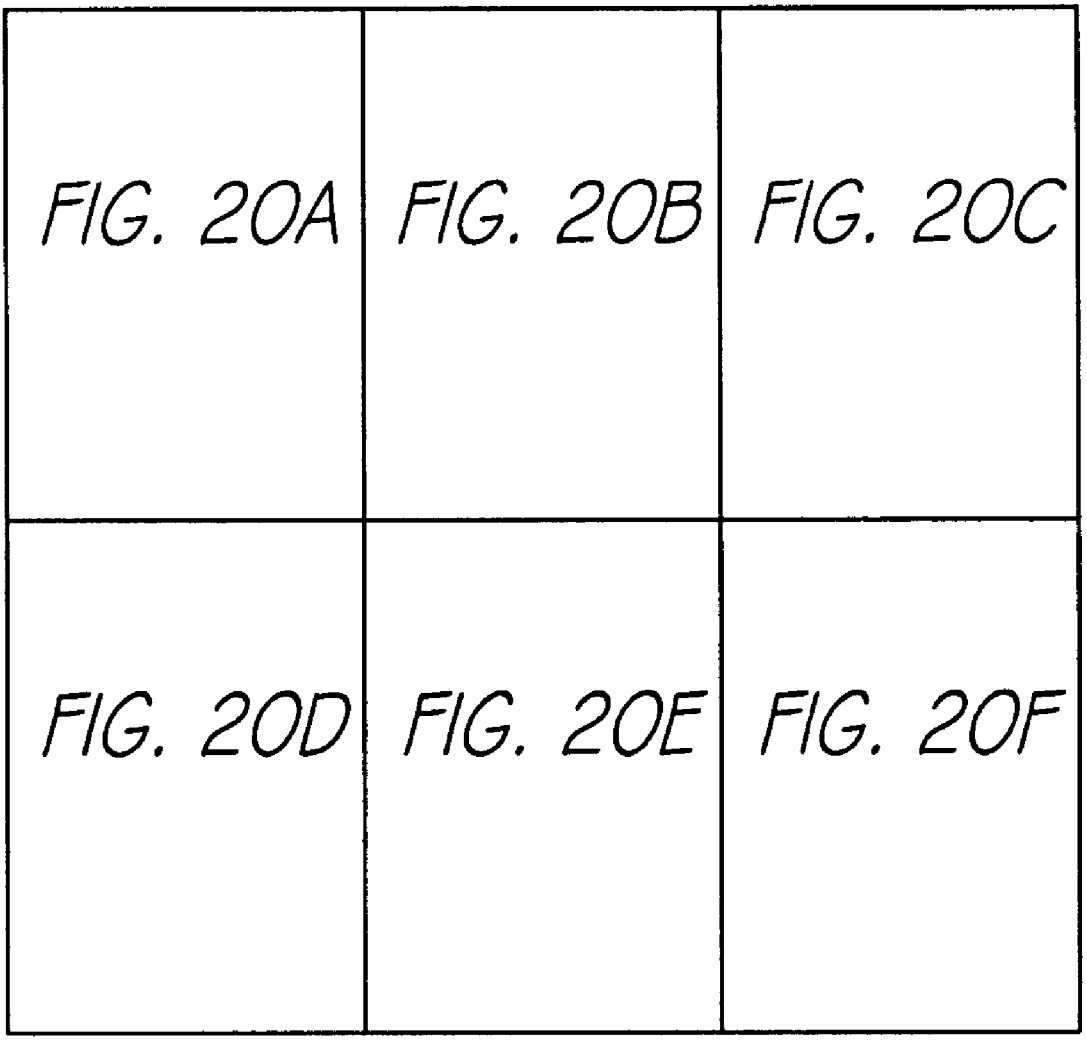
FIG. 20 is a more detailed diagram of a preferred electrical schematic of conditioning circuitry for reading both bar code and optical mark information.
Figure 20A:
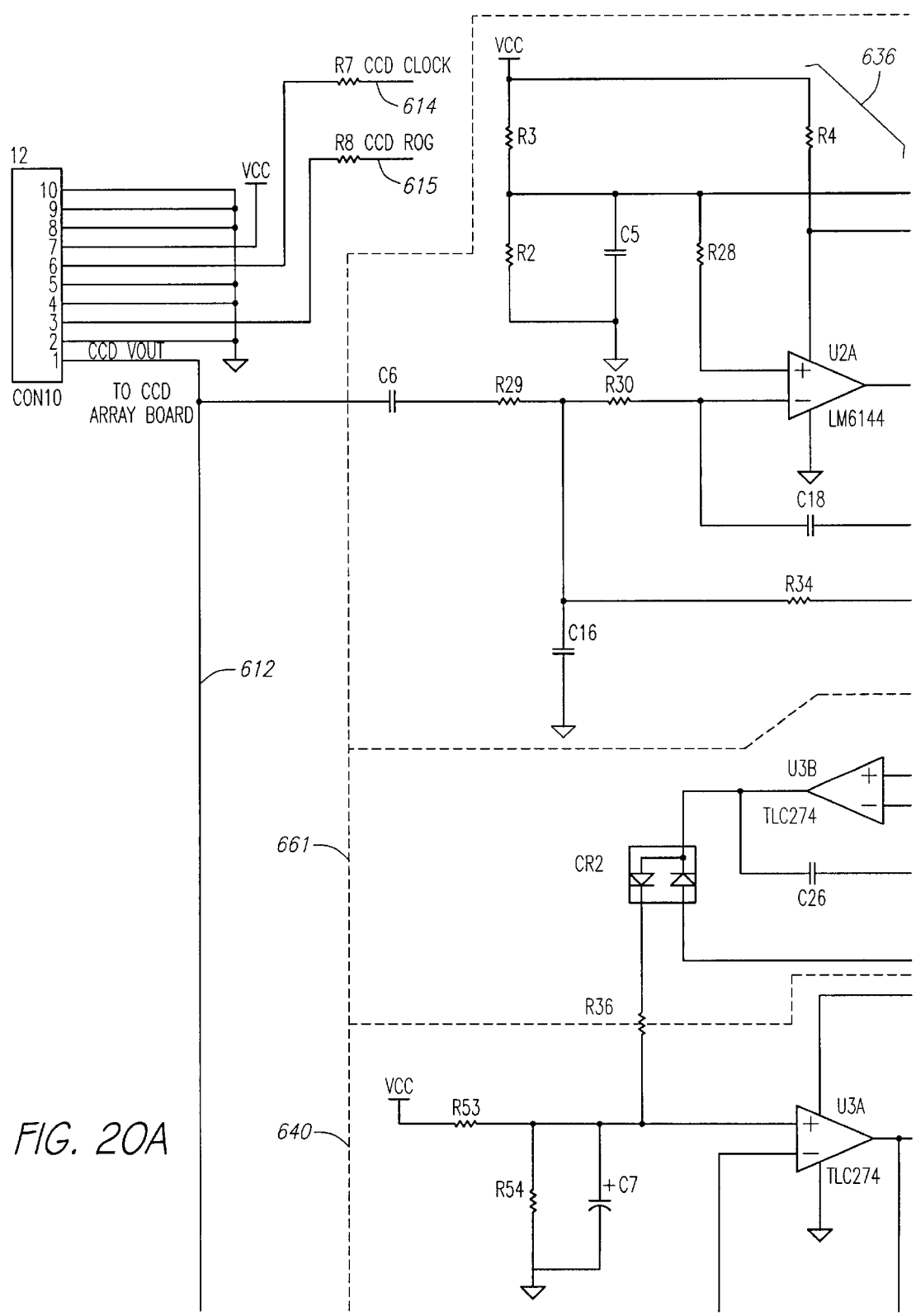
Figure 20B:
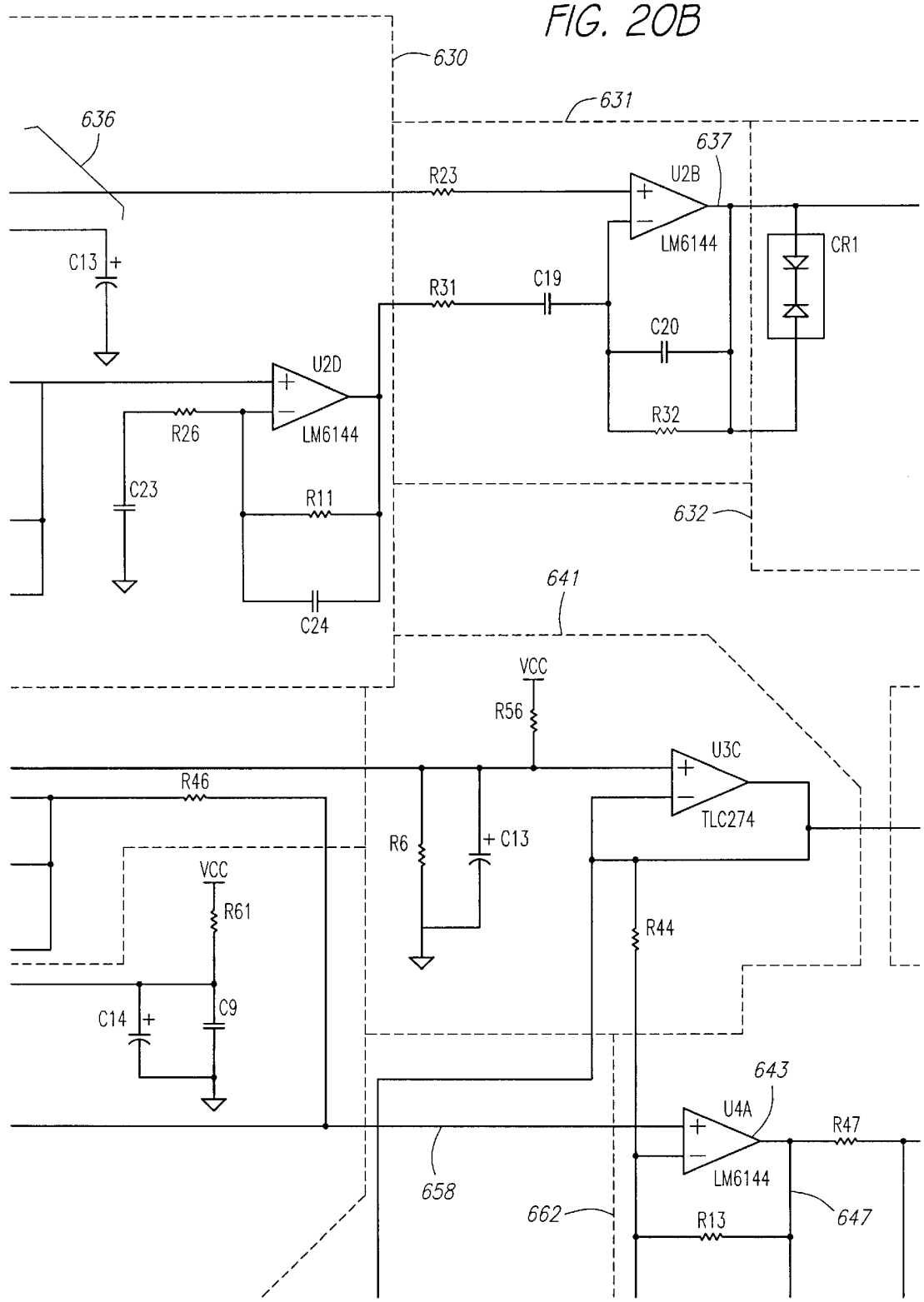
Figure 20D:
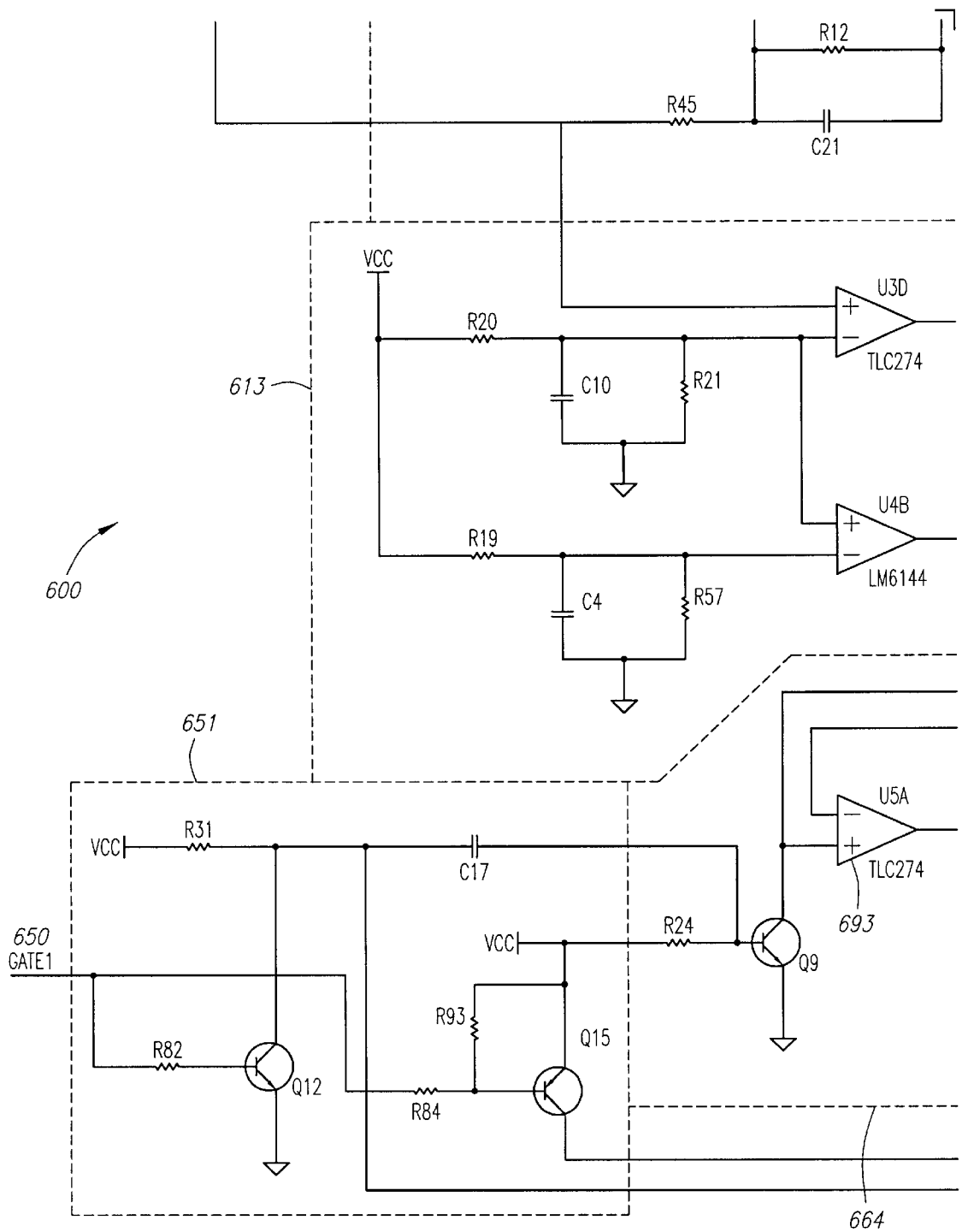
Figure 20E:
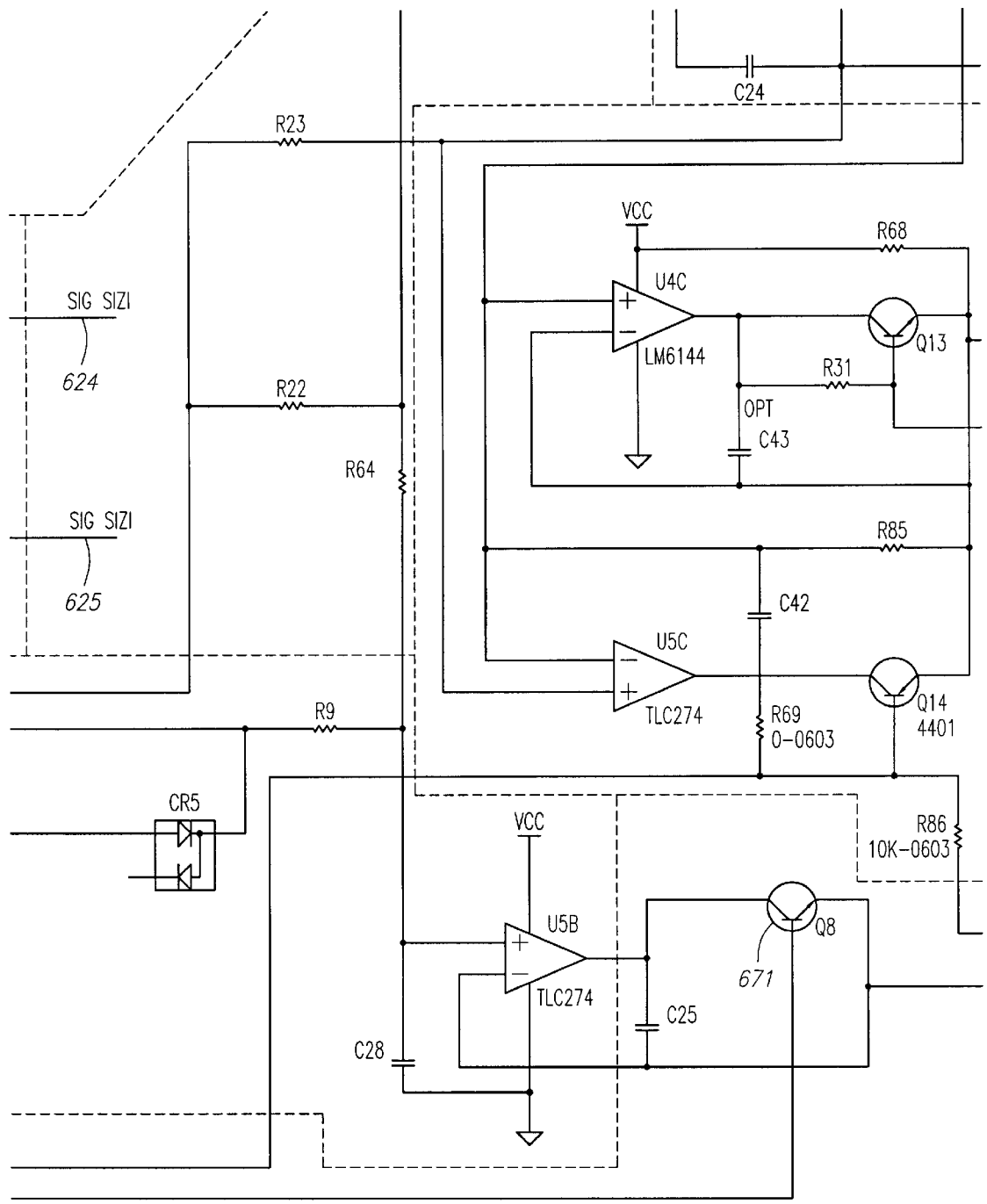
Figure 20F:
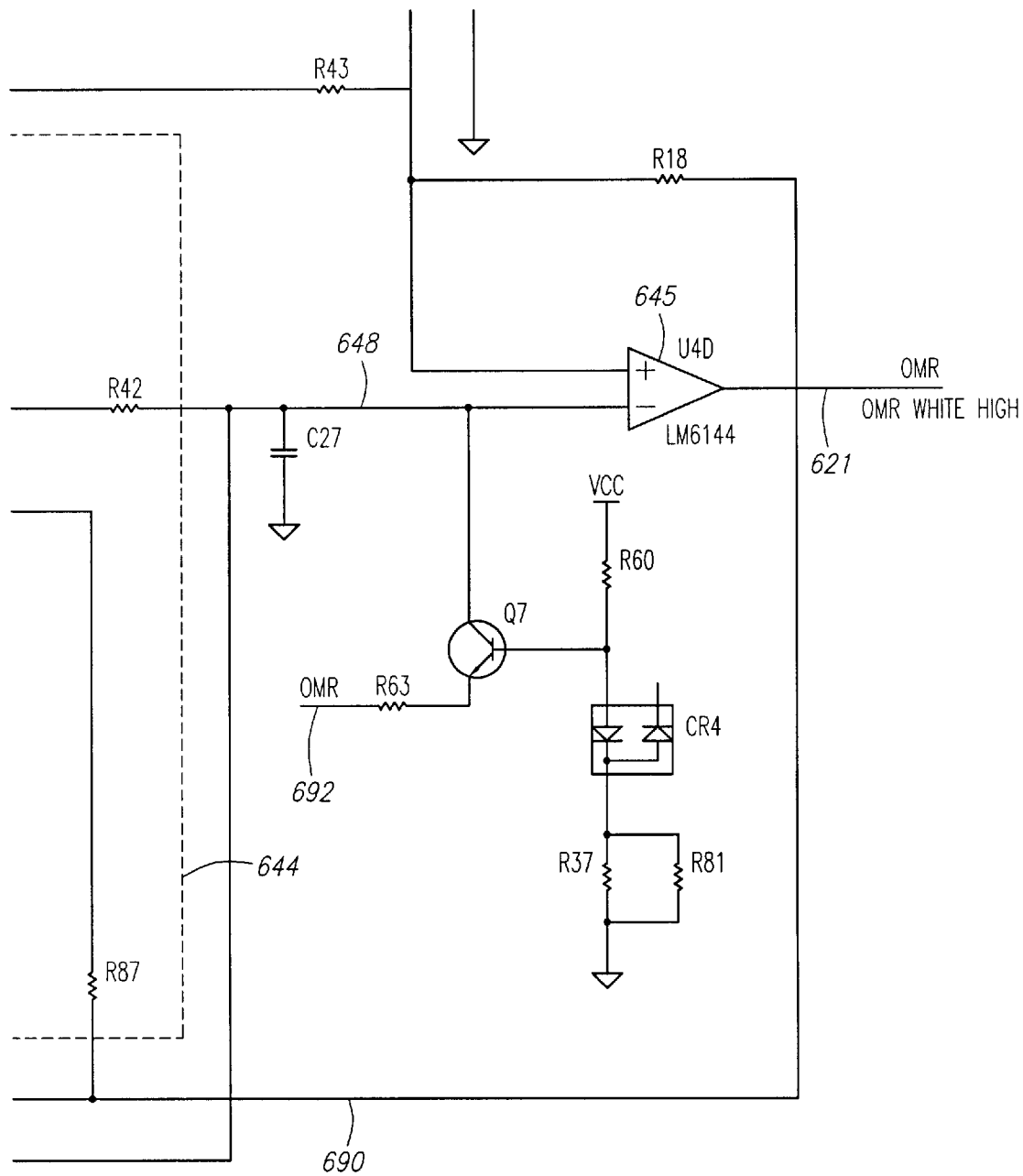

FIGS. 19 and 20 illustrate further details of preferred conditioning and processing circuitry for reading both bar code and optical mark information. FIG. 19 is a block diagram of a preferred signal conditioner and processor 500 (corresponding to signal conditioning and processing block 103 of FIG. 2), while FIG. 20 is a more detailed electrical schematic diagram of a separate embodiment of signal conditioning and processing circuitry incorporating aspects of the structure and principles of the block diagram of FIG. 19.

As shown in FIG. 19, a signal conditioner and processor 500 preferably comprises two processing channels, a bar code processing channel 504 and an OMR processing channel 505. In such an embodiment, both the bar code processing channel 504 and the OMR processing channel 505 are connected so as to receive a CCD video signal 512 output from a CCD sensor 501 (which may be a linear or a two-dimensional CCD sensor, but in a presently preferred embodiment constitutes a linear CCD sensor having roughly 2000 pixels, such as a model ILX511 chip manufactured by Sony Corp.). The bar code processing channel 504 performs the general function of detecting transitions between lighter and darker portions (e.g., bars and spaces) of a bar code or other indicia as appearing in the CCD video signal 512, and generating a digital bar code signal 520 which changes binary states when such transitions are detected. The OMR processing channel 505 performs the general function of detecting transitions between lighter background portions and darker marked portions of a marked object (e.g., ticket, form, document or other object bearing markings capable of being optically read and interpreted), and generating a digital OMR signal 521 which changes binary states when such transitions are detected. Both the digital bar code signal 520 and the digital OMR signal 521 are output to a controller and/or decoder for further processing, as described herein, for example, with respect to FIG. 2.

In more detail, the CCD sensor 501 receives input signals which control its operation, specifically a pixel clock signal 514 and a read-out-gate (ROG) signal 515. Further details regarding these signals are described with respect to the controller embodiment(s) of FIGS. 21 and 22A through M below. The CCD sensor 501 collects light over an exposure period at each of its photosensitive cells (i.e., pixels). When the read-out-gate (ROG) signal 515 is activated, the charge stored in the CCD pixels is serially read out under control of the pixel clock signal 514 so as to form a serial CCD video signal 512, in a manner well known in the art. The CCD video signal 512 contains a population of signal peaks corresponding to relatively darker portions of the target line being scanned, and a population of signal valleys corresponding to relatively lighter portions of the target line being scanned.

If the line being scanned includes a bar code, then the CCD video signal 512 will contain, over some segment, a population of signal peaks corresponding to the dark bars of the bar code, and a population of signal valleys corresponding to the white spaces of the bar code. If the line being scanned includes an optical mark (typically a shaded box, pencil marking or the like on a white background), then the CCD video signal 512 will contain signal valleys corresponding to the white or lighter background portions of the ticket or document being scanned along the scan line, and signal peaks corresponding to the shaded or darker markings.

One significant different between bar code data and optical mark data is in the size of the features to be read. The size of features for conventional bar codes tends to average in the range of approximately 10 mils (i.e., thousands of an inch), while the size of optical marks varies considerably, from about 20 mils, for example, for a pencil marking to about 150 mils, for example, for a shaded box or the like. Also, a bar code tends to have a relatively large number of bars and spaces occurring in immediate sequence, whereas relatively few optical marks generally tend to appear on a given line. Because of these differences, among others, different signal processing circuitry is preferably used to handle bar code data versus OMR data. In a preferred embodiment, the circuitry of the bar code channel 504 is specially adapted to handle the expected feature size and scanning speed for bar codes or other similar symbols, and the circuitry of the OMR channel 505 is specially adapted to handle the expected feature size and scanning speed for optical markings.

In a preferred embodiment, the controller 102 (see FIG. 2) selects between a plurality of reading modes, such as a bar code scanning mode and an OMR scanning mode. This mode selection may be accomplished by, for example, initial reading of a control symbol or job control bar code, or by manual selection (e.g., using a switch or keyboard input), or by any other suitable means. The operation of the optical reader may be adjusted based upon the selected mode and possibly other criteria. For example, in a preferred embodiment, the scan rate and exposure time of the CCD sensor 501 may be adjusted dynamically under certain circumstances, as explained in more detail below. Also, the processing and formatting of the CCD video data will differ depending upon whether the optical reader is in a bar code scanning mode or an OMR scanning mode, as further detailed below.

The particular scan rate selected for the CCD sensor 501 may depend, in part, on the speed of motion of the ticket or other object to be read, as well as the ambient light conditions. A typical speed of motion for an optical reader used in present-day lottery card reading applications is about 5" per second. Using this speed as an illustrative speed of motion of the ticket or other object to be read, a suitable scan rate for the OMR scanning mode would be about 1000 scans per second, while for the bar code scanning mode would be about 250 scans per second when in a "normal" mode—that is, reading in either of the two closer depth-of-field zones described with respect to FIGS. 4-A and 4-B. When reading in either of these two closer depth-of-field zones, the door 169 of the optical reading unit 199 is in a closed position, which limits the amount of external light which is present. Therefore, a relatively controlled and stable ambient light environment is presented when the door 169 is closed and scanning occurs in either of the two closer depth-of-field zones.

When reading in the farthest of the three depth-of-field zones, however, such as shown in and described with respect to FIG. 4-C, the door 169 of the optical reading unit 199 is in an open position. Consequently, the ticket 170 or other object being read may be illuminated not only by light from the LED array 166 but also by a potentially variable amount of ambient light. Too much light can cause the CCD sensor 501 to become saturated and prevent the reading of useful information. Because the light can vary significantly depending on ambient light conditions, it may be advantageous to control the exposure time of the CCD sensor 501 adaptively.

For example, the exposure time of the CCD sensor 501 can be controlled by way of a feedback circuit which monitors the amount of ambient light. Such a feedback circuit generally shortens the exposure time of the CCD sensor 501 when more light is present, and lengthens the exposure time of the CCD sensor 501 when less light is present. As noted previously herein, adaptive exposure control circuits which are suitable for performing this function are described in copending U.S. patent application Ser. Nos. 08/576,203 and 08/697,408, each of which has been previously incorporated by reference as if set forth fully herein.

In a preferred embodiment, saturation of the CCD sensor 501 is avoided by changing the scan rate adaptively when the size of the CCD video signal 512 is too large, indicating a saturation condition has occurred. One or more CCD signal strength threshold levels may be used in this adaptive exposure technique. If a single CCD signal strength threshold is used, then whenever the CCD video signal 512 (or a filtered or averaged version thereof) passes the CCD signal strength threshold during any part of a scan, the next scan is carried out at a higher scan rate (e.g., a rate of 1000 scans/second, as opposed to 250 scans/second). If the CCD video signal 512 is such that it becomes increasingly lower in amplitude with increasing light intensity, then the CCD signal strength threshold will be passed when the CCD video signal 512 falls below the threshold level, indicating that the light intensity has caused a saturation condition.

Alternatively, two CCD signal strength thresholds are used for adaptive exposure control, as illustrated in the embodiment shown in FIG. 19. There, a window comparator 513 is used to monitor the CCD video signal 512 and output information indicating the relative signal size of the CCD video signal 512, specifically in the form of two signals designated signal-size-1 524 and signal-size-2 525. Preferably, the CCD sensor 501 is operated with an exposure period such that the CCD video signal 512 is within the "window" defined by the window comparator 513. If the CCD video signal 512 strays either above or below the "window" defined by the window comparator 513, then the exposure time of the CCD sensor 501 is adjusted accordingly. If the output of the window comparator 513 indicates that the CCD sensor 501 is operating in saturation, the scan rate of the CCD sensor 501 may be increased (e.g., to 1000 scans/second from 250 scans/second), thereby effectively reducing the exposure time. If the output of the window comparator 513 indicates that the CCD sensor 501 is no longer operating in saturation, then the scan rate of the CCD sensor 501 may be returned to its normal setting (e.g., 250 scans/second).

For a constant scan rate of 250 scans/second, the exposure time of the CCD sensor 501 is 4 milliseconds, and data from the CCD sensor 501 is likewise read out every 4 milliseconds. When the scan rate is increased to 1000 scans/second, the exposure time of the CCD sensor 501 will be reduced to 1 millisecond. In a preferred embodiment of the optical reader in which the scan rate is selectively adjusted between high and low rates, the read-out period for the CCD sensor 501 is preferably maintained at 4 milliseconds regardless of the variance in exposure time, so as to maintain the data from the incoming CCD video signal 512 within the bandwidth of the optical reader circuitry, particularly the signal conditioning and processing circuitry shown in FIG. 19.

To accomplish this, the controller 102 (see FIG. 2) preferably toggles the scan rate between 1000 scans/second and 250 scans/second when in a "saturation" mode, using the faster scan rate to control exposure time and the slower scan rate for reading out the CCD video data in the subsequent scan frame. The CCD video data is therefore discarded every other scan frame, which leads to useful scan frame data every 5 milliseconds when in the saturation mode (one fast scan frame for exposing the CCD sensor followed by one slow scan frame for reading out the CCD video data), instead of every 4 milliseconds as would be the case in the non-saturation mode. Further details and description of a preferred window comparator 513 and controller circuitry for accomplishing this operation appears later herein with respect to FIGS. 20, 21 and 22A through M.

As an alternative to using adaptive exposure control for the CCD sensor 501, the exposure time of the CCD sensor 501 can also be adjusted by use of an electronic shutter which is opened during a time period for exposing the photosensitive cells of the CCD sensor 501, and closed during the remaining scan time. Such an electronic shutter may be controlled by the controller 102 (see FIG. 2) using an optional control signal (i.e., SHUT 115). Although an electronic shutter may have preferred qualities for some applications, it may have undesirable speed constraints in certain applications (for example, electronic shutters are generally limited to a scan rate of 500 scans per second), so that at high bandwidths such as supported by the preferred embodiment(s), the aforementioned techniques for adaptive exposure control by changing the scan rate or otherwise altering the exposure period may be preferred.

When operating in the bar code scanning mode, the CCD video signal 512 is processed by the bar code channel 504. The bar code channel 504 primarily comprises a filter and gain stage 530, a first derivative circuit 531, and a digitizer 532. In operation, the CCD video signal 512 is filtered and amplified by the filter and gain stage 530. The filter and gain stage 530 advantageously filters out undesired signal features such as high frequency noise. A preferred filter and gain stage 530 comprises at least one low pass filter, such as a second-order Butterworth filter, or any other filter of suitable configuration. The cut-off frequency for a low pass filter of the filter and gain stage 530 is preferably in the general range of 200 kHz.

The filter and gain stage 530 is connected to the first derivative circuit 531, which generates the first derivative of the filtered/amplified CCD video signal. The first derivative circuit 531 is connected to the digitizer 532, which detects peaks and valleys in the first derivative of the filtered/amplified CCD video signal, and outputs a digital bar code signal 520 which switches states each time such a signal peak or valley is detected. The digital bar code signal 520 thereby comprises a binary signal that transitions between high and low states corresponding to transitions between relatively lighter and darker portions of the target line being scanned.

Alternatively, other methods may be used for detecting transitions in the CCD video signal 512, including various analog or time-sampled second-derivative techniques such as described, for example, in U.S. Pat. Nos. 5,463,211 or 4,000,397, each of which is assigned to the assignee of the present invention, and each of which is hereby incorporated by reference as if set forth fully herein.

As an additional feature of the bar code processing channel 504, a restore-to-white signal 533 may be received from the controller 102 (see FIG. 2), which has the effect of placing the digital bar code signal 520 in a known state at the start of a scan line. For example, the output of the digital bar code signal 520 may be reset by the controller 102, via the restore-to-white signal 533, to white (e.g., a "high" binary state) at the start of a scan line.

A preferred signal processing and conditioning circuit 600 is shown in FIG. 20 incorporating a variety of the principles and features of the embodiment shown in FIG. 19, including principles and features of the bar code processing channel 504 shown in FIG. 19.

As shown in FIG. 20, a CCD video signal 612 output from the CCD sensor is connected to a filter and gain stage 630, which comprises, among other things, a second-order low pass filter 636 of the Butterworth variety employing operational amplifier U2A. The filter and gain stage 630 also comprises a second low pass filter 635 employing operational amplifier U2D. The filter and gain stage 630 is connected to a first derivative circuit 631, which essentially comprises a differentiator circuit of conventional configuration. The first derivative circuit 631 is connected to a digitizer 632, which detects peaks and valleys in the first derivative signal 637 and, therefore, edge transitions in the CCD video signal 612. As shown in FIG. 20, the digitizer 632 comprises a fast-decay peak detector comprising a resistor R6 and a capacitor C15 which briefly holds the peak amplitude value of the first derivative signal 637, and a comparator 634 which compares the briefly held first derivative signal peak against the first derivative signal 637. Accordingly, when the first derivative signal 637 has a signal peak or valley, the first derivative signal 637 crosses with the amplitude value briefly held by the fast-decay peak detector, causing the comparator 634 to switch output states. The output of comparator 634 is the digital bar code signal 620.

A restore-to-white (RES W) signal 635 restores the comparator 634 to a known binary level (in this embodiment, a high output signal level). The RES W signal 635 controls a transistor Q1, which when activated pulls the negative input of the comparator 634 low, and also drains the remaining charge from capacitor C15 of the fast-decay peak detector.

Figure 25A:
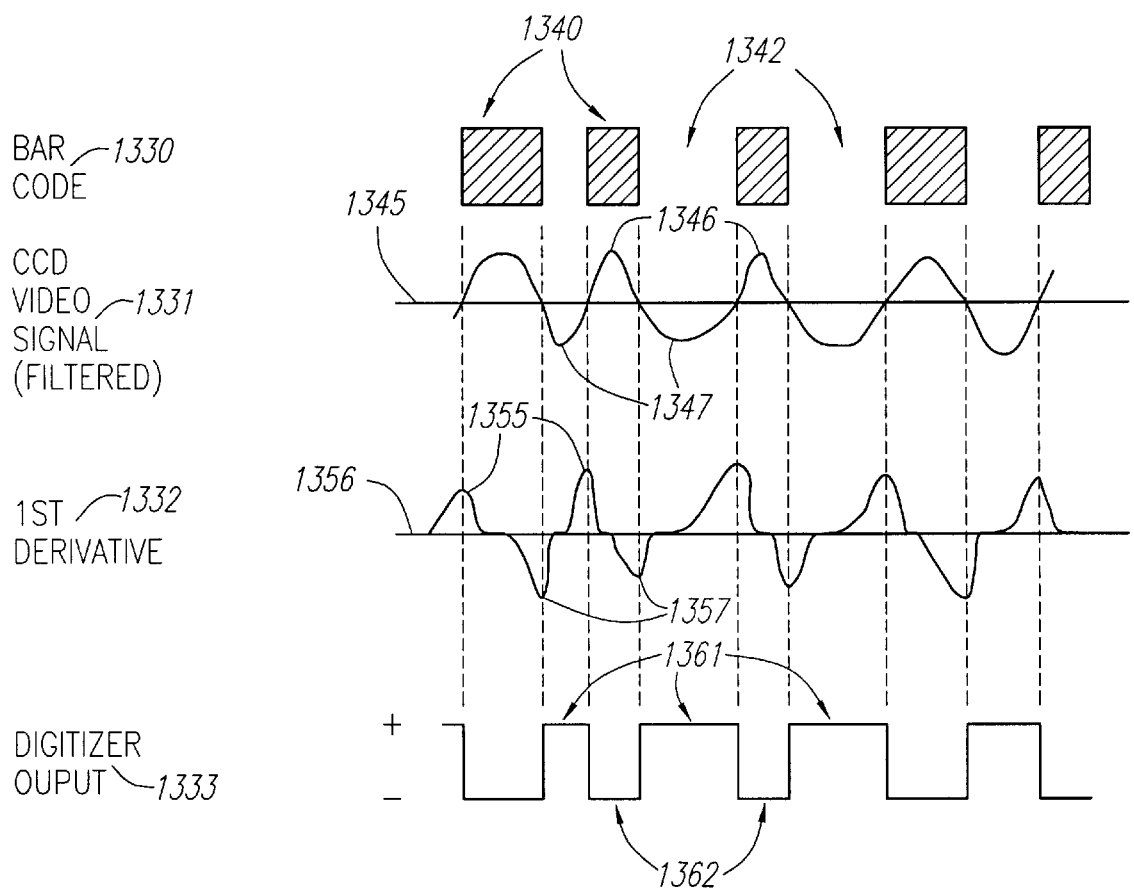
FIG. 25-A is a timing diagram illustrating signal waveforms associated with the operation of the bar code channel processing circuitry of FIG. 20, and FIGS. 25-B and 25-C are a timing diagrams illustrating signal waveforms associated with the operation of the OMR channel processing circuitry of FIG. 20.
Figure 25B:
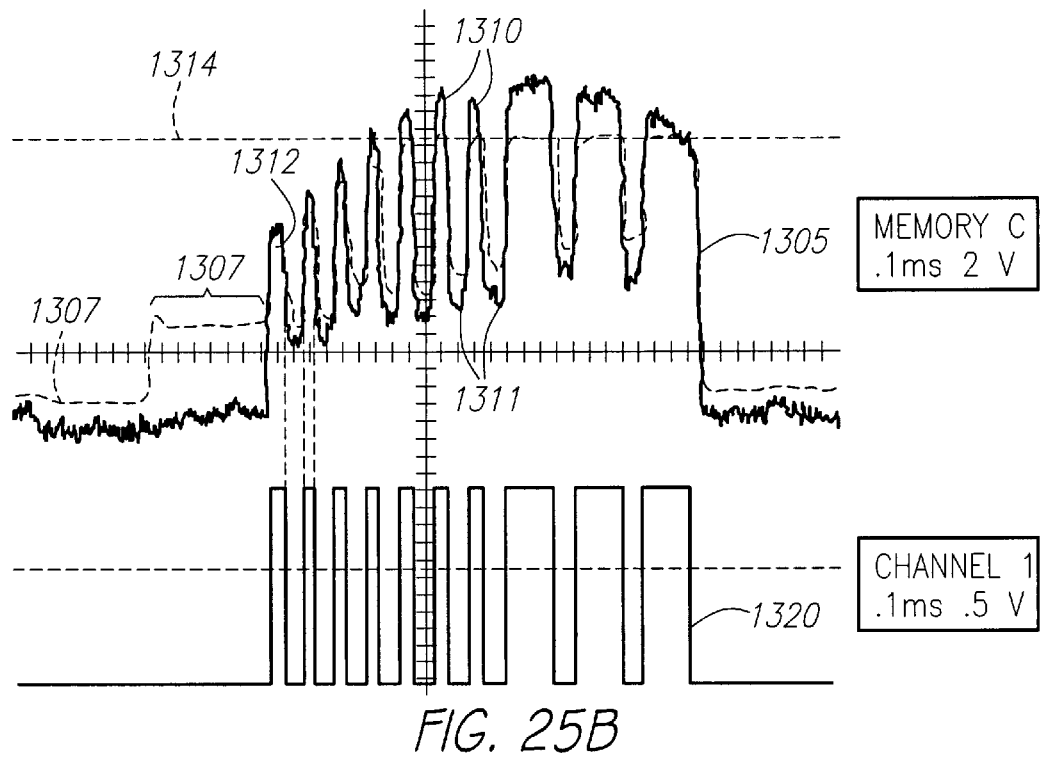
Figure 25C:
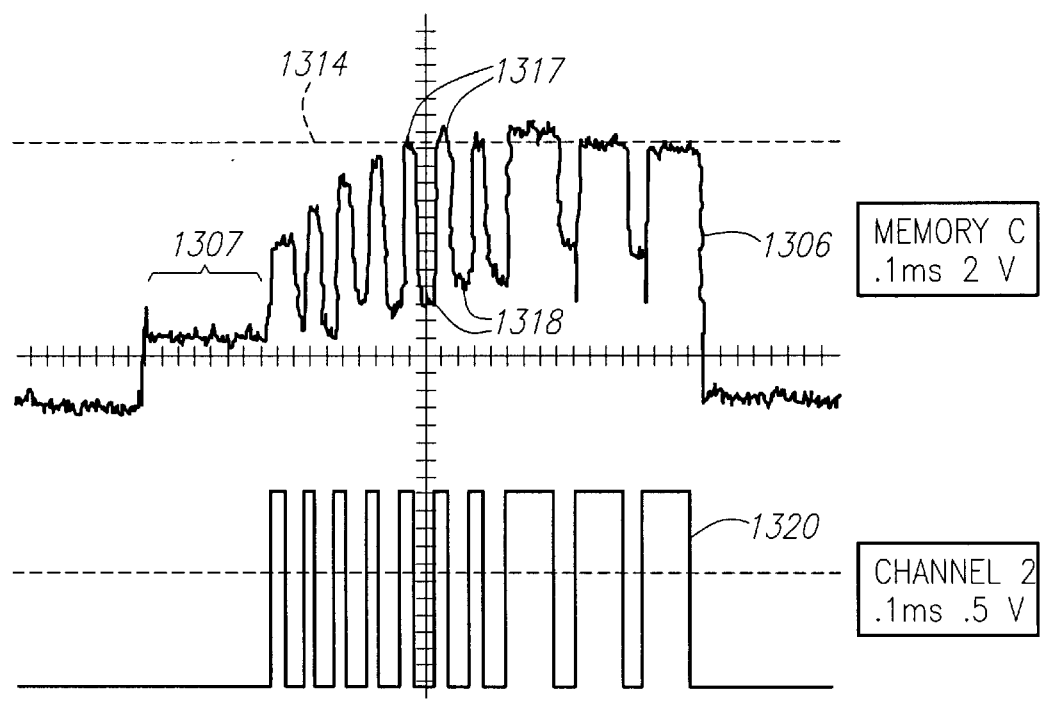

FIG. 25-A is a timing and waveform diagram illustrating an example of the operation of the bar code processing channel. As shown in FIG. 25-A, a bar code 1330 comprises dark bars 1340 and light spaces 1342 which, when optically scanned, result in a CCD video signal waveform 1331 having signal peaks corresponding to the relatively darker bars 1340 and signal valleys 1342 corresponding to relatively lighter spaces. The raw CCD video signal is quantized, but is smoothed by low-pass filtering, and thus the CCD video signal waveform 1331 represents the input signal after filtering. The CCD video signal waveform 1331 is differentiated, resulting in first derivative waveform 1332, having signal peaks 1355 and signal valleys 1357 corresponding to transitions between lighter and darker regions in the target scan line. The first derivative waveform 1332 is digitized in the manner described with respect to FIG. 20, by briefly peak-detecting the first derivative signal and comparing the peak-detected first derivative signal to the first derivative signal. When the first derivative signal crosses its peak-detected version, the output comparator 634 (see FIG. 20) trips, resulting in the exemplary digitized output waveform 1333 shown in FIG. 25-A.

Returning to FIG. 19, features of the OMR processing channel 505 will now be described. The OMR processing channel 505 comprises, among other things, a filter and gain stage 540, a black level clamp 561, a threshold generator 541, a low pass filter (LPF) and gain stage 562, a divider circuit 563, a pulse generator 551, a sample-and-hold (S/H) circuit 564, a positive peak detector 567, a negative peak detector 568, and a comparator 545. The OMR processing channel 505 receives a digital OMR threshold signal 523, a restore-to-white signal 556, and an initialization (GATE1) signal from the controller 102 (see FIG. 2).

When operation is in an OMR scanning mode, the CCD video signal 512 is processed by the OMR processing channel 505 to produce as an output the digital OMR signal 521. In such a mode, the CCD video signal 512 is input to OMR channel filter and gain stage 540 and then to the LPF and gain stage 562, which collectively amplify and filter the CCD video signal 512 to arrive at a filtered/amplified CCD video input signal 547.

The circuitry of the OMR channel 505 then uses an adaptive thresholding technique for discriminating OMR events, using an OMR threshold level that is programmably set by the controller 102. The digital OMR threshold signal 523 from the controller 102 is input to the threshold generator 541, along with the filtered/amplified CCD video input signal 547, to arrive at an input tracking signal 569 that varies dynamically with the amplitude of the amplified/filtered CCD video signal, but whose amplitude is some percentage (as dictated by the selected digital OMR threshold signal 523, which can be set up to, e.g., 32%) of the amplified/filtered CCD video signal 547.

The input tracking signal 569 is used in the generation of the adaptive OMR threshold. The peaks of the input tracking signal 569 are detected and held by positive peak detector 567 or negative peak detector 568. The positive peaks so held are a percentage below the filtered/amplified CCD video input signal 547 (as dictated by the selected digital OMR threshold signal 523), and the negative peaks so held are a percentage above the filtered/amplified CCD video input signal 547 (as dictated by the selected digital OMR threshold signal 523). A switch 570 selects between the output of the positive peak detector 567 or the negative peak detector 568, based upon the current output state of the digital OMR signal 521. Thus, when the digital OMR signal 521 is in a high ("white") state, the output from the positive peak detector 567 is selected by the switch 570, and conversely, when the digital OMR signal 521 is in a low ("black") state, the output from the negative peak detector 568 is selected by the switch 570. The output from the switch 570 constitutes the adaptive OMR threshold signal 548, which is fed to a comparator 545. A clamp 560 is advantageously provided to prevent the OMR threshold signal 548 from straying past certain imposed limits. Besides the OMR threshold signal 548, the other input to the comparator 545 is the amplified/filtered CCD video signal 547. When the two inputs of the comparator 545 cross, the digital OMR signal 521 changes states, thereby indicating a transition from a light to dark region or dark to light region in the target scan line.

In essence, the adaptive OMR threshold signal 548 is an altered version of the amplified/filtered CCD video signal 547 that stays within the bounds of the peak-to-peak amplitude swings of the amplified/filtered CCD video signal 547, and each time the adaptive OMR threshold signal 548 crosses with the amplified/filtered CCD video signal 547, an OMR event (i.e., a transition from a dark to light region or light to dark region in the target scan line) is assumed to occur.

An advantage of using the adaptive OMR threshold signal is that it allows OMR detection over a relatively wide dynamic range. The technique allows the optical reader to adapt, for example, to different light levels and different signal strength levels. This capability can be a significant advantage where an array of LEDs is used for illumination, because the amount of incident light in the middle of a scan line illuminated by an LED array may be more intense than the amount of incident light at the beginning and end of the scan line, due in part to the additive effect of reflected light in the center of the scan line. An adaptive OMR threshold signal can alleviate the problem of uneven lighting by increasing the effective DC level in the center of the scan line, where the light concentration is greatest, and decreasing the effective DC level at the start and end of the scan line, where the light concentration is weakest, by tracking the amplified/filtered CCD video input signal as described above.

The OMR processing channel 505 preferably includes circuitry for handling initial scan line conditions, and preventing erroneous optical mark detection at the start of a scan line. For example, one problem that might occur is the OMR processing channel 505 could mistakenly interpret a transition from background or inactive pixel regions to active pixel regions as a transition from "black" to "white". This situation may occur where the CCD sensor 501 has a total number of pixels which is not a power of 2, and "dead" or unused pixels are incorporated into the linear CCD array to provide such a desirable number of total pixels in the array. Thus, if scanning of a designated region can be accomplished using 1000 pixels, it may be convenient to use a linear CCD array having 1024 pixels, since such a number corresponds to $2^{10}$. In such a case, the first 24 pixels can be masked off.

Where pixels are masked, they do not receive light during a scan frame, but when they are read out: their pixel data nevertheless gets processed by the appropriate channel. The pixel data read out from the masked pixels does not correspond to a "black" region being scanned, but if the first region scanned is "black" the OMR channel 505 may erroneously interpret the first region as "white" due to the difference in charge level between the masked CCD pixels and the first operative (i.e., non-masked) pixels of the CCD array.

To avoid this situation, a fixed threshold floor is first set up at the start of a scan line to assist in characterizing the first region in the target scan line as "black" or "white". The fixed threshold floor may, for example, be based on known characteristics of the CCD sensor 501 and the illumination source 108 (see FIG. 2). If the fixed threshold floor is exceeded when the first region is scanned, the region is considered a "white" region, otherwise it is considered a "black" region.

The black level clamp 561 of the OMR processing channel 505 indirectly sets up an initial floor for the adaptive OMR threshold signal 548, and ensures that the output from the filter and gain stage 540 is at some minimum level. In addition, at the start of a scan frame, the adaptive OMR threshold signal 548 is temporarily forced to a preset fraction of the first encountered "white" level from the previous scan frame. This operation is initiated by the GATE1 signal 550 received from the controller 102, which causes pulse generator 551 to generate a pulse at the first encountered "white" level of a given scan frame. When this pulse occurs, sample-and-hold circuit 564 samples a fraction of the filtered/amplified CCD video signal 547, through divider circuit 563. At the start of a new scan frame, the GATE1 signal 550 first selects, through switch 571, the output of the sample-and-hold circuit 564 to use as an initial OMR threshold signal 565, which is applied to the input of comparator 545. When the first "white" level is encountered, the pulse on the GATE1 signal 550 terminates, and causes the "white" level to be sampled and held for the next scan frame.

Once the amplified/filtered CCD video signal 547 exceeds the temporary threshold floor level established by the initial OMR threshold signal 565 (i.e., the first "white" level is encountered), the adaptive OMR threshold signal 548 is "released" and free to track the input signal. The adaptive OMR threshold signal 565 thereafter adapts to the input signal, and functions as a variable threshold level attuned to the particular peak-to-peak amplitude of the input signal.

In one embodiment, a restoration signal 556 may be received from the controller 102 (see FIG. 2), which has the effect of placing the digital OMR signal 521 in a known state at the start of a scan line. For example, the output of the digital OMR signal 521 may be reset by the controller 102, via the restoration signal 556, to black (e.g., a "low" binary state) at the start of a scan line.

Returning to FIG. 20, the preferred signal processing and conditioning circuit 600 shown in FIG. 20 incorporates a variety of the principles and features of the OMR channel 505 shown in FIG. 19. It is to be understood that there may be substantial interaction between the different elements and functional blocks of the OMR processing channel, such that identification of "boundaries" between the various circuit elements and functional blocks in FIG. 20 is not meant to be limiting in any manner but merely helpful to the reader to identify the general functions of the circuitry so identified.

It is believed that the operation of the circuitry shown in FIG. 20 would be readily understood by those skilled in the art, given the above explanation of the workings and concepts related to FIG. 19. Nevertheless, an explanation of certain details follows below.

As shown in FIG. 20, the CCD video signal 612 (similar to the CCD video signal 512) is input to a filter and gain stage 640 which amplifies and filters the CCD video signal 612, and outputs a pre-filtered/amplified CCD video signal 658. The pre-filtered/amplified CCD video signal 658 is output to a black level clamp circuit 661, and also to a low pass filter and gain stage 662. The low pass filter and gain stage 662 generally corresponds to the similar stage (block 562) in FIG. 19, and outputs a filtered/amplified CCD video signal 647.

At the same time, a digital OMR threshold signal 623 (generally corresponding to digital OMR threshold signal 523 in FIG. 19) is input to a threshold generation circuit 642 from the controller 102 (see FIG. 2), and the collection of binary signals of the digital OMR threshold signal 623 is connected through parallel resistors to a set of NPN transistors 689 (designated Q3, Q4, Q5 and Q6) configured in parallel, one NPN transistor 689 for each of the digital lines of the digital OMR threshold signal 623, as shown in FIG. 20.

Each digital line of the digital OMR threshold signal 623 in a "high" state activates its respective NPN transistor 689, and thereby affects the percentage tracking level of the adaptive OMR threshold, while those digital lines of the digital threshold signal 623 in a "low" state do not activate their respective NPN transistor 689. A variety of different percentage tracking levels for the adaptive OMR threshold can thereby be obtained.

The output of the threshold generation circuit 642 is combined with the filtered/amplified CCD video signal 647, and fed into a peak detection circuit 644 comprising positive peak detector and a negative peak detector. A selection is made between the output of the positive peak detector and negative peak detector through transistors Q13 and Q14, which are both controlled by the digital OMR signal 621, in a manner similar to described for FIG. 19. The peak detection circuit 644 outputs to a "leaky hold" circuit comprising resistor R42 and capacitor C27, and the value at the node of capacitor C27 comprises an adaptive OMR threshold signal 648 (corresponding to adaptive OMR threshold signal 548 in FIG. 19).

Alternatively, transistors Q13 and Q14 can be diode-connected, or preferably replaced with diodes, and the feedback path from the digital OMR signal 621 eliminated. In such embodiments, transistor Q7 performs the steering of positive peak detection versus negative peak detection.

The adaptive OMR threshold signal 648 is connected to one input of a comparator 645. The other input of the comparator 645 receives the filtered/amplified CCD video signal 647, and when the two inputs of the comparator 645 cross, the output of the comparator 645 (i.e., the digital OMR signal 621) changes states.

The digital OMR signal 621 is fed back into the circuit, through an inverter (located in the controller 102), as OMR state signal 692, which is connected to the emitter of an NPN transistor Q7. Transistor Q7 essentially determines how fast tracking is done while in the "white" state, or alternatively, as mentioned, can determine whether the negative peak detector or positive peak detector is being used for tracking. Transistor Q7 also generates a minimum threshold level when in the "black" state, by acting as a diode.

When the optical reader transitions from one scan frame to the next scan frame, the read-out-gate (ROG) signal to the CCD sensor is used to initiate a GATE1 signal 650 which, among other things, effectively samples a fraction of the first white level from the current scan frame, to store and use as the initial threshold for the next scan frame. The GATE1 signal 650 is synchronized to the ROG signal, and when a completed pulse occurs on the GATE1 signal 650, transistor Q9 (which is normally on) briefly releases one of the two inputs to operational amplifier 693, allowing the operation amplifier 693 to act as a voltage follower. The filtered/amplified CCD video signal 647 is divided down by resistors R23, R22, R44 and R9, and the divided down voltage is temporarily stored by capacitor C28, for use in the next scan frame.

Initially, the leading edge of the pulse on the GATE1 signal 650 activates a switch 671 (embodied as transistor Q8), which passes the sampled voltage through and forces the adaptive OMR threshold signal 648 to that value. When the digital OMR signal 621 changes states (indicated the first detected transition in the target scan line), the pulse on the GATE1 signal 650 is de-asserted, causing switch 671 to de-activate, and allowing the adaptive OMR threshold signal 648 to freely track the filtered/amplified CCD video signal 647.

At the same time, as the pulse on the GATE1 signal 650 is completed, it pulses the input to transistor Q9, which causes a sampling of the "white" level (which is the first "white" level encountered in the scan frame), a fraction of which is held for the next scan frame in a manner described above. This cycle continues for each scan frame.

The restoration signal 656 can be used to clamp the non-inverting input of the comparator 645, such that the digital is OMR signal 621 will be placed in a known state at a given point in the scan frame (typically the start of the scan frame). Because the adaptive OMR threshold signal 648 is generally preset at the start of a scan frame in the manner described above, the output of comparator 645 can with fair certainty be predicted to be in a "low" state.

The black clamp circuit 661 monitors the pre-filtered/amplified CCD video signal 658, and ensures that the signal remains above a certain minimum floor. Whenever the pre-filtered/amplified CCD video signal 658 drops below a minimum floor level, operational amplifier U3B switches to an output-high state, and injects current into the input of filter/gain amplifier U3A of the filter and gain stage 640, thereby propping up the input signal. When the pre-filtered/amplified CCD video signal 658 rises above the minimum floor, the operational amplifier U3B of the black clamp circuit 661 switches to a low-output state, until the pre-filtered/amplified CCD video signal 658 drops again to below the minimum floor. In this manner the level of the input signal, and the adaptive OMR threshold derived in large part from the input signal, can be maintained at a minimum floor.

FIGS. 25-B and 25-C illustrate an example of the above-described adaptive thresholding technique for detecting OMR features. In FIGS. 25-B, the solid signal line 1305 represents one input to comparator 545 (or 645)—i.e., essentially the amplified/filtered CCD video input signal, and the dotted signal line 1306 represents the other input to comparator 545 (or 645)—i.e., essentially the adaptive OMR threshold signal 548. In FIG. 25-C the solid signal line 1306 is identical to the dotted signal line 1306 in FIG. 25-B, and also represents the adaptive OMR threshold signal 548 as input to comparator 545 (or 645). As illustrated in FIG. 25-B, the amplified/filtered CCD video input signal 1305 starts in a relatively low amplitude state, but contains peaks 1310 and valleys 1311 corresponding to darker and lighter regions of is the target scan line. The adaptive OMR threshold signal 1306 also starts out in a relatively low amplitude state, then is abruptly brought up to a designated fraction of the previous white level during region 1307, to establish a temporary threshold floor. The adaptive OMR threshold signal 1306 is then released to track the amplified/filtered CCD video input signal 1305 upon detection of the first OMR event.

As can be seen in FIG. 25-C, the adaptive threshold signal 1306 contains peaks 1317 and valleys 1318 slightly lagging the peaks 1310 and valleys 1311 of the amplified/filtered CCD video input signal 1306, but the amplitude swings are not as extreme because the adaptive OMR threshold signal is designed to be a certain percentage above the valleys and a certain percentage below the peaks of the input signal.

Also shown in FIGS. 25-B and 25-C is a digital OMR signal waveform 1320 as output from the OMR processing channel. The digital OMR signal waveform 1320, as shown, transitions between binary high and low states when the adaptive OMR threshold signal 1306 and the amplified/filtered CCD video input signal 1305 cross, such as at crossing point 1312 shown in FIG. 25-B.

While OMR channel processing has been described above with reference to an adaptive thresholding technique, other methods for detecting optical marks may be employed. For example, a preset threshold may be used instead of an adaptive threshold, if the input signal range is known within an acceptable tolerance. In a variation of this approach, a preset threshold may be adjusted in a known, predefined manner during the scan frame to account for the expected variations in the characteristic of the input signal. For example, to account for the increased illumination intensity in the middle of a scan frame in some embodiments using an LED array, the OMR threshold may be increased in the middle of a scan frame, and then reduced again towards the latter part of the scan frame. This is but one example, and it will be understood that those skilled in the art may apply or adapt these techniques to situations in which other environmental factors (including other lighting effects) potentially affect the input signal, without departing from the scope of the invention as broadly described herein.

Figure 21:
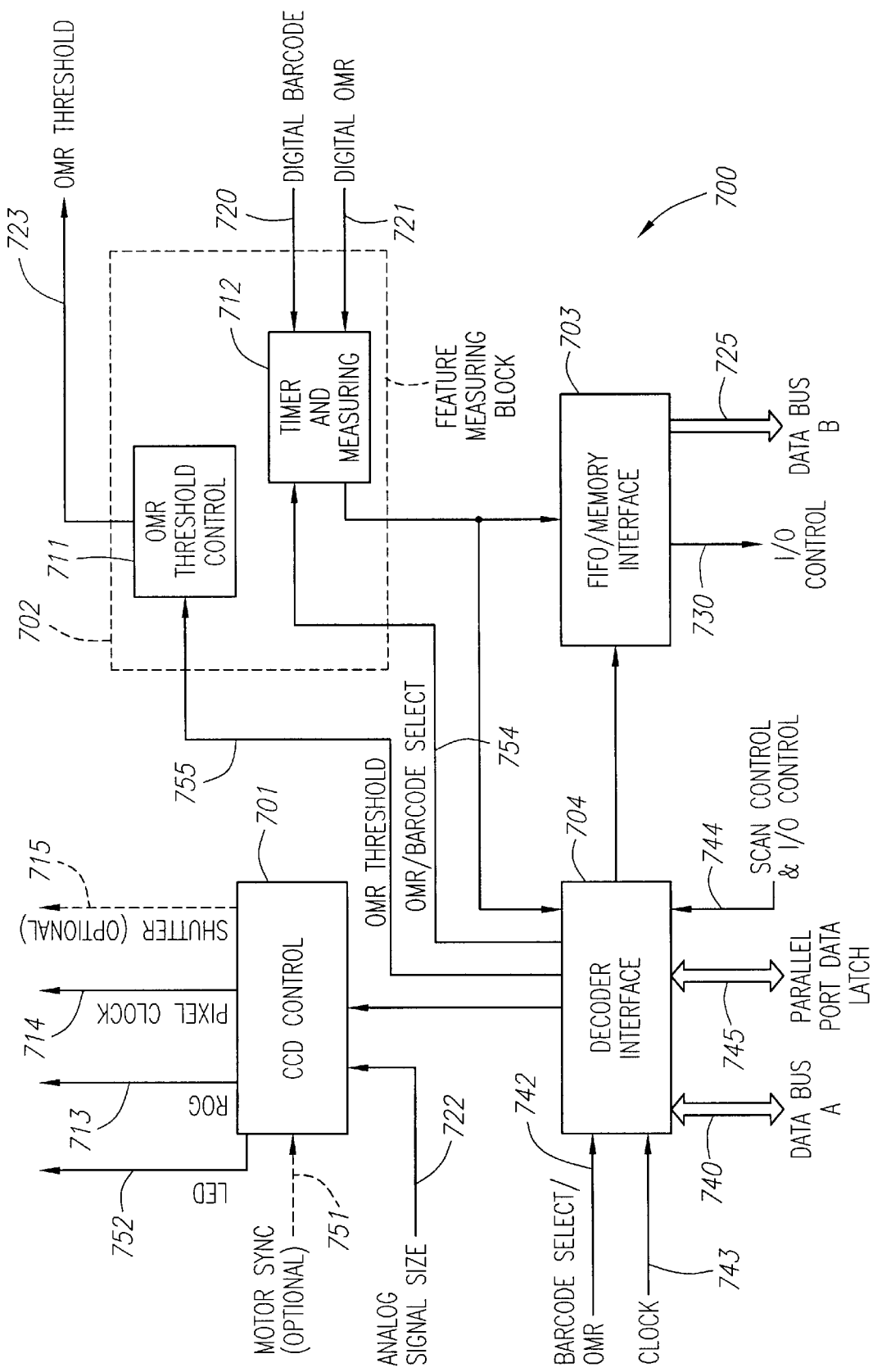
FIG. 21 is a block diagram of a preferred controller as may be used in the optical reader of FIG. 2.

FIGS. 21 and 22A through M illustrate further details of a preferred controller as may be used in the optical reader 100 shown in FIG. 2. FIG. 21 is a block diagram of a preferred controller 102 (see FIG. 2), while FIGS. 22A through M collectively comprise a more detailed circuit schematic diagram of a separate controller embodiment incorporating the structure and principles of the controller block diagram shown in FIG. 21.

As shown in FIG. 21, a controller 700 preferably comprises a CCD control block 701, a feature measuring block 702, a FIFO/memory interface block 703, and a decoder interface block 704. The CCD control block 701 controls a read-out-gate (ROG) signal 713 and pixel clock signal 714, which essentially correspond to ROG signal 113 and pixel clock signal 114 of FIG. 2, or else ROG signal 515 and pixel clock signal 514 of FIG. 19. The CCD control block 701 also controls an optional electronic shutter, if used, by way of shutter signal 715. The CCD control block 701 controls the LED array or other illumination source by way of LED control signal 752. In addition, an external motor sync signal 751 may optionally be input to the CCD control block 701 to synchronize the scanning operation to the motor used to pull the ticket through.

The CCD control block 701 also may receive as an input an analog signal-size signal 722, which provides feedback to assist in control of the exposure time of the CCD sensor 501 (see FIG. 19). The analog signal-size signal 722 may comprise information indicating the size of the CCD video signal, and for example may comprise the set of signals, signal-size-1 524 and signal-size-2 525, output from the window comparator 513 of the signal processing and conditioning circuit 500 shown in FIG. 19. Based on the size of the CCD video signal, as indicated by the analog signal-size signal 722, the CCD control block 701 selects the appropriate scan rate and read-out timing. Accordingly, the CCD control block 701 adjusts the pixel clock 714 to provide the desired exposure period (e.g., from an exposure period of 4 milliseconds, corresponding to 250 scans/second, to 1 millisecond, corresponding to 1000 scans/second, in one embodiment), and controls the read-out of the CCD video data by way of read-out-gate (ROG) signal 713.

Several options are available for controlling the CCD exposure time period using the feedback provided by the analog signal-size signal 722. First, the CCD control block 701 can be configured to respond to only a single threshold comparison signal (e.g., the signal-size-2 signal 625 output from the window comparator 613 of FIG. 20), and the second threshold comparison signal is not used. When the threshold comparison signal is asserted at any time during the scan, indicating that the CCD video signal has exceeded the saturation point, then such an event is latched by a flip-flop or other memory storage element, causing the CCD control block 701 to enter a saturation mode of operation for the remainder of the item scan. At the end of scanning the item, the flip-flop is cleared by a signal from the decoder 106, and the normal mode of operation will be resumed for the next item scanned unless saturation again occurs.

As a second option, the CCD control block 701 may be configured to respond to both threshold comparison signals. It should be noted that, in the particular embodiment shown in FIG. 20, the CCD video signal 612 received by the window comparator 613 has an amplitude inversely proportional to the intensity of the received light. Therefore, the CCD signal strength thresholds are "greater" when they are increasingly negative from the reference level voltage. As an example, the reference voltage may be 2 volts, and the first or "lower" CCD signal strength threshold (corresponding to the signal-size-1 signal 624 of FIG. 20) may be located an amplitude corresponding to a relatively low input signal strength (e.g., about 1.95 volts, or 2 volts minus 50 millivolts), and the second or "upper" threshold (corresponding to the signal-strength-2 signal 625 of FIG. 20) may be located at an amplitude corresponding to a saturation-level input signal strength (e.g., 2 volts minus the saturation voltage level). As used immediately below, either of the two CCD signal strength thresholds are "exceeded" when the CCD video signal 612 (or more appropriately, a filtered or averaged version thereof) becomes more negative than the threshold. In one embodiment, to obtain the saturation voltage threshold, the saturation voltage of the CCD sensor is sampled (e.g., after an idle time when the CCD sensor has been collecting light for an indefinitely long period), and the saturation voltage threshold (i.e., the second or "upper" threshold) would then be set to 2 volts minus slightly less than the sampled saturation voltage.

Accordingly, when the "upper" threshold comparison signal (i.e., the signal-size-2 signal 625 of FIG. 20) is passed, then the CCD control block 701 switches to a saturation mode of operation. The CCD control block 701 remains in the saturation mode of operation until the "lower" threshold comparison signal (i.e., the signal-size-1 signal 624 of FIG. 20) switches states, indicating that the CCD video signal 612 remained below the lower threshold level for an entire scan frame. It is therefore possible, using this window comparator technique, to adjust the exposure time on a scan frame by scan frame basis.

Returning to the details of FIG. 21, the feature measuring block 702 performs width measurements of the features of the line being scanned. It receives as inputs both a digital bar code signal 720 and a digital OMR signal 721 (corresponding to, for example, digital bar code signal 120 and digital OMR signal 121, respectively, of FIG. 2, or else digital bar code signal 520 and digital OMR signal 521, respectively, of FIG. 19). The digital bar code signal 720 and digital OMR signal 721 are input to a timer and measuring circuit block 712 of the feature measuring block 702. The timer and measuring block 712 comprises at least one timer which is reset at each transition between binary states of either the digital bar code signal 720 or the digital OMR signal 721, depending whether the device is operating in the bar code scanning mode or the OMR scanning mode, as selected by the OMR/bar code select signal 754. The feature measurements derived by the timer and measuring circuit block 712 are stored immediately in a FIFO over a data bus 725, or else are made available for further processing over a data bus 740 connected to other peripherals.

The feature measuring block 702 also preferably comprises an OMR threshold control circuit 711, which receives an OMR threshold control signal 755 from the decoder (not shown in FIG. 21) via the decoder interface 704. The OMR threshold control circuit 711 outputs a digital (e.g., 4-bit) OMR threshold signal 723, which is used by the signal conditioning and processing circuitry 500 (see FIG. 19) for setting the OMR threshold used in discriminating background color from optical marks.

The FIFO/memory interface block 703 acts as the intermediary between the feature measuring block 702 and the FIFO 104 (see FIG. 2) that temporarily stores feature measurement data until the decoder 106 (see FIG. 2) reads out the stored data from the FIFO 104. The FIFO/memory interface block 703 receives feature measurement data from the feature measuring block 702 at the appropriate time intervals (i.e., at each transition of the digital bar code signal 720 or digital OMR signal 721, depending on mode of operation), and transfers the data over a data bus 725 to the FIFO 104. Depending on the size of the data to be stored, the size of the data bus 725 and the size of the FIFO 104, the FIFO/memory interface 703 may need to store the data in the FIFO 104 using multiple write commands. For example, if the feature measurement data comprises 16 bits of information, the FIFO/memory interface 703 may store a 16-bit data word in the FIFO 104 using two write operations, the first write operation to store a high byte and the second write operation to store a low byte. The FIFO/memory interface 703 can optionally be configured to choose between writing to a FIFO 104 or a main memory 105 (see FIG. 2), and can be provided with an I/O control signal 730 to control the destination of the feature measurement data.

The decoder interface block 704 primarily manages the interface between the decoder 106 (see FIG. 2) and the controller 700. The decoder interface block 704 receives a master clock signal 743 from which the pixel clock signal 714 is derived. The decoder interface block 704 also receives, from the decoder 106, an OMR/bar code select signal 742 which selects between the bar code scanning mode and the OMR scanning mode. The decoder interface block 704 passes this signal along to the feature measuring block 702, which uses it to select between the digital bar code signal 720 and the digital OMR signal 721 as inputs. In addition, the decoder interface block 704 connects to a data bus 740 to which the decoder 106 also has access, and to a parallel port data latch 745 for I/O operations. The decoder 106 can control I/O destination(s) and scanning operations by way of one or more scan control and I/O control signals 744 connected to the decoder interface 704.

Figure 22:
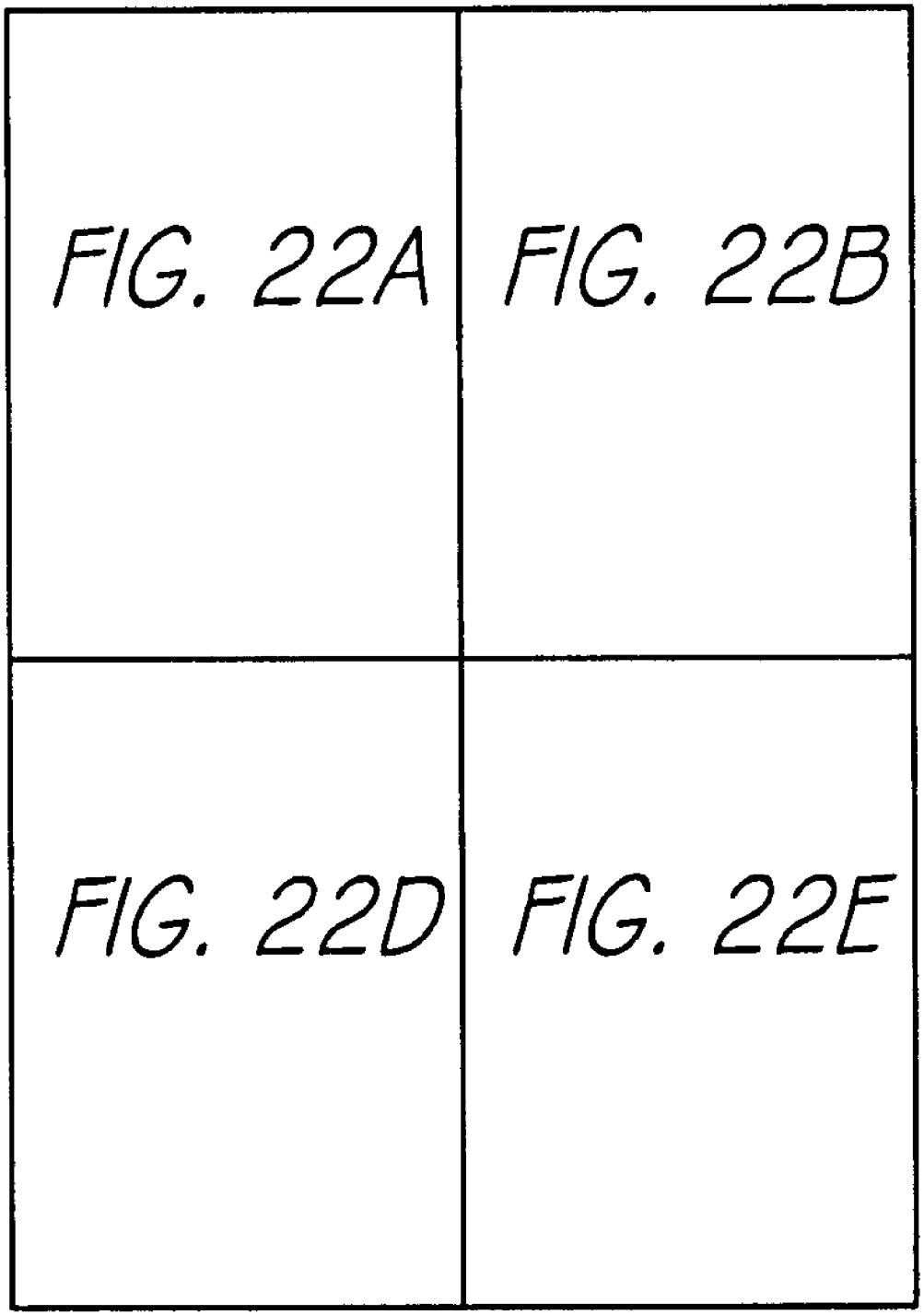
FIGS. 22A–M are a more detailed diagram of a preferred electrical schematic of a controller.
Figure 22A:
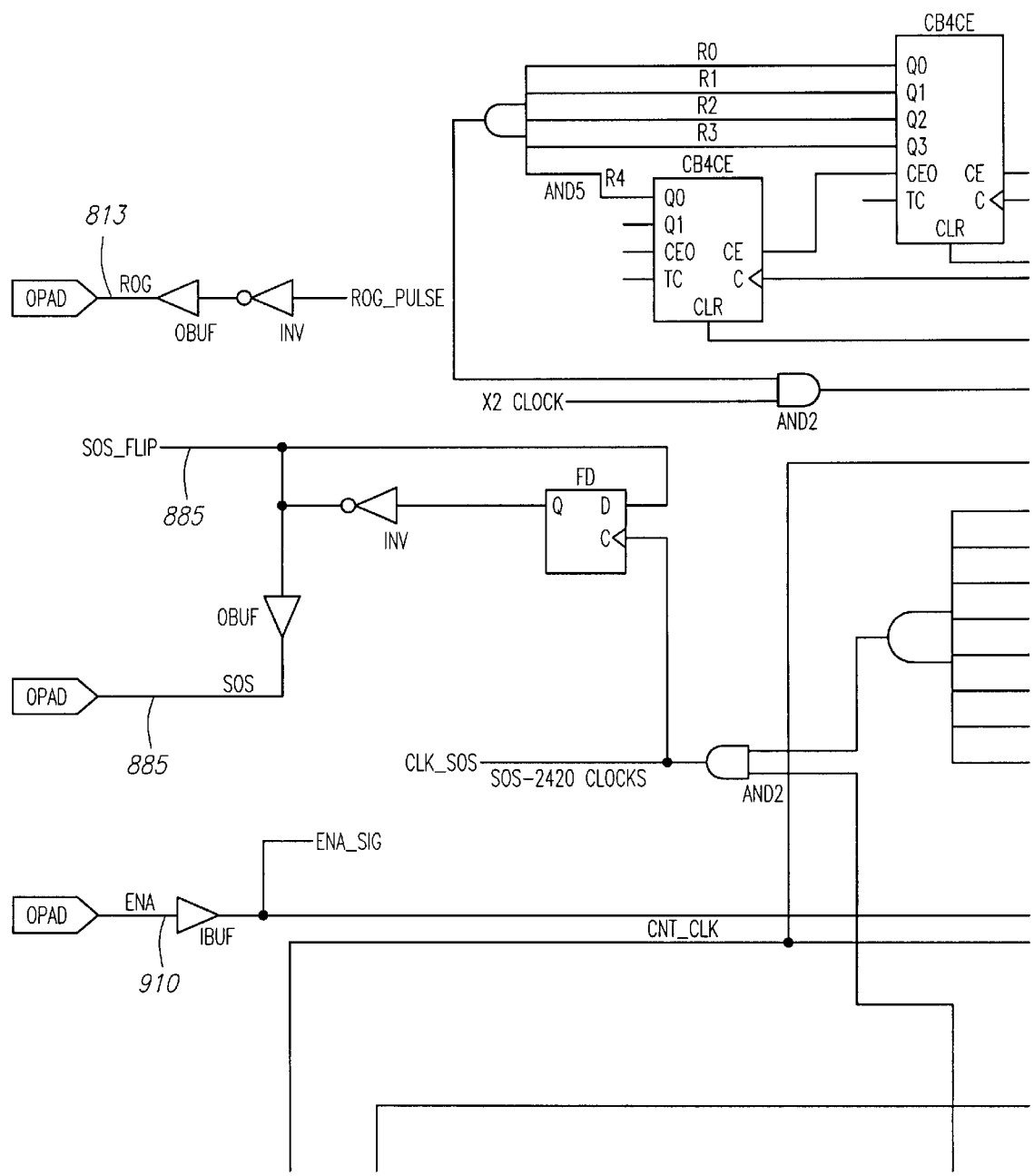
Figure 22B:
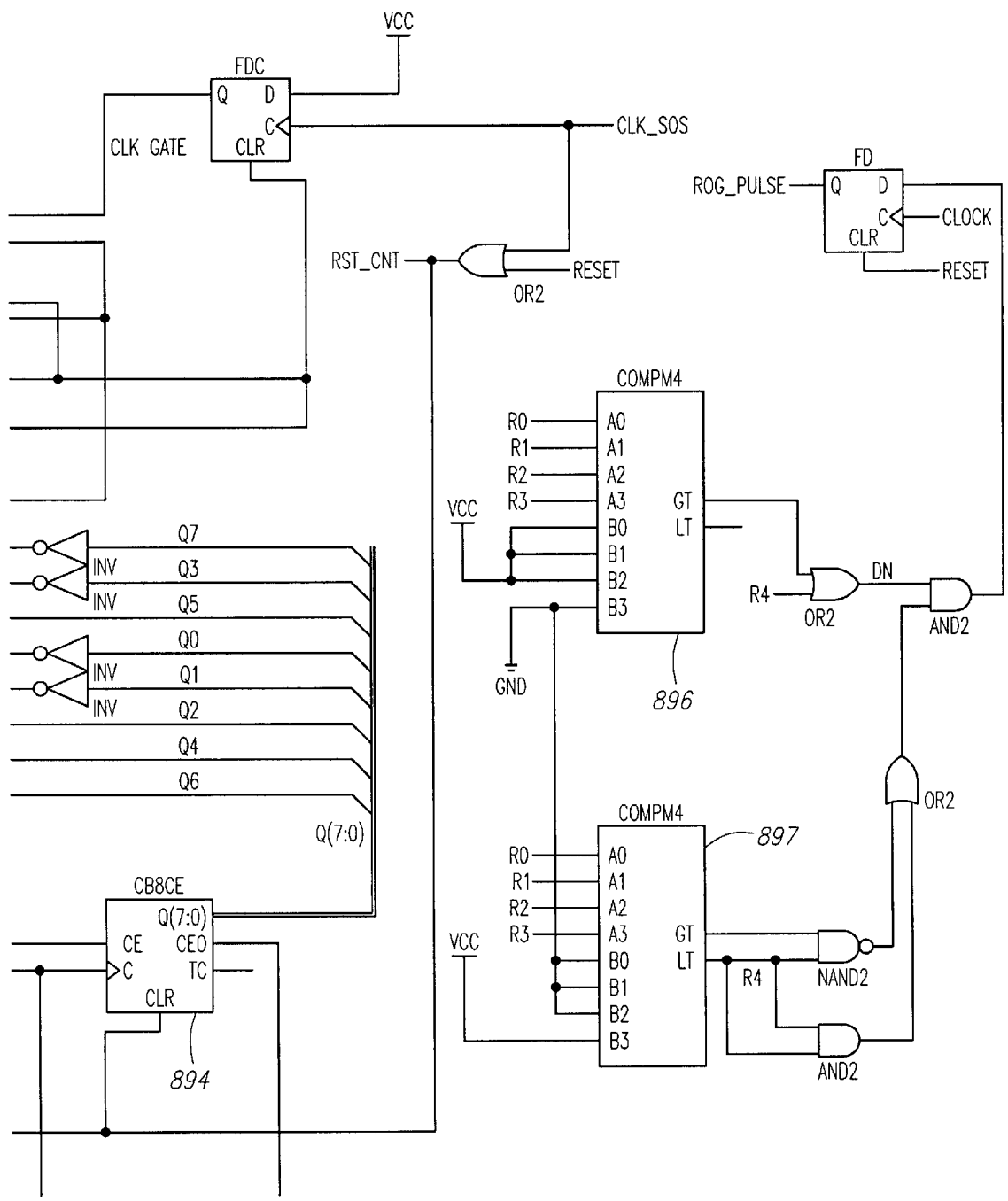
Figure 22D:
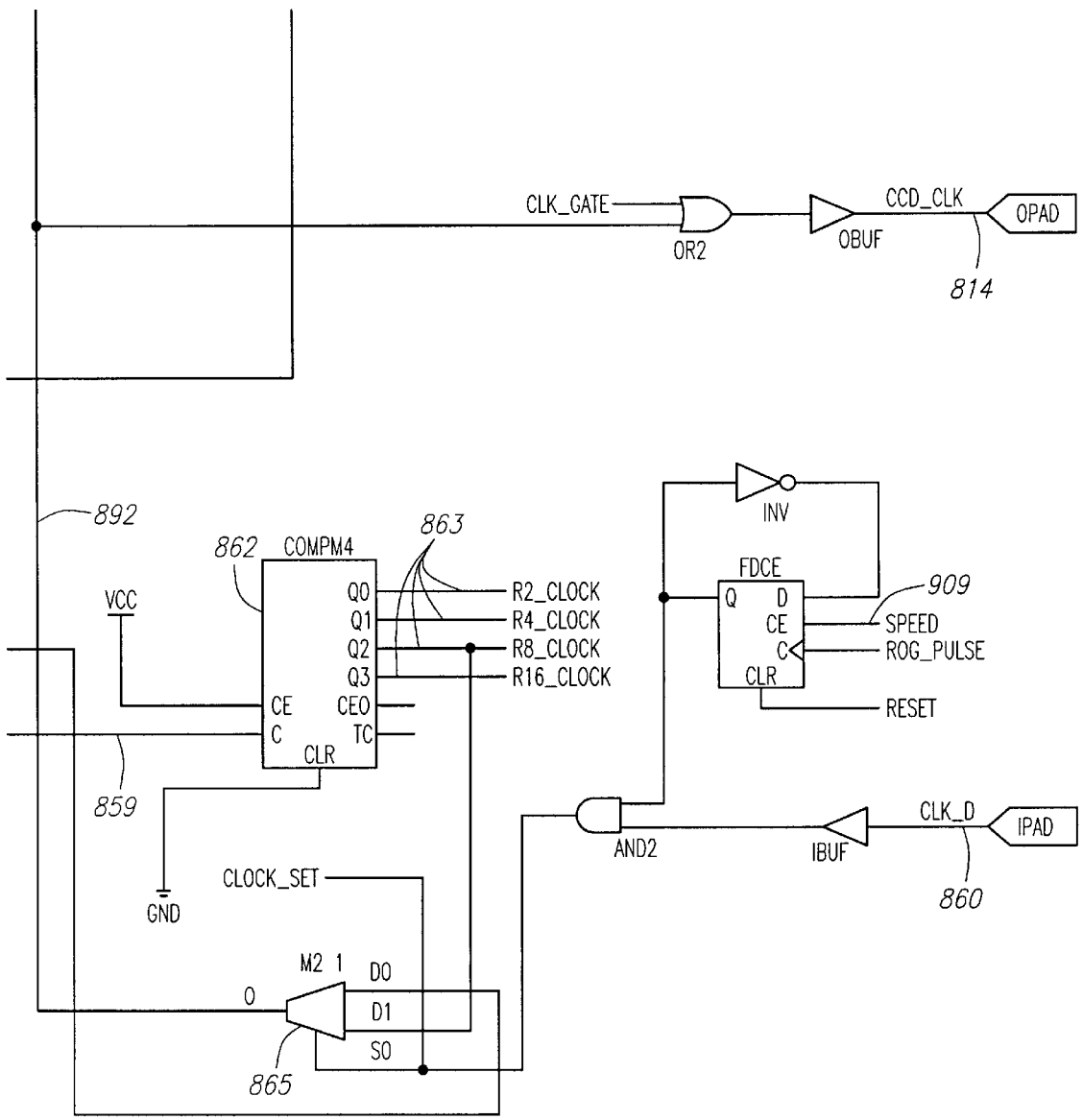
Figure 22F:
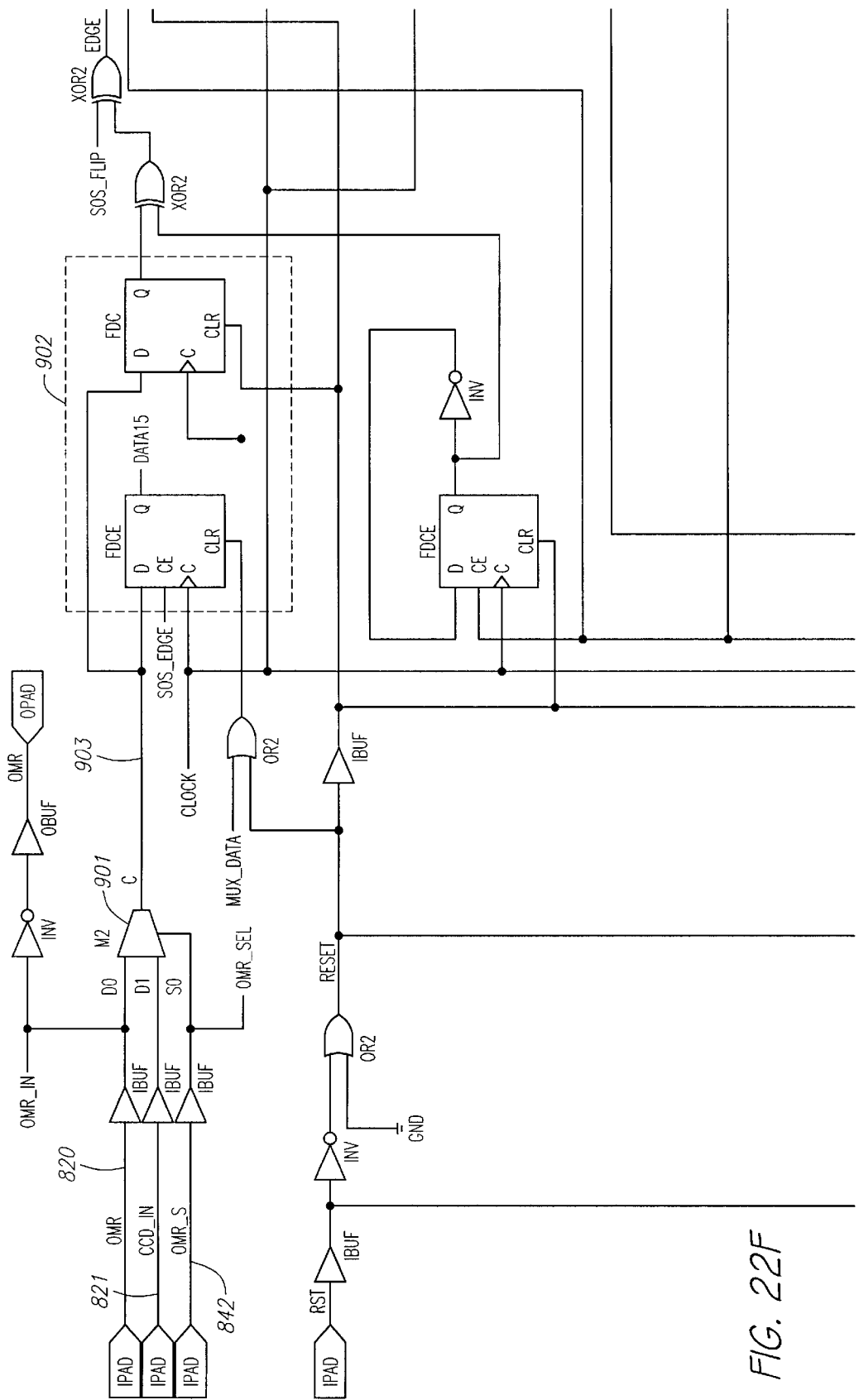
Figure 22G:
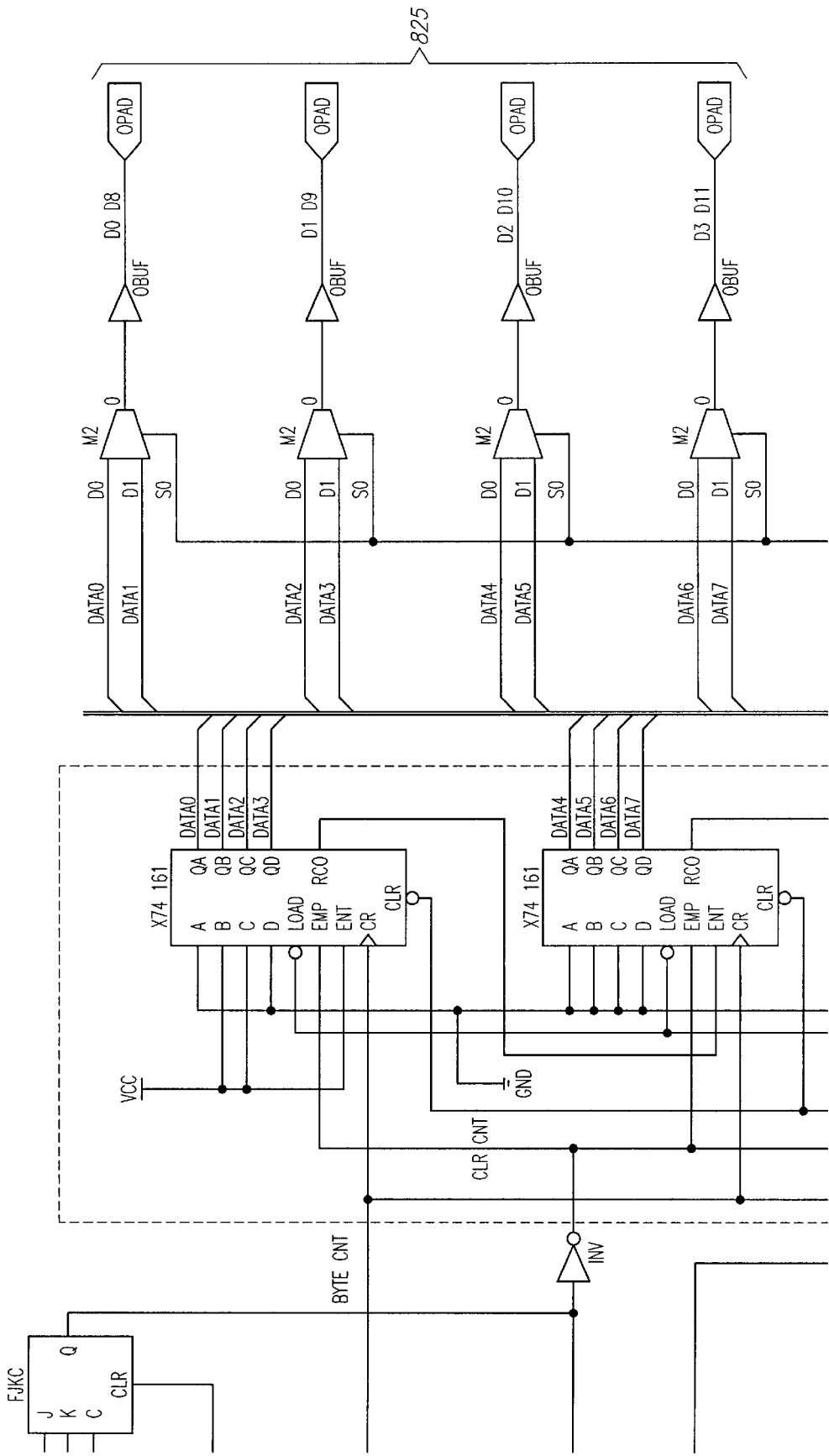
Figure 22H:
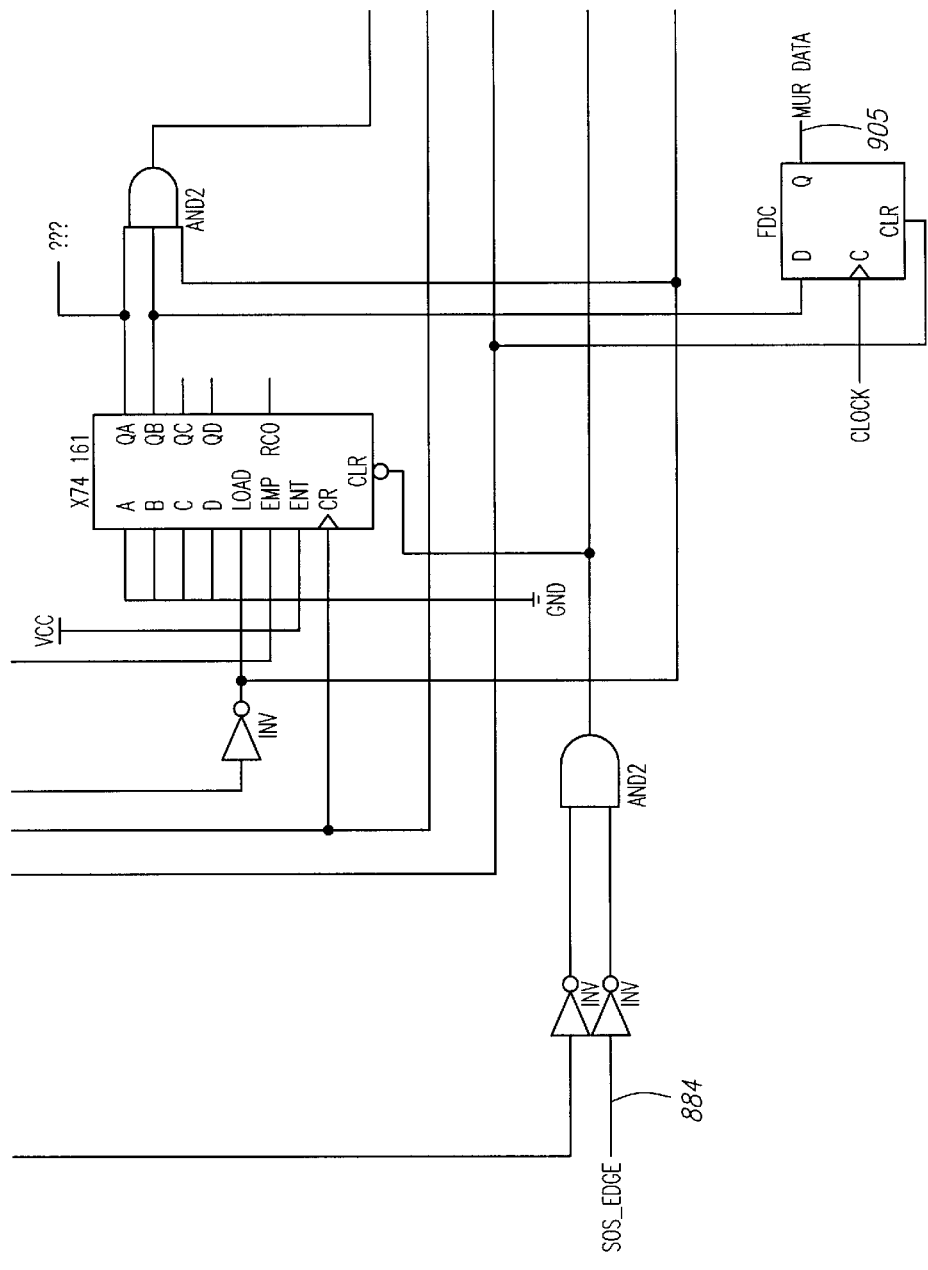
Figure 221:
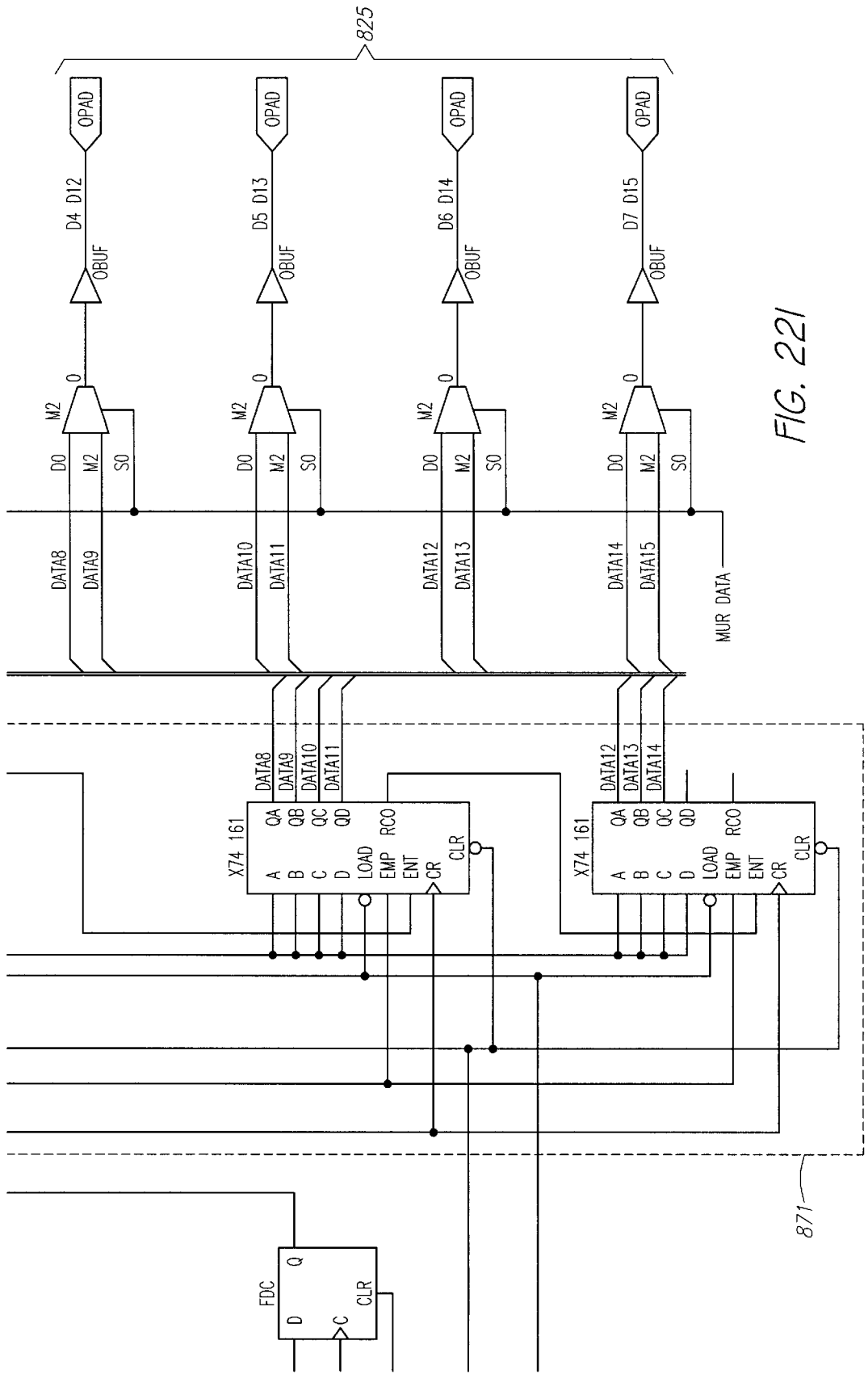
Figure 22J:
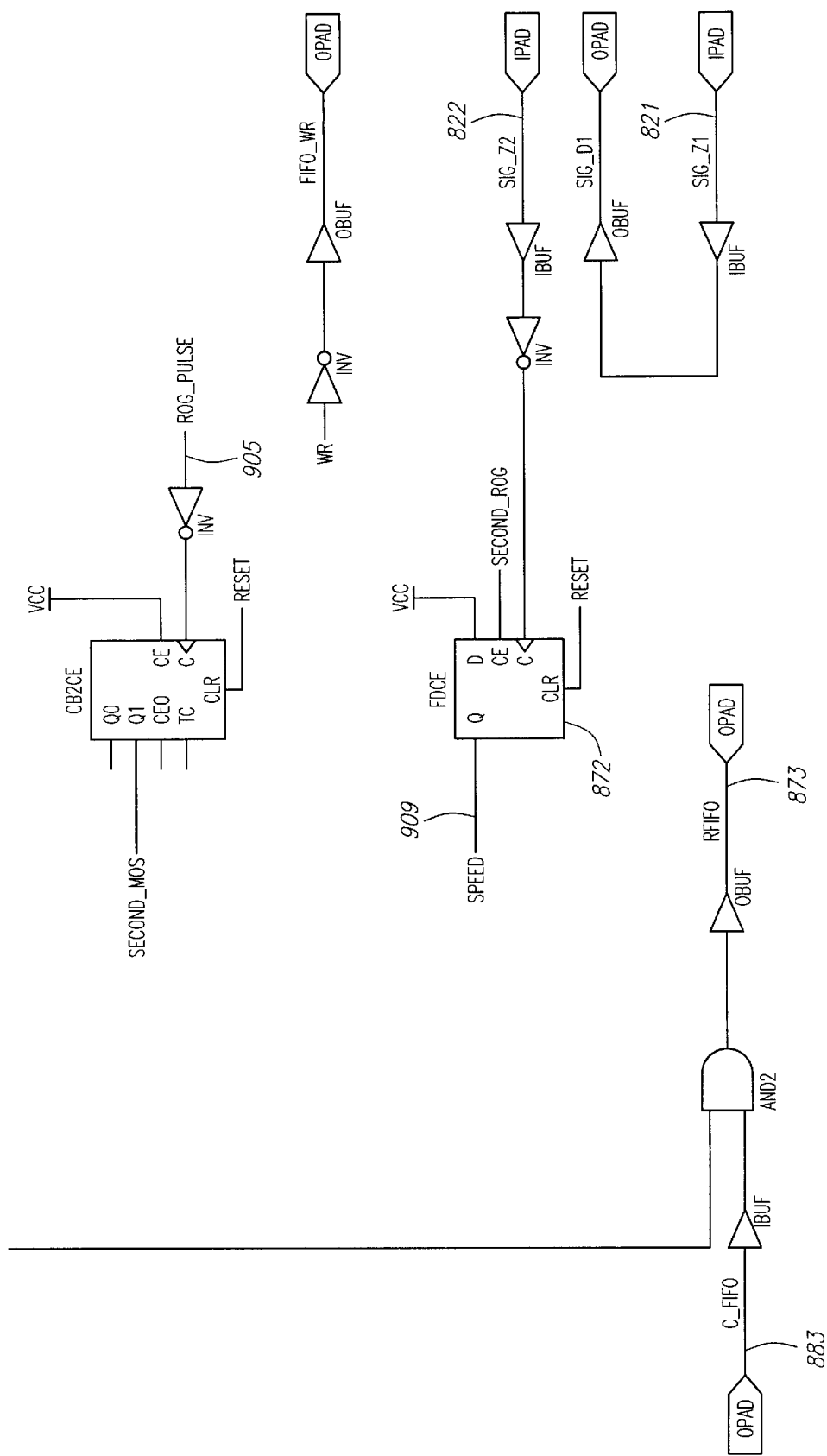
Figure 22K:
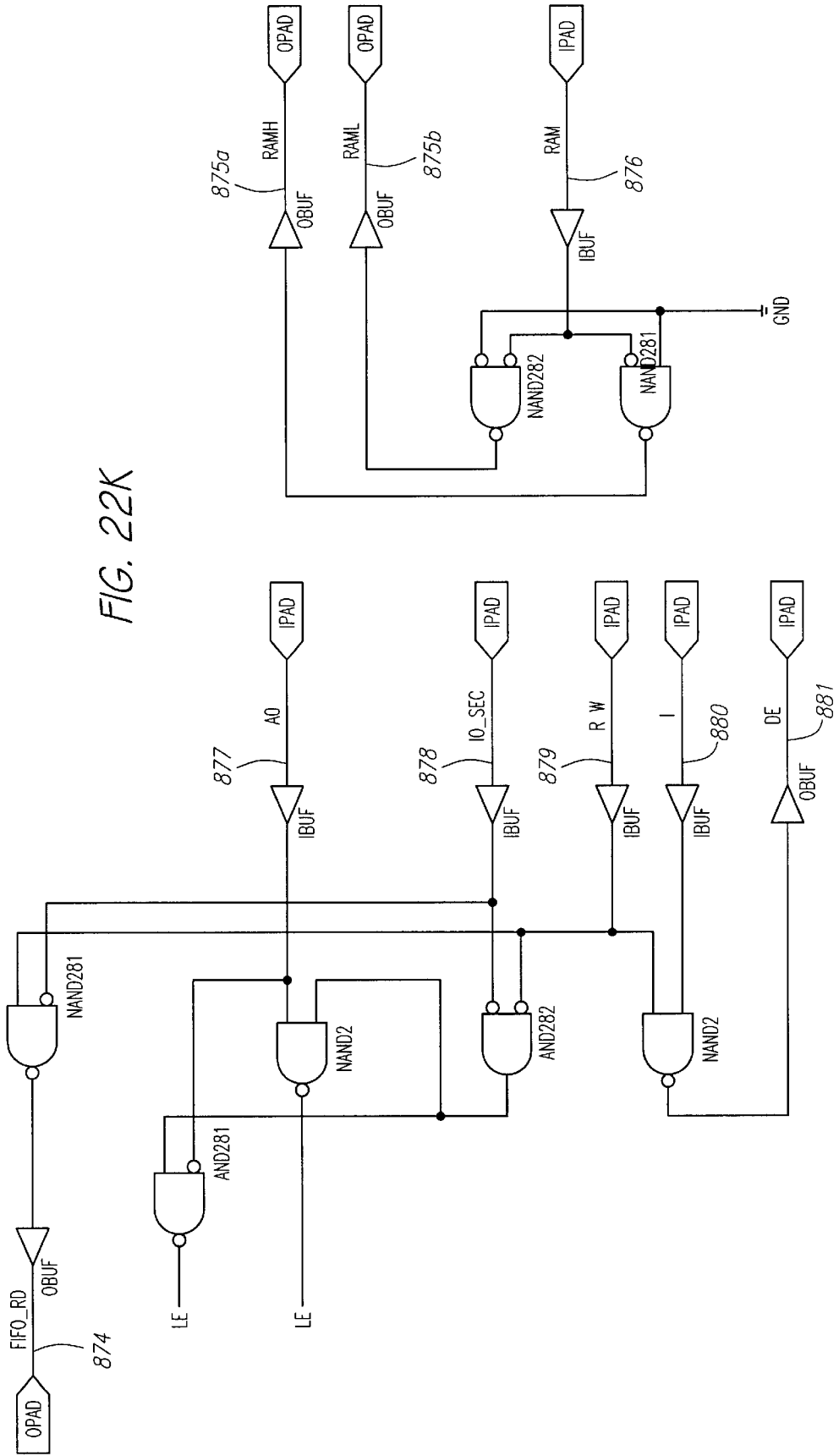
Figure 22L:
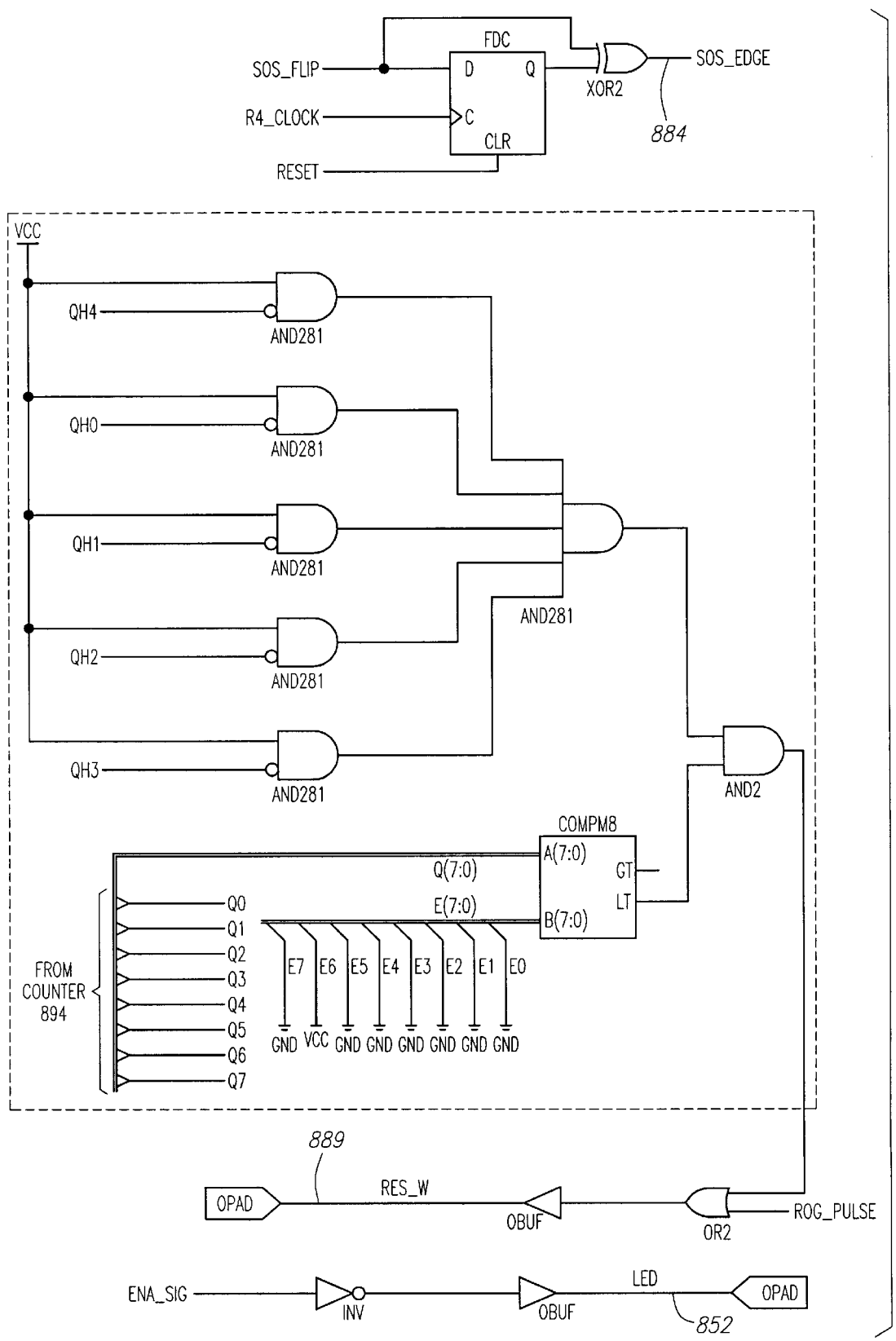
Figure 22M:
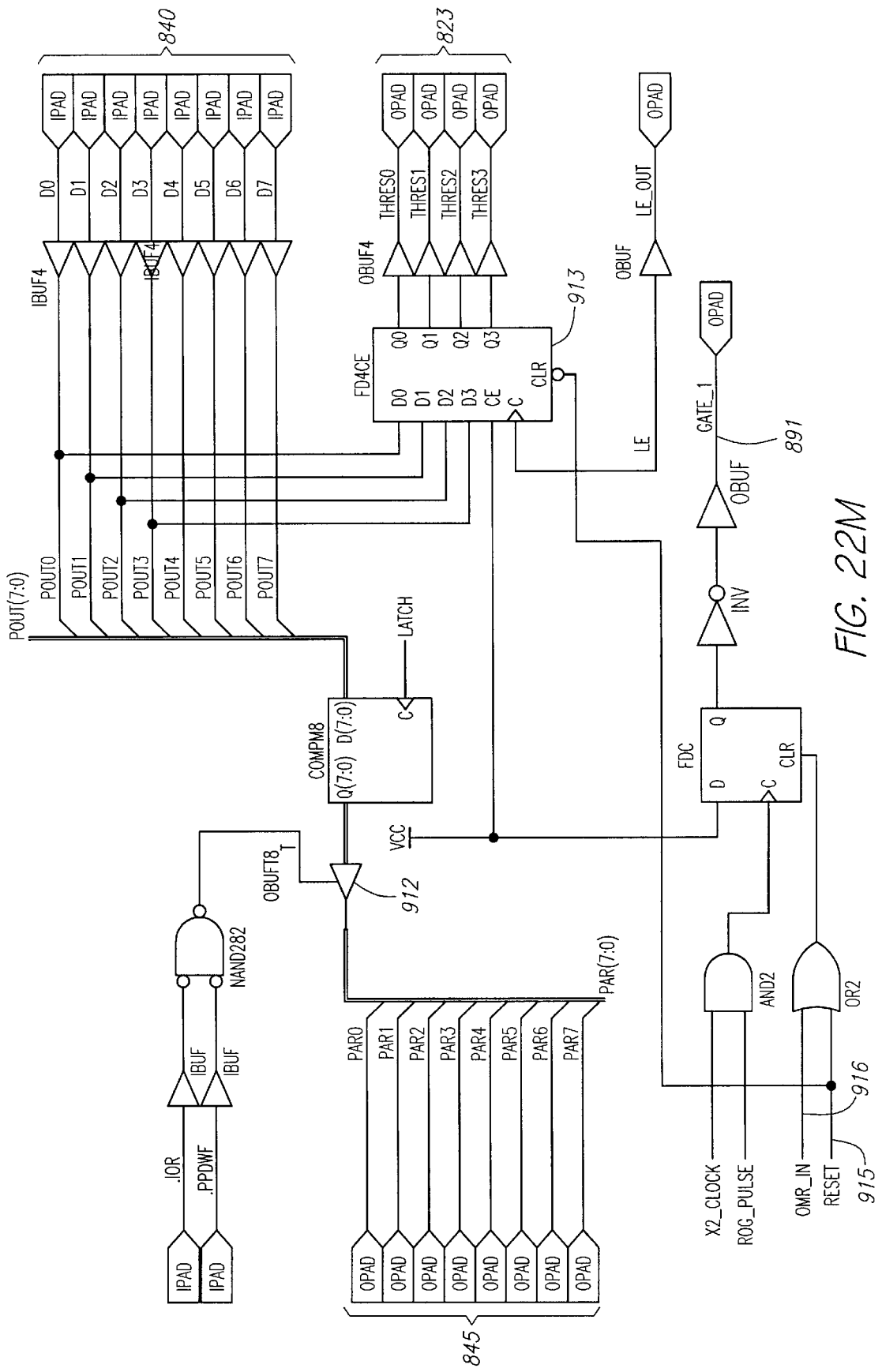

FIGS. 22-A–M depict further details of a preferred controller incorporating certain principles and concepts of the controller 700 shown in FIG. 21 and described in the immediately preceding section hereof. The operation and function of the circuitry depicted in FIGS. 22A–M should be readily understood by those skilled in the art, but nevertheless certain operational features are pointed out hereinbelow.

FIG. 22-A shows, among other things, portions of circuitry for controlling the CCD sensor. An external clock signal 861 is provided to the controller, and may be derived from a 14 MHz crystal oscillator clock circuit or from any other suitable source. The external clock signal 861 may also be used as a clock reference for the decoder 106 (see FIG. 2).

The external clock signal 861 is connected to a clock divider circuit 864 which divides the external clock signal 861 by three to develop a system clock signal 859 of approximately 5 MHz. The system clock signal 859 is applied to the clocking input of a binary counter 862, which outputs a set of clock signals 863 at rates divided down from the system clock signal rate; in particular, the binary counter 862 outputs clock signals 863 at divided down rates of two, four, eight and sixteen, respectively, from the system clock signal rate.

A clock device signal 860 is received from the decoder 106, and this clock device signal 860 selects the clocking rate to be used for the CCD sensor 101 by controlling the select input of a multiplexer 865. The clock output 892 from the multiplexer 865 is used to derive the CCD pixel clock signal 814 for driving the CCD sensor 101. The clock output 892 is also used by a set of counters 894, 895 to derive the start-of-scan signal 886 sent to the decoder 106. A pair of comparators 896, 897 are used to compare an internal count of clock pulses maintained by the controller against a predefined maximum clock pulse count, and when the maximum clock pulse count is reached a read-out-gate (ROG) signal pulse is generated on ROG signal 813.

FIG. 22-B shows, among other things, portions of the feature measurement circuitry of the controller, as well as portions of the FIFO/memory interface circuitry of the controller. As shown in FIG. 22-B, a digital bar code signal 820 and digital OMR signal 821 are input to a multiplexer 901 of the controller, which selects between those two signals. This selection is made according to the state of an OMR/bar code select signal 842 applied to the select input of the multiplexer 901. The output of the multiplexer 901 constitutes a feature input signal 903, and is provided to a monostable circuit 902 which qualifies the edge to handle potentially unstable signal inputs. Upon the start of a scan, each transition of the feature input signal 903 causes an asynchronous counter 871 (of, e.g., 15 bits) to reset and commence counting. The asynchronous counter 871 counts the number of clock pulses occurring until it is next reset, and thereby obtains a width measurement of each feature (these clock pulses may be at a different and faster rate than the CCD pixel clock, so that oversampling may be done). When a transition occurs in the feature input signal 903, indicating the end of an old feature and the start of a new feature, an enable input (ENP) of the asynchronous counter 871 is briefly toggled. The asynchronous counter 871 holds its output long enough for the feature count value to be read out and stored in the FIFO 104 over data bus 825. A FIFO byte select signal 905 is generated to allow sequential writing of the high byte and low byte (i.e., upper 8 bits and lower 8 bits, respectively) of the asynchronous counter 871 into the FIFO 104. After the feature count value is read out from the asynchronous counter 871, the counter is re-enabled and begins counting from zero again to measure the width of the next feature.

The controller circuitry of FIG. 22-B thereby allows feature width measurement of either bar code elements or optical markings, using the same circuitry. The feature width measurement data can be stored rapidly and efficiently to the FIFO for temporary storage.

In addition, the decoder 106 has the capability to clear the FIFO 104 by sending a clear FIFO control signal 883 to the controller, as shown in FIG. 22-B, which then causes the controller to output a reset FIFO signal 873 to the FIFO 104. The reset FIFO signal 873 has the effect of moving the FIFO pointer back to the starting position. The controller also has several miscellaneous I/O management functions depicted in the circuitry of FIG. 22-B. The controller is capable of supporting two RAM banks, which can be selected by RAM bank select signal 876. In response to the RAM bank select signal 876, the controller outputs RAM enable signals 875a, 875b, only one of which can be active at a given time. The decoder 106 can also choose between RAM and FIFO 104 as a destination for the feature width measurement data by I/O select signal 878. A FIFO read/write (R/W) signal 879 allows the decoder 106 to read from the FIFO 104. Additionally, a latch select signal (A0) 877 from the decoder 106 allows selection of the parallel output port as a destination for data storage or transfer.

In FIG. 22-B is also shown a flip-flop 872 which receives as its input signal-size-2 signal 822 (corresponding to signal-size-2 signal 525 output from window comparator 513 in FIG. 19). The flip-flop 872 latches a binary 1-value when signal-size-2 signal 822 is asserted, indicating that the CCD video signal threshold has been exceeded (i.e., saturation has occurred). When such a saturation condition occurs, a speed select signal 909 is generated, and this signal is fed back to the clock speed selection circuitry shown in FIG. 22-A so as to select the higher speed clocking frequency for the CCD sensor.

FIG. 22-C shows additional controller circuitry. The controller outputs an LED activation signal 852 (corresponding to LED signal 152 in FIG. 2) in response to an LED enable signal 910 (see FIG. 22-A) from the decoder 106, for controlling the turning on and off of the LED array 108.

FIG. 22-C also shows circuitry for deriving a start-of-scan edge signal 884 which, among other things, is used for the purpose of clearing the asynchronous counter 871 (shown in FIG. 22-B) at the start of a scan line. FIG. 22-C also shows a clock timing comparison circuit 887 which activates the restore white (RES W) signal 889 for a predefined period of time at the start of a scan, and then releases it after the predefined period of time has elapsed.

FIG. 22-D shows an 8-bit parallel output port 845, as accessed using a tri-state buffer 912. Also shown in FIG. 22-D are the signal lines associated with data bus 840, which connects the controller 102 to the decoder 106. An OMR threshold latch 913 is connected to data bus 840 and can be loaded with digital information from the decoder 106, specifically a digital OMR threshold signal. The digital OMR threshold signal 823 is read out directly from the OMR threshold latch 913 and provided to the signal conditioning and processing circuitry. An OMR reset signal (GATE1) 891 is activated when a reset signal 915 occurs, or else an OMR initialization signal 916 is asserted from the decoder 106.

The OMR reset signal 891 resets the OMR processing channel circuitry in the signal conditioning and processing block of the optical reader.

In a preferred embodiment, the controller 700 is embodied as an electrically programmable logic device, or EPLD.

However, the controller 700 may be constructed using any appropriate digital logic technique. Also, the functions of the controller 700 may be combined with the decoder 106 or other circuitry of the optical reader, and may be implemented using a microprocessor which can also perform other functions, such as decoding.

In an alternative preferred embodiment, the optical reader does not necessarily rely upon the CCD video signal for determining whether to operate at an increased scan rate to avoid saturation, but rather a "door open" detector is used to indicate situations in which saturation is likely to occur.

When the door open detector detects that the door 169 is open (see FIG. 4-C), then, for example, the CCD control block 701 of the controller 700 (see FIG. 21) can adjust the scan rate and read-out rate of the CCD sensor accordingly. As one example of a way in which potential saturation can be handled, the CCD control block 701 can cycle among several different scan rates, while maintaining the same read-out rate (e.g., 4 milliseconds) for each scan. For instance, the exposure rate may be varied between 250 and 16,000 scans/second, but after each exposure frame a read-out frame occurs at the same constant rate of, e.g., 250 scans/second. In this manner, at least one of the scans is likely be carried out with an exposure time appropriate for the relative amount of ambient light. At the same time, the read-out rate is kept constant, which helps assure that the operation of the device is within the dynamic range of the selected system components (particularly of the signal conditioning and processing circuitry).

Table 1 below illustrates one possible cycle of scan rates and read-out rates in order to accomplish the above operation.

TABLE 1

| Cycle | Time | Rate | Function |
|---|---|---|---|
| 1 | 1 ms | 1000/second | Exposure |
| 2 | 4 ms | 250/second | Read-out |
| 3 | 0.25 ms | 4000/second | Exposure |
| 4 | 4 ms | 250/second | Read-out |
| 5 | 0.0625 ms | 16000/second | Exposure |
| 6 | 4 ms | 250/second | Read-out |
| 7 | 4 ms | 250/second | Exposure |
| 8 | 4 ms | 250/second | Read-out |

During each of the "fast" scans (i.e., those fast than 250 scans/second), the data from the previous exposure is preferably discarded, rather than read out and processed, because of the desire to avoid reading out and processing the data at too fast a rate. For example, in the third frame cycle of Table 1 above, an exposure period of 0.25 milliseconds (corresponding to a scan rate of 4000 scans/second) is used, which requires that the data read in the second frame cycle is discarded because of the desire to avoid reading out data at that fast rate. While one might potentially attempt to process the data read out at a rate of 4000 scans/second, the dynamic range of the signal processing and conditioning circuitry may not be suitable to handle the data read out so quickly. If, on the other hand, the dynamic range of the signal processing and conditioning circuitry is adjustable on a scan frame by scan frame basis, then the CCD video data could potentially be read out at whatever rate(s) the signal processing and conditioning circuitry will permit.

The different pixel clock rates needed to realize the different scan rates can be derived by the controller from the master clock signal. For example, in the controller circuitry shown in FIG. 22-A is depicted a counter 862 which is used to derive clock signals 863 which are divided down from the master system clock rate by factors of two, four, eight and sixteen. A similar technique may be used to achieve all of the desired clock signals, and a straightforward state machine may be used to select among the clock signals in the cyclical pattern described in regard to Table 1, or any other suitable pattern.

Further details will now be provided regarding the selection of operational modes of the optical reader. The selection of operational modes can be accomplished in a variety of ways. According to one technique, a first operational mode is chosen as the default mode, and the operational mode is changed when a particular pattern of data cannot be read with the default mode. For example, the optical reader may default to the bar code scanning mode. The decoder receives feature measurement data and, if it determines that the particular mark cannot be bar code (due to its size and shape, for example), the optical reader switches to an OMR mode. To facilitate this approach, the optical reader may utilize two feature measuring circuits and possibly two FIFO buffers operating simultaneously, one feature measuring circuit and FIFO for each of the processing channels. In this way, the target does not need to be read twice, and the data will be processed both as bar code data and OMR data. This technique can be extrapolated or otherwise applied to other data formats which are utilized by the optical reader as well.

Alternatively, the operational mode may be selected by initial reading of a control symbol, such as the job control bar code previously described. The control symbol could be a stacked or multi-dimensional bar code, if desired. However, the control symbol need not be a bar code, but could comprise OMR marks or other data recognizable to the optical reader. Other types of codes or indicia, such as printed characters, magnetic ink, embedded RF IDs, or the like may be used to control operational modes of the optical reader as well.

The operational mode can be selected manually, as, for example, where an operator reviews the document or item to be scanned, and selects the operational mode (via a keyboard or mouse, e.g.) using a host computer or terminal connected to the optical reader over communication lines. Alternatively, the operator can select a manual or electronic switch on the optical reader itself to select an operational mode.

According to another technique, the control symbol (i.e., any indicia that controls the operation mode of the optical reader) is pre-printed on the document or item to be read. The optical reader initially reads the control symbol, and automatically selects the appropriate operational mode for the expected information. The document or item may contain several control symbols at different locations, and each control symbol could potentially alter the operational mode of the optical reader. A document printed with a variety of such control symbols may be referred to as a "smart ticket." The locations of the control symbol(s) on a ticket may be predefined, if desired.

If the decoder is located in the host terminal (as may be the case with the embodiment shown in FIG. 24, for example), then the host terminal can send a mode selection signal back to the optical reader via a parallel port or else by a serial port. The mode selection command can be sent through the (external) decoder, or else may bypass the decoder and be sent directly to the controller of the optical reader.

The optical reader may be configured so that once a control symbol is read, the optical reader remains in the operational mode dictated by the control symbol until another control symbol is detected and decoded. In an alternative embodiment, once a control symbol is read, the optical reader remains in the operational mode dictated by the control symbol until either another control symbol is detected and decoded, or else a predetermined time-out period elapses in which no other control symbol is detected and decoded.

In yet another embodiment, the control symbol selects the operational mode for different localities of the document or item being read. For example, the control symbol may contain information (in terms of line numbers, inches, millimeters or any other appropriate units) indicating which regions of the target item are to be read according to which format. For example, a control symbol may indicate that the first half of a ticket contains bar code formatted data, while the second half of a ticket contains OMR formatted data.

In accordance with a preferred embodiment, a control symbol (e.g., a job control bar code) is read from the back of a ticket using a device such as constructed and shown in FIGS. 3 and 4-A through 4-C. In other words, a mirror is used to obtain a "bank shot" of the back of a ticket fed into the device. The control symbol is detected and decoded, and thereby dictates the subsequent operational mode of the optical reader. If the control symbol indicated that the upcoming information is in a bar code format, then the controller 102 (see FIG. 2) of the optical reader would select the digital bar code signal 120 (also FIG. 2) as the desired input signal, and could, if desired, temporarily disable or ignore the OMR processing channel. The controller 102 would also select a suitable scan rate (e.g., 250 scans/ second) for the CCD sensor 101 (FIG. 2). In this particular embodiment, the optical reader would then read information on the front of the ticket, looking specifically for bar code information (using the bar code processing channel of the signal processing and conditioning block 103, and also using decoder 106).

Adding further to this example, a second control symbol might be detected at a subsequent portion of the ticket. Should this occur, the optical reader can re-configure itself to look for data in a different format. For example, if the second control symbol indicates that OMR format data will follow, then the controller 102 will select the digital OMR signal 121 as the appropriate input signal for feature measurement, and may, if desired, temporarily ignore or disable the bar code processing channel. The controller 102 would also select a suitable scan rate (e.g., 1000 scans/ second) for the CCD sensor 101 so as to efficiently read OMR data.

Each time the data format changes on the ticket (or other item to be read), a control symbol may be utilized to reconfigure the optical reader so that it will read data in the desired format. In response to the control symbol, the optical reader can select the processing electronics as well as the characteristics of the processing circuitry (including the optical sensor) to most efficiently and effectively read the incoming data. The control symbol can potentially alter one or more of the signal processing characteristics, the sampling rate, the illumination level and the decoding algorithm (s).

Optionally, the optical reader can be configured to adjust the paper feed rate, by itself or in addition to changing the scan rate or other characteristic of the optical reader, in response to a control symbol. For example, it may be desirable to slow the paper feed rate for certain types of dense information, such as PDF417 bar codes. The decoder may, for example, send a signal to the motor control circuitry in response to the control symbol to adjust the speed of the drive roller which moves the ticket.

Figure 23:
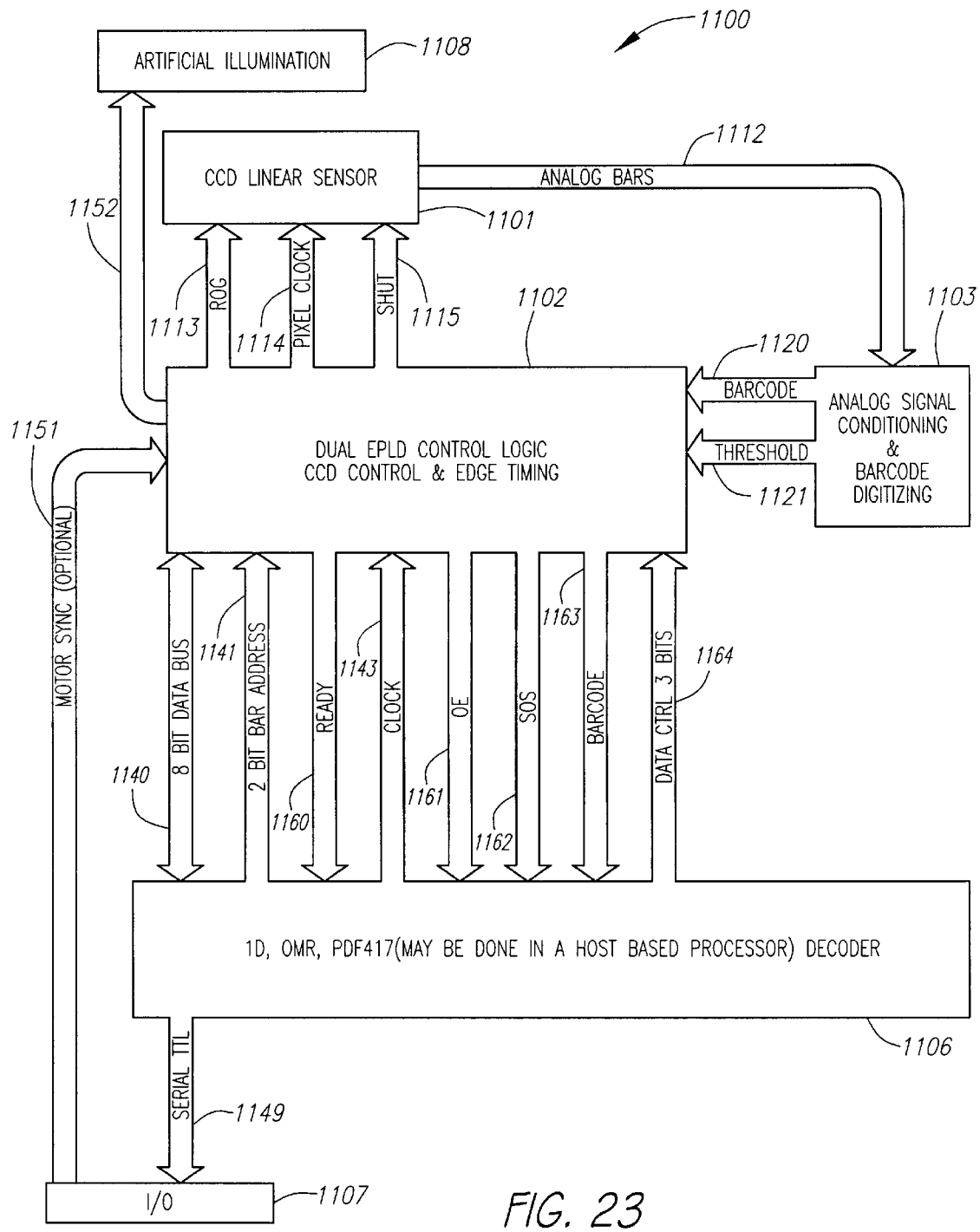
FIG. 23 is a diagram of another embodiment of an optical reader in accordance with aspects of the present invention.

FIG. 23 is a diagram of an optical reader 1100 in accordance with another preferred embodiment. The optical reader 1100 shown in FIG. 23 is similar in many respects to the optical reader 100 of FIG. 2, except for the primary difference that the optical reader 1100 of FIG. 23 does not have a FIFO to temporarily store feature measurement data. In the optical reader 1100 of FIG. 23, a CCD sensor 1101 (preferably a CCD linear sensor, but possibly a two-dimensional CCD sensor or other type of sensor) is controlled by a read-out-gate (ROG) signal 1113 and a pixel clock signal 1114 in a manner similar to CCD sensor 101 of the optical reader 100 of FIG. 2. Likewise, an analog bar code/OMR signal 1112 is output from the CCD sensor 1101 and processed by a signal conditioning and processing block 1103 similar to that of FIG. 2, which in a like fashion outputs a digital bar code signal 1120 and a digital OMR signal 1121 to a controller 1102 which, among other things, derives feature measurements.

The controller 1102 is preferably a "dual" EPLD which comprises a primary EPLD similar to controller 102 of FIG. 2, connected to a secondary EPLD that serves as a multi-word data latch (of, e.g., 4 words) The decoder subsystem 1106 accesses the data stored in the secondary EPLD of controller 1102 by a 2-bit address signal 1141, and receives the data over a data bus 1140 (e.g., an 8-bit data bus). Because the embodiment of the optical reader 1100 shown in FIG. 23 does not have a FIFO buffer, the feature measurement data derived by the controller 1102 is instead transported directly to a decoder subsystem 1106. Otherwise, the decoder 1106 interfaces with the controller 1102 in a manner very similar to the optical reader 100 of FIG. 2.

The decoder subsystem 1106 comprises logic components suitable for decoding the symbols of interest, and may, for example, comprise a microprocessor, flash ROM and static RAM (or SRAM). The decoder subsystem 1106 can be configured, like decoder 106 of FIG. 2, to recognize any conventional bar codes, symbols or optical marks, including 1-dimensional or 2-dimensional bar codes, stacked bar codes, codes with error correction features or ECC (e.g., PDF417), matrix codes, optical characters, images, signatures and other markings. However, the optical reader embodiment of FIG. 2 is preferable to the embodiment of FIG. 23 for higher speed applications, as the optical reader 100 of FIG. 2 is outfitted with a FIFO buffer to allow temporary storage of overflow scan data.

Figure 24:
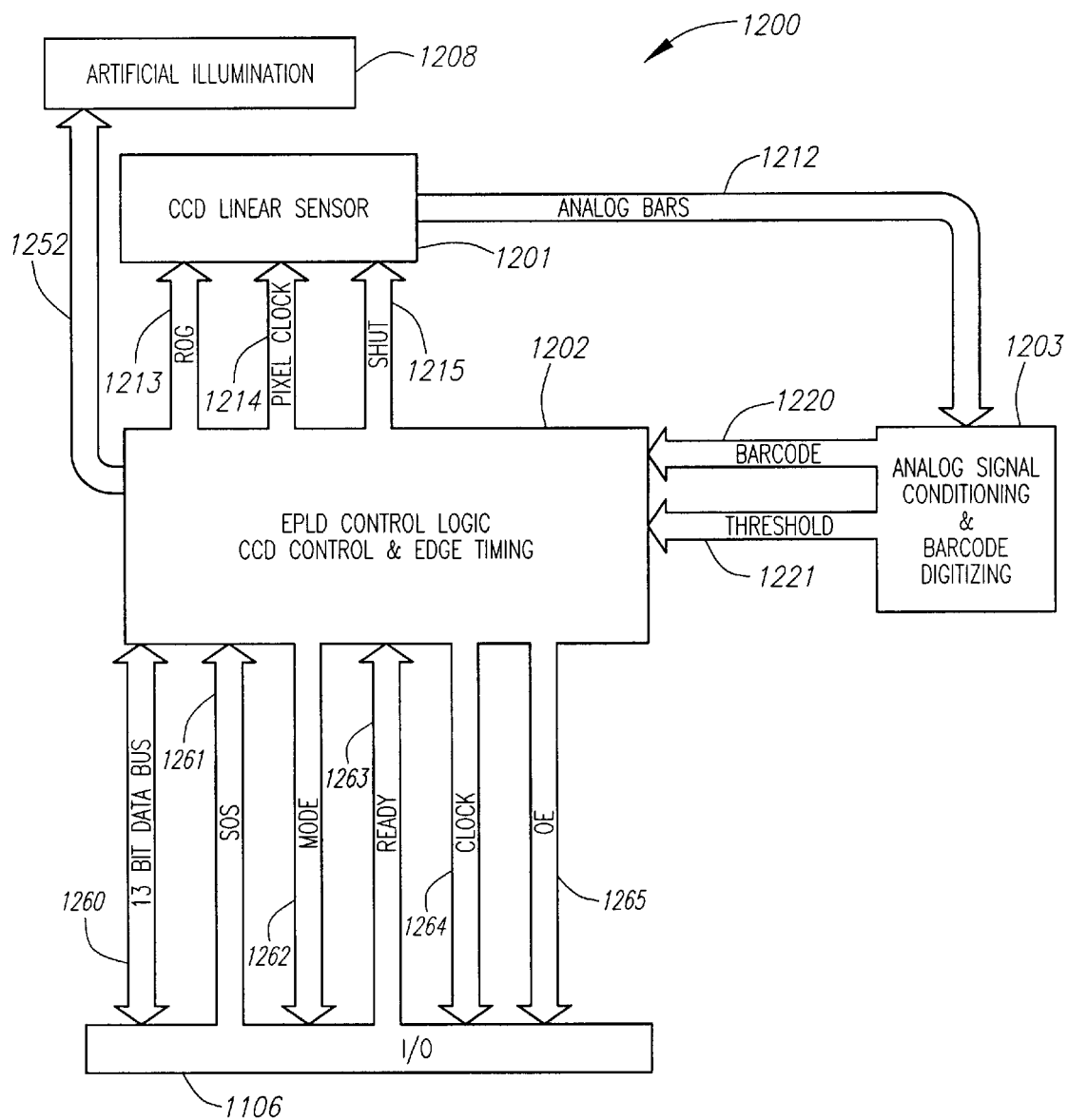
FIG. 24 is a diagram of another embodiment of an optical reader in accordance with aspects of the present invention.

FIG. 24 is a diagram of an optical reader 1200 in accordance with yet another preferred embodiment. The optical reader 1200 shown in FIG. 24 is similar in many respects to the optical reader 100 of FIG. 2 or optical reader 1100 of FIG. 23, but is even further simplified in that it does not have either a FIFO or a resident decoder. Instead, the decoding is carried out in another part of the system, such as by an external PC or computerized network. In the optical reader 1200 of FIG. 24, a CCD sensor 1201 (preferably a CCD linear sensor, but possibly a two-dimensional CCD sensor or other type of sensor) is controlled by a read-out-gate (ROG) signal 1213 and a pixel clock signal 1214 in a manner similar to CCD sensor 101 of the optical reader 100 of FIG. 2.

Likewise, an analog bar code/OMR signal 1212 is output from the CCD sensor 1201 and processed by a signal conditioning and processing block 1203 similar to that of FIG. 2, which in a like fashion outputs a digital bar code signal 1220 and a digital OMR signal 1221 to a controller 1202 which, among other things, derives feature measurements.

The feature measurement data derived by the controller 1202 is transported over a data bus (e.g., a 13-bit data bus) to an I/O port 1207, which allows an external microprocessor or decoder to process the feature measurement information. The operation of the optical reader 1200 may be adjusted externally through one or more control signals connected to the controller 1202, such as a mode select signal 1262 which selects, for example, between a bar code scanning mode and an OMR scanning mode. An external clock signal 1264 can also be provided to the controller 1202. In other respects, the controller 1202 interfaces with an external device over the I/O port 1207 in a manner very similar to the interface with the decoder 106 described in respect to FIG. 2.

In another aspect, an additional capability of image capture may be provided, for capturing full graphic images such as signatures, photo IDs, or the like. To accomplish image or signature capture, the same CCD sensor and processing circuitry may be used, and the feature measurement data (i.e., the RLE words) stored line by line in a volatile memory such as a RAM. The OMR processing channel can be used for reading the image; however, the sensitivity of the adaptive OMR threshold is preferably increased when reading image data. Alternatively, instead of processing the CCD video signal for transitions, the CCD video signal may be converted to a digital signal and the "gray-scale" data routed directly to a memory storage location, such as a RAM. In either of these alternative embodiments, a two-dimensional image can be built up using a CCD linear sensor (e.g., in a raster manner by scanning line-by-line), or else a two-dimensional CCD sensor can be used to image an entire region. The image data captured in memory storage can be later read out and processed, or can be downloaded to a computer and saved in a record associated with the particular gaming ticket or other item that was read.

In a variation of an optical reader with image capture capability, the job control bar code previously described is used to identify areas on the gaming ticket or other item where image capture is desired. When the optical reader reaches the target location, it starts to route the information to the memory storage dedicated to image capture.

Also, the optical reader may adjust the scan rate and/or ticket transport rate and/or some other operating/processing condition, if necessary, to that best suited for image capture.

In another embodiment, the optical reader is configured to also perform optical character recognition (OCR), which may be provided in addition to OMR and bar code scanning and decoding capabilities, as well as image capture capability. In such an embodiment, OCR data can be processed in a manner similar to OMR data, using an adaptive thresholding technique.

The OCR data may be formatted into RLE words by the controller 102 (see FIG. 2), and the RLE words can then be compared against pre-stored templates in a RAM or ROM in order to determine which character of symbol most closely matches the pattern of adjacent RLE words. Algorithms for performing optical character recognition are known in the art, and software for performing such algorithms may be readily stored on-chip. Alternatively, the OCR data can be transferred via the input/output port to a host terminal, which can perform the OCR character recognition.

In a further aspect of certain embodiments disclosed herein, a two-dimensional or multi-dimensional imaging array (such as a CCD array or CMOS array) is used in conjunction with parallel processing to increase processing speed. In such an embodiment, multiple scan lines can be imaged simultaneously, and a plurality of processing channels can be provided, each one operating on a particular row (or column) of pixels in the sensor matrix. As a further method of increasing processing speed, multiple controllers can be utilized, with each individual controller dedicated to one of the processing channels.

In one embodiment, a CMOS imaging array is used for the photosensor 51 of the optical reader (see FIG. 1), wherein the individual pixels of the CMOS imaging array can be randomly accessed. In such an embodiment, the CMOS imaging array receives light at a multiplicity of pixel locations and converts the resulting charge to voltage locally at each pixel site. The charge is transferred upon demand directly to a common metal bus. A multi-dimensional CMOS array may provide simultaneous pixel exposure with non-destructive readout of the pixel contents. The multi-dimensional CMOS array may comprise, for example, a two-dimensional pattern, such as a grid or other combination of linear imaging arrays, with certain selected pixels being utilized in more than one linear imaging array. The non-destructive readout capability allows the same pixels to be read out multiple times, once for each linear imaging array of which the pixel is a member. The exposure time of the imaging array may be controlled using a feedback loop, with one or more exposure control pixels are positioned adjacent to or within the imaging array and receive light along with the imaging array. The charge of the exposure control pixel or pixels can be measured against a threshold level, and the amount of time taken to reach the threshold level determines the time exposure of the pixels of the imaging array. Additionally, signal processing circuitry may be employed which, in combination with the exposure control circuitry, can minimize the time-to-read over a large range of light levels, while performing spatially optimal filtering. Clocking cycles and control signals can be time-adjusted in accordance with the varying output frequency of the CMOS imaging array so as to provide invariant spatial frequency response by the signal processing circuitry. The CMOS imaging array may be integrated with other CMOS circuitry in the optical reader.

A variety of different lens configurations may be used with some or all of the various embodiments described herein. An optical reader constructed in accordance with one or more of the disclosed embodiments may be configured to utilize automatic focusing by any conventional technique known in the art, or to switch between multiple focal ranges using adjustable range-setting techniques as described, for example, in U.S. Pat. No. 5,347,121, hereby incorporated by reference as if set forth fully herein.

It will be apparent that an apparatus constructed in accordance with one or more embodiments herein disclosed may provide an advantage of high speed optical reading with an efficient and cost-effective implementation. A single unit can combine reading of bar codes (both single and multi-dimensional), OMR, signature capture and/or image capture. A single photosensor component can be used to image all of the above types of data. In certain embodiments, different optical resolution can be achieved by selection of the scan rate on the fly. The signal processing circuitry can, in certain embodiments, be especially adapted for handling the different types of data expected. For example, the signal processing circuitry may, as previously described, perform active tracking of light levels, thereby eliminating the need for complex automatic gain control circuitry. The signal processing circuitry can also support multiple processing channels to handle the special signal characteristics of the different data formats being read. An optical reader in accordance with various embodiments disclosed herein is also preferably flexible; for example, a flash memory may be used so that the decoding algorithms can be changed or upgraded in the field by re-programming the decoder software in the flash memory, and the controller circuitry may be implemented as an EPLD so it also can be changed in the field.

In one aspect, a multi-function optical reader is provided capable of reading and processing data in different formats, and having a relatively large depth of field, constant image perspective, and no moving parts required for the optics. Relatively dense reading capability (e.g., 500 dpi horizontally, and 200 dpi vertically) can be provided. In addition, such a multi-functional optical reader may be relatively inexpensive to manufacture, and modularly constructed as described with respect to certain of the above embodiments.

An apparatus constructed in accordance with one or more aspects of the embodiments herein disclosed may be useful for scanning lottery tickets or other gaming tickets, bet slips, Hollerith cards, standardized tests and other forms (such as voting forms), one-dimensional bar codes, two-dimensional bar codes, stacked bar codes, matrix bar codes, PDF417-type bar codes, characters, and/or images. Such an apparatus can find application in hand-held optical readers and bar code scanners, fixed-position optical readers and bar code scanners, bar code verification equipment, restaurant order processing, lottery ticket processing, bearer bond processing, and high-quality facsimile transmission, to name a few.

Certain embodiments as disclosed herein can provide a great deal of flexibility in the application of lottery and gaming tickets. For example, the same hardware configuration can be used to read many different formats of gaming tickets, regardless of where the optical marks are located on a target scan line. The decoder or processor software can be programmed to recognize the particular OMR format of interest, without having to change the hardware configuration for each gaming ticket format. In contrast, previous designs of lottery ticket readers typically have used an array of optical mark sensors at fixed locations where the optical marks are expected, and therefore were only useful for a single or limited number of gaming ticket formats. -In addition, the job control bar code previously described can be combined in a single bar code with other encoded information, such as a win/loss bar code conventionally used on some lottery tickets to indicate whether the ticket is a winning or losing ticket.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. An optical reader, comprising:
   a photosensitive detector, said photosensitive detector having an output signal;
   a signal processor connected to said photosensitive detector, said signal processor selectively conditioning said output signal according to different possible formats of data to be read;
   a feature measurer connected to said signal processor; and
   means for adjusting an exposure period of said photosensitive detector.

2. The optical reader of claim 1, wherein said signal processor comprises a plurality of processing channels, said signal processing channels including at least a bar code processing channel and an OMR processing channel.

3. The optical reader of claim 2, wherein said bar code processing channel comprises an edge detection circuit, and wherein said OMR processing channel comprises an adaptive thresholding circuit.

4. An optical reader, comprising:
   a photosensitive detector, said photosensitive detector having an output signal;
   a signal processor connected to said photosensitive detector, said signal processor selectively conditioning said output signal according to different possible formats of data to be read;
   a feature measurer connected to said signal processor; and
   means for selecting among a plurality of operational modes corresponding to said plurality of processing channels;
   wherein said signal processor comprises a plurality of processing channels, said signal processing channels including at least a bar code processing channel and an OMR processing channel.

5. The optical reader of claim 4, wherein said photosensitive detector comprises a charge-coupled device (CCD).

6. The optical reader of claim 4, wherein said photosensitive detector comprises a linear array of photosensitive elements.

7. The optical reader of claim 4, wherein said photosensitive detector comprises a two-dimensional array of photosensitive elements.

8. The optical reader of claim 4, wherein said photosensitive detector comprises a CMOS sensor.

9. The optical reader of claim 4, further comprising means for selecting a scan rate for said photosensitive detector.

10. The optical reader of claim 4, wherein said means for selecting among a plurality of operational modes corresponding to said plurality of processing channels comprises means for identifying a job control symbol and selecting an operation mode in response to said job control symbol.

11. The optical reader of claim 4, further comprising a volatile memory for storing image capture data directly from said photosensitive detector.

12. The optical reader of claim 4, further comprising a decoder.

13. The optical reader of claim 12, further comprising a memory buffer connected in a data path between said feature measurer and said decoder.

14. The optical reader of claim 4, further comprising a processor configured to perform optical character recognition.

15. An optical reader, comprising:
   a photosensitive detector, said photosensitive detector having an output signal;
   a signal processor connected to said photosensitive detector, said signal processor selectively conditioning said output signal according to different possible formats of data to be read;

a feature measurer connected to said signal processor; and a housing in which said photosensitive detector is located, said photosensitive detector viewing over a first depth-of-field zone internal to said housing and a second depth-of-field zone external to said housing.

16. A method for reading data, comprising the steps of:

receiving light on a photosensitive detector;

outputting a signal from said photosensitive detector;

conditioning the signal according to a data format selected from a plurality of data formats;

generating a data signal representing features according to the selected data format; and selecting a scan rate for said photosensitive detector based upon the selected data format.

17. The method of claim 16, wherein said plurality of data formats comprises at least a bar code data format and an OMR data format.

18. The method of claim 17, wherein said step of conditioning the signal according to a data format selected from a plurality of data formats comprises, for said bar code data format, the step of detecting transitions between positive and negative peaks in the signal from said photosensitive detector, and, for OMR data format, the step of detecting crossings of a threshold signal adaptively derived from the signal output from said photosensitive detector.

19. A method for reading data, comprising the steps of:

selecting a scan rate for an optical reader from among a plurality of selectable scan rates;

receiving light on a photosensitive detector for an exposure time corresponding to said selected scan rate;

outputting a signal from said photosensitive detector; and generating a data signal representing optical features in a target scan area.

20. The method of claim 19, wherein the step of outputting a signal from said photosensitive detector comprises the step of clocking out data from said photosensitive detector at a predefined read-out rate, regardless of the selected scan rate.

21. The method of claim 19, further comprising the step of selecting a mode of operation from among a plurality of modes of operation, wherein said selected scan rate for the optical reader corresponds to the selected mode of operation.

22. The method of claim 21, wherein said modes of operation comprise at least a bar code scanning mode and an OMR scanning mode.

23. The method of claim 21, further comprising the step of conditioning the signal output from said photosensitive detector according to the selected mode of operation.

24. The method of claim 19, wherein the scan rate of the optical reader is selected in response to a control symbol read by the optical reader.

25. An optical reader, comprising:

a housing having a receptacle adapted to receive paper documents;

an imaging system located within said housing, said imaging system comprising at least one lens and a photosensitive detector;

a door connected to said housing;

a mirror affixed to said door, said mirror positioned along an optical path of the photosensitive detector;

an imaging window located along said optical path and between said lens and said door; and an illumination source;

wherein a plurality of depth-of-field zones are defined along said optical path, at least one of said depth-of-field zones corresponding to a target region external to said housing; and wherein a second one of said depth-of-field zones corresponds to a target region along said optical path between said imaging window and said door, and wherein a third one of said depth-of-field zones corresponds to a target region along said optical path and imaged by said mirror.

26. The optical reader of claim 25, wherein said photosensitive detector sequentially scans a back side and a front side of a paper document inserted in said receptacle, said back side of said paper document scanned in said third depth-of-field zone, and said front side of said paper document scanned in said second depth-of-field zone.

27. The optical reader of claim 26, wherein said paper documents comprise gaming tickets.

28. The optical reader of claim 25, further comprising:

a signal processor connected to said photosensitive detector, said signal processor having a plurality of processing channels;

a feature measurer connected to said signal processor; and a controller connected to said feature measurer, said controller selecting one of said processing channels of the signal processor for connection to said feature measurer.

29. The optical reader of claim 28, wherein said controller selects a scan rate for said photosensitive detector.

30. The optical reader of claim 28, further comprising a decoder connected to said feature measurer.

31. The optical reader of claim 25, wherein said photosensitive detector comprises a charge-coupled device (CCD).

32. The optical reader of claim 25, further comprising a processor programmed to detect optical markings or to recognize optical characters.

* * * * *